US012673333B2

(12) United States Patent
Kurz et al.

(10) Patent No.: US 12,673,333 B2
(45) Date of Patent: Jul. 7, 2026

(54) METHODS OF PENNING MICRO-OBJECTS USING POSITIVE DIELECTROPHORESIS

(71) Applicant: BRUKER CELLULAR ANALYSIS, INC., Emeryville, CA (US)

(72) Inventors: Volker L.S. Kurz, Oakland, CA (US); John A. Tenney, Piedmont, CA (US); Long Van Le, Emeryville, CA (US)

(73) Assignee: Bruker Spatial Biology, Inc., Seattle, WA (US)

( * ) Notice: Subject to any disclaimer, the term of this patent is extended or adjusted under 35 U.S.C. 154(b) by 435 days.

(21) Appl. No.: 17/807,597

(22) Filed: Jun. 17, 2022

(65) Prior Publication Data

US 2023/0092258 A1      Mar. 23, 2023

Related U.S. Application Data

(63) Continuation of application No. PCT/US2020/066229, filed on Dec. 18, 2020.

(Continued)

(51) Int. Cl.
*B03C 5/00*          (2006.01)
*B01L 3/00*          (2006.01)
(Continued)

(52) U.S. Cl.
CPC ........ *B03C 5/005* (2013.01); *B01L 3/502761* (2013.01); *B03C 5/026* (2013.01);
(Continued)

(58) Field of Classification Search
CPC ..... B03C 5/005; B03C 5/026; B03C 2201/26; B01L 3/502761; B01L 2200/0652;
(Continued)

(56) References Cited

U.S. PATENT DOCUMENTS

2002/0036139 A1     3/2002   Becker et al.
2007/0240495 A1    10/2007   Hirahara
(Continued)

FOREIGN PATENT DOCUMENTS

WO      WO-2018102747 A1 *  6/2018   ............... B01L 3/00

OTHER PUBLICATIONS

Fuentes et al. Size scaling with light patterned dielectrophoresis in an Optoelectronic Tweezers device. Advanced Fabrication Technologies for Micro/Nano Optics and Photonics IX, 2016; 9759 (Year: 2016).*

*Primary Examiner* — Luan V Van
*Assistant Examiner* — Randall Lee Gamble, Jr.
(74) *Attorney, Agent, or Firm* — McNeill PLLC

(57)          ABSTRACT

Methods of selectively positioning a micro-object in a microfluidic device are described in this application. The microfluidic device can comprise an enclosure having an inlet, an outlet, and a flow region connecting the inlet and outlet, and an electrode activation substrate having a photoconductive layer. The methods of selectively positioning can comprising: projecting a first light beam on an electrode activation substrate of the microfluidic device, wherein the first position is proximal to the first micro-object, and wherein the first light beam activates a positive dielectrophoresis (DEP) force within the enclosure sufficient to capture the first micro-object; and projecting a second light beam upon a second position on the electrode activation substrate, wherein the second position is adjacent to or at least partially surrounding the first position, without overlapping the first position, the second light beam activating a positive DEP force within the enclosure sufficient to capture second micro-objects other than the first micro-object. The methods of selectively positioning can further comprise moving the first light beam towards a third position on the (Continued)

electrode activation substrate, wherein the DEP force activated by the first light beam is sufficient to move the first micro-object to the third position. Optionally, the methods can include moving the second light beam in relation to the first light beam to prevent micro-objects other than the first micro-object from being captured by the first light beam. Other embodiments are described.

16 Claims, 19 Drawing Sheets

Related U.S. Application Data

(60) Provisional application No. 62/951,891, filed on Dec. 20, 2019.

(51) Int. Cl.
| | |
|---|---|
| *B03C 5/02* | (2006.01) |
| *G01N 15/01* | (2024.01) |
| *G01N 15/14* | (2024.01) |
| *G01N 15/149* | (2024.01) |

(52) U.S. Cl.
CPC .. *G01N 15/1484* (2013.01); *B01L 2200/0652* (2013.01); *B01L 2300/0645* (2013.01); *B01L 2300/0654* (2013.01); *B01L 2300/0864* (2013.01); *B01L 2300/0883* (2013.01); *B01L 2400/0424* (2013.01); *G01N 15/01* (2024.01); *G01N 15/149* (2024.01)

(58) Field of Classification Search
CPC ..... B01L 2300/0645; B01L 2300/0654; B01L 2300/0864; B01L 2300/0883; B01L 2400/0424; B01L 2200/0668; B01L 2300/0816; B01L 1/04; B01L 3/502715; B01L 3/502746; B01L 3/502792; G01N 15/1484; G01N 15/01; G01N 15/149; G01N 33/483
See application file for complete search history.

(56) References Cited

U.S. PATENT DOCUMENTS

| 2012/0118740 | A1* | 5/2012 | Garcia ................... G01N 15/00 |
|---|---|---|---|
| | | | 204/547 |
| 2012/0325665 | A1 | 12/2012 | Chiou et al. |
| 2013/0090248 | A1 | 4/2013 | Link et al. |
| 2015/0360236 | A1 | 12/2015 | Garcia et al. |
| 2017/0354969 | A1* | 12/2017 | Lionberger ....... B01L 3/502761 |
| 2019/0374944 | A1 | 12/2019 | Lundquist et al. |

* cited by examiner

METHODS OF PENNING MICRO-OBJECTS USING POSITIVE DIELECTROPHORESIS

CROSS-REFERENCE TO RELATED APPLICATION

This patent application claims priority of U.S. Provisional Application Ser. No. 62/951,891, filed Dec. 20, 2019, the entire disclosures of which are hereby incorporated by reference.

BACKGROUND

Optically-actuated microfluidic devices allow researchers to use spatially-modulated light to manipulate micro-objects, such as biological cells. The present disclosure relates to systems and methods for providing sequences of light to move and direct one or more micro-objects, including individual, small micro-objects.

SUMMARY

In one aspect, this application describes methods of selectively positioning a first micro-object in a microfluidic device. In certain embodiments, the microfluidic device comprises an enclosure having an inlet, an outlet, and a flow region connecting the inlet and outlet, and an electrode activation substrate having a photoconductive layer. In certain embodiments, the methods comprise: projecting a first light beam on the electrode activation substrate, wherein the first position is proximal to the first micro-object, and wherein the first light beam activates a positive dielectrophoresis (DEP) force within the enclosure sufficient to capture the first micro-object; projecting a second light beam upon a second position on the electrode activation substrate, wherein the second position is adjacent to or at least partially surrounding the first position, without overlapping the first position, the second light beam activating a positive DEP force within the enclosure sufficient to capture second micro-objects other than the first micro-object; and moving the first light beam towards a third position on the electrode activation substrate, wherein the DEP force activated by the first light beam is sufficient to move the first micro-object to the third position. In certain embodiments, the methods further comprise moving the second light beam in relation to the first light beam to prevent micro-objects other than the first micro-object from being captured by the first light beam.

Additional aspects and embodiments are provided in the following partial listing of embodiments, which should be broadly construed in light of the detailed description, examples, and claims provided herein.

Embodiment 1. A method of selectively positioning a first micro-object in a microfluidic device comprising an enclosure having an inlet, an outlet, a flow region connecting the inlet and outlet, and an electrode activation substrate having a photoconductive layer, the method comprising: projecting light from a first light beam upon a first position on the electrode activation substrate, wherein the first position is proximal to the first micro-object, and wherein the projected light of the first light beam activates a positive dielectrophoresis (DEP) force within the enclosure sufficient to capture the first micro-object; projecting light from a second light beam upon a second position on the electrode activation substrate, wherein the second position is adjacent to or at least partially surrounding the first position, without overlapping the first position, the projected light of the second light beam activating a positive DEP force within the enclosure sufficient to capture second micro-objects other than the first micro-object; moving the projected light of the first light beam towards a third position on the electrode activation substrate, wherein the DEP force activated by the projected light of the first light beam is sufficient to move the first micro-object to the third position; and, optionally moving the projected light of the second light beam in relation to the projected light of the first light beam to prevent micro-objects other than the first micro-object from being captured by the positive DEP force activated by the projected light of the first light beam.

Embodiment 2. The method of embodiment 1, wherein the projected light of the first light beam partially or completely illuminates the first micro-object.

Embodiment 3. The method of any one of embodiments 1 to 2, wherein the projected light of the first light beam has a substantially circular, oblong, triangular, rectangular, square, polygonal, or irregular shape, and optionally, completely illuminates the first micro-object.

Embodiment 4. The method of any one of embodiments 1 to 3, wherein the projected light of the first light beam has a substantially circular shape that completely illuminates the first micro-object.

Embodiment 5. The method of any one of embodiments 1 to 4, wherein the projected light of the second light beam activates a positive DEP force sufficient to capture all of the second micro-objects proximate the first light beam.

Embodiment 6. The method of any one of embodiments 1 to 5, wherein the projected light of the second light beam forms a line having a substantially circular, oblong, triangular, rectangular, square, polygonal, or irregular shape.

Embodiment 7. The method of any one of embodiments 1 to 6, wherein the projected light of the second light beam forms a line having a substantially circular shape.

Embodiment 8. The method of embodiment 6 or 7, wherein the width of the line formed by the second light beam is at least about 5 microns (e.g., at least about 6 microns, at least about 7 microns, at least about 8 microns, at least about 9 microns, at least about 10 microns, at least about 11 microns, at least about 12 microns, at least about 13 microns, at least about 14 microns, at least about 15 microns) or wherein the width of the line formed by the second light beam is between about 5 microns and about 15 microns (e.g., between about 6 microns and about 12 microns, or between about 7 microns and about 10 microns).

Embodiment 9. The method of any one of embodiments 6 to 8, wherein the line formed by the projected light of the second light beam has a non-uniform width (e.g., the line may have one (or more) region(s) that is(are) thinner than the rest of the line and, optionally, the (a) thinner region may be oriented towards the opening of a chamber or a sequestration pen as the projected light of the second light beam moves in relation to the projected light of the first light beam).

Embodiment 10. The method of any one of embodiments 1 to 9, wherein the projected light of the second light beam has a shape that encloses the first light beam, wherein there is a space between the first and second light beams, and, wherein any illumination of the space between the first and second light beams is insufficient to activate DEP electrodes located in the space between the first and second light beams.

Embodiment 11. The method of any one of embodiments 1 to 10, wherein a distance between the projected light of the first light beam and the projected light of the second light beam is at least about 5 microns (e.g., at least about 10 microns, at least about 15 microns, at least about 20 microns, at least about 25 microns, at least about 30 microns, at least about 35 microns, at least about 40 microns, at least about 45 microns, at least about 50 microns, or more).

Embodiment 12. The method of embodiment 11, wherein the distance between the projected light of the first light beam and the projected light of the second light beam increases during a period of time defined by an initial time (e.g., when the first and second light beams are first projected upon the electrode activation substrate), and a subsequent time (e.g., when the projected light of the first light beam arrives at the third position on the electrode activation substrate, or when the projected light of the first light beam reaches an opening to a chamber or sequestration pen located within the enclosure and fluidically connected to the flow region).

Embodiment 13. The method of any one of embodiments 1 to 12, wherein the micro-object has a largest dimension (e.g., length or diameter) of about 4 microns or less (e.g., about 3 microns or less, about 2 microns or less, or about 1 micron or less).

Embodiment 14. The method of any one of embodiments 1 to 13, wherein moving the first micro-object from the first position to the third position on the electrode activation substrate isolates the first micro-object from other micro-objects located in the microfluidic device.

Embodiment 15. The method of any one of embodiments 1 to 14, wherein the third position on the electrode activation substrate experiences a reduced rate of fluid flow relative a rate of fluid flow in the flow region when fluid is flowing through the enclosure.

Embodiment 16. The method of any one of embodiments 1 to 15, wherein the enclosure of the microfluidic device further comprises a chamber that is fluidically connected to the flow region, and optionally, wherein the chamber opens off of the flow region.

Embodiment 17. The method of embodiment 16, wherein the flow region comprises a microfluidic channel and the chamber opens off of the microfluidic channel.

Embodiment 18. The method of embodiment 16 or 17, wherein the third position on the electrode activation substrate is located within the chamber.

Embodiment 19. The method of any one of embodiments 1 to 18, wherein the enclosure of the microfluidic device further comprises a sequestration pen, and optionally, wherein the sequestration pen opens laterally from the flow region.

Embodiment 20. The method of embodiment 19, wherein the flow region comprises a microfluidic channel and the sequestration pen opens laterally from the microfluidic channel.

Embodiment 21. The method of embodiment 19 or 20, wherein the third position on the electrode activation substrate is located within the sequestration pen (e.g., an isolation region of the sequestration pen).

Embodiment 22. The method of any one of embodiments 19 to 21, wherein the sequestration pen comprises an isolation region and a connection region that fluidically connects the isolation region to the flow region or microfluidic channel, wherein the connection region has a proximal opening to the flow region (or microfluidic channel) and a distal opening to the isolation region.

Embodiment 23. The method of any one of embodiments 16 to 22, wherein the first position is located in the flow region (or microfluidic channel) of the enclosure.

Embodiment 24. The method of any one of embodiments 1 to 23, wherein the light projected upon the first position by the first light beam has shape having a length, width, or diameter of at least 5 microns (e.g., at least 6 microns, at least 7 microns, at least 8 microns, at least 10 microns, at least 12 microns, at least 15 microns, or more) or a length, width or diameter that is about 5 microns to about 15 microns (e.g., about 5 microns to about 10 microns).

Embodiment 25. The method of any one of embodiments 16 to 24, wherein the light projected upon the first position by the first light beam has a length, width, or diameter that is smaller than a width of an opening to the chamber or the sequestration pen (e.g., smaller than Wcon of a proximal opening of a connection region of the sequestration pen).

Embodiment 26. The method of any one of embodiments 1 to 25, wherein the light projected upon the second position by the second light beam defines a shape having a length, width, or radius of at least 40 microns (e.g., at least 45 microns, at least 50 microns, at least 55 microns, at least 60 microns, at least 70 microns, at least 75 microns, or more) or a length, width or radius that is about 40 microns to about 80 microns (e.g., about 45 microns to about 75 microns, about 50 microns to about 70 microns, or about 55 microns to about 65 microns) and, optionally, wherein the length width, or radius of the defined shape increases during a period of time defined by an initial time (e.g., when the first and second light beams are first projected upon the electrode activation substrate), and a subsequent time (e.g., when the projected light of the first light beam arrives at the third position on the electrode activation substrate, or when the projected light of the first light beam reaches an opening to a chamber or sequestration pen).

Embodiment 27. The method of any one of embodiments 1 to 26, wherein the projecting of the first light beam ceases once the projected light of the first light beam reaches the third position.

Embodiment 28. The method of any one of embodiments 1 to 26, wherein the projecting of the first light beam ceases when the first micro-object is located in the chamber or the sequestration pen (e.g., an isolation region of the sequestration pen).

Embodiment 29. The method of any one of embodiments 16 to 28, wherein the projected light of the second light beam changes shape once a portion of the projected light of the second light beam reaches or enters an opening of the chamber or sequestration pen (e.g., a proximal opening of a connection region of the sequestration pen).

Embodiment 30. The method of embodiment 29, wherein the changed shape of the projected light of the second light beam activates a positive DEP force sufficient to move the captured second micro-objects away from the opening of the chamber or sequestration pen.

Embodiment 31. The method of embodiment 29, wherein the changed shape of the projected light of the second light beam activates a positive DEP force sufficient to move the captured second micro-objects away from a middle of the opening of the chamber or sequestration pen (e.g., away from a middle of a connection region of the sequestration pen, and optionally, towards a wall of the sequestration pen or edges of the proximal opening of the connection region).

Embodiment 32. The method of any one of embodiment 29 to 31, wherein the shape of the projected light of the second light beam continues to change as the projected light of the first light beam approaches and/or enters the opening of the chamber or sequestration pen.

Embodiment 33. The method of embodiment 32, wherein the continued change in shape of the projected light of the second light beam moves the captured second micro-objects into the flow region (or microfluidic channel) (e.g., away from the opening of the chamber, sequestration pen, or a proximal opening of a connection region of the sequestration pen).

Embodiment 34. The method of any one of embodiments 1 to 13, 16, 17, 19, and 20, wherein the third position is located in the flow region (or a microfluidic channel comprised by the flow region).

Embodiment 35. The method of embodiment 34, wherein the first position is located within a chamber fluidically connected to the flow region (or microfluidic channel) or within a sequestration pen fluidically connected to the flow region (or microfluidic channel).

Embodiment 36. The method of embodiment 35, wherein the light projected upon the first position by the first light beam has a length, width, or diameter that is smaller than a width of an opening from the chamber or sequestration pen to the flow region (or microfluidic channel) (e.g., small that a width Wcon of a proximal opening of a connection region of the sequestration pen of the microfluidic device).

Embodiment 37. The method of any one of embodiments 1 to 36, further comprising projecting light from a third light beam upon a fourth position on the electrode activation substrate, wherein the fourth position is located in or proximal to an opening of a chamber or a sequestration pen fluidically connected to the flow region (or microfluidic channel).

Embodiment 38. The method of embodiment 37, wherein the fourth position is adjacent to a wall, or a portion thereof, that defines, at least in part, the opening of the chamber or the sequestration pen and, optionally, wherein the projected light of the third light beam further illuminates the wall or the portion thereof.

Embodiment 39. The method of embodiment 37 or 38, wherein the third light beam activates a positive dielectrophoresis (DEP) force within the enclosure sufficient to capture one or more third micro-objects different from the first micro-object.

Embodiment 40. The method of any one of embodiments 37 to 39, further comprising moving the projected light of the third light beam and/or changing the shape of the projected light of the third light beam such that the third micro-object(s) move toward the flow region and, optionally, out of or away from the opening of the chamber or sequestration pen.

Embodiment 41. The method of any one of embodiments 37 or 40, wherein the projected light of the third light beam merges with the projected light of the second light beam at or near the opening of the chamber or sequestration pen (e.g., at or near a proximal opening of a connection region of the sequestration pen).

Embodiment 42. The method of any one of embodiments 37 to 41, wherein projecting the third light beam ceases after the third micro-object(s) is moved out or away from the opening of the chamber or the sequestration pen.

Embodiment 43. The method of any of embodiments 1 to 42, wherein the projected light of the first and second light beams move at substantially the same speed.

Embodiment 44. The method of any of embodiments 1 to 43, wherein the microfluidic device contains a plurality of chambers or a plurality of sequestration pens, and optionally, wherein each sequestration pen of the plurality contains an isolation region and a connection region.

Embodiment 45. The method of any of embodiments 1 to 44, further comprising projecting a plurality of first light beams on the electrode activation substrate to activate positive DEP forces sufficient to capture multiple first micro-objects.

Embodiment 46. The method of embodiment 45, further comprising projecting a plurality of second light beams on the electrode activation substrate to activate positive DEP forces sufficient to capture multiple second micro-objects other than the multiple first micro-objects.

Embodiment 47. The method of embodiment 46, wherein the projected light of each first light beam of the plurality of first light beams is moved to one of a corresponding plurality of third positions on the electrode activation substrate.

Embodiment 48. The method of embodiment 47, wherein each third position of the plurality of third positions is located in a unique chamber or sequestration pen (e.g., an isolation region of the sequestration pen).

Embodiment 49. The method of any one of embodiments 1 to 48, wherein the photoconductive layer of the electrode activation substrate comprises amorphous silicon.

Embodiment 50. The method of any one of embodiments 1 to 48, wherein the photoconductive layer of the electrode activation substrate comprises an array of phototransistors.

Embodiment 51. The method of any one of embodiments 1 to 48, wherein the photoconductive layer of the electrode activation substrate comprises an array of light-activated semiconductor switches.

Embodiment 52. The method of any one of embodiments 1 to 51 further comprising applying an electrical waveform to the microfluidic chip, wherein the electrical waveform is characterized by: a voltage of about 2.5 V to about 7.5 V (e.g., about 2.5 V to about 4.0 V, about 3.0 V to about 3.5 V, about 3.0 V to about 5.0 V, about 3.5 V to about 4.5V, about 3.5 V to about 5.5 V, about 4.0 V to about 5.0 V, about 4.0 V to about 6.0 V, about 4.5 V to about 5.5 V, about 4.5 V to about 6.5 V, about 5.0 V to about 6.0 V, about 5.0 V to about 7.0 V, about 5.5 V to about 6.5 V, about 5.5 V to about 7.5 V, about 6.0 V to about 7.0 V, about 6.0 V to about 8.0 V, or about 6.5 V to about 7.5 V); and/or a frequency of about 100 kHz to about 1000 kHz (e.g. about 100 kHz to about 500 kHz, about 400 kHz to about 800 kHz, about 100 kHz to about 300 kHz, about 200 kHz to about 400 kHz, about 300 kHz to about 500 kHz, about 400 kHz to about 600 kHz, about 500 kHz to about 700 kHz, about 600 kHz to about 800 kHz, about 700 kHz to about 900 kHz, or about 800 kHz to about 1000 kHz).

Embodiment 53. The method of any one of embodiments 1 to 52, wherein the first micro-object is a bacterial cell.

Embodiment 54. The method of any one of embodiments 1 to 52, wherein the first micro-object is a fungal cell, and optionally, a yeast cell (e.g., a cell of the genus *Saccharomyces* or *Pichia*).

Embodiment 55. The method of any one of embodiments 1 to 52, wherein the first micro-object is an animal cell, and optionally, a mammalian cell.

Embodiment 56. The method of any one of embodiments 1 to 55, wherein the first micro-object is a live cell.

Embodiment 57. The method of any one of embodiments 1 to 52, wherein the first micro-object is a capture bead.

Embodiment 58. The method of embodiment 57, wherein the capture bead comprises oligonucleotide sequences capable of binding to mRNA molecules and/or proteins (e.g., protein antigens, full-length proteins, or protein fragments, including functional protein fragments (i.e., fragments that are capable of at least one in vivo activity, such as forming a specific binding interaction).

Embodiment 59. The method of embodiment 57 or 58, wherein the capture bead comprises a barcode.

Embodiment 60. A system for performing a method of selectively positioning a first micro-object in a microfluidic device, the system comprising: an optical train having a structured light source; and a master controller having a control module (e.g., a processor) and a non-transitory computer accessible storage medium storing thereupon a sequence of instructions which, when executed by the control module (e.g., the processor), causes the control module (e.g., the processor) to perform any of the methods of embodiments 1 to 59.

Embodiment 61. The system of embodiment 60, further comprising: a media module; a motive module; an imaging module; a tilting module; and/or any other system module disclosed herein.

DETAILED DESCRIPTION

Figure 1A:
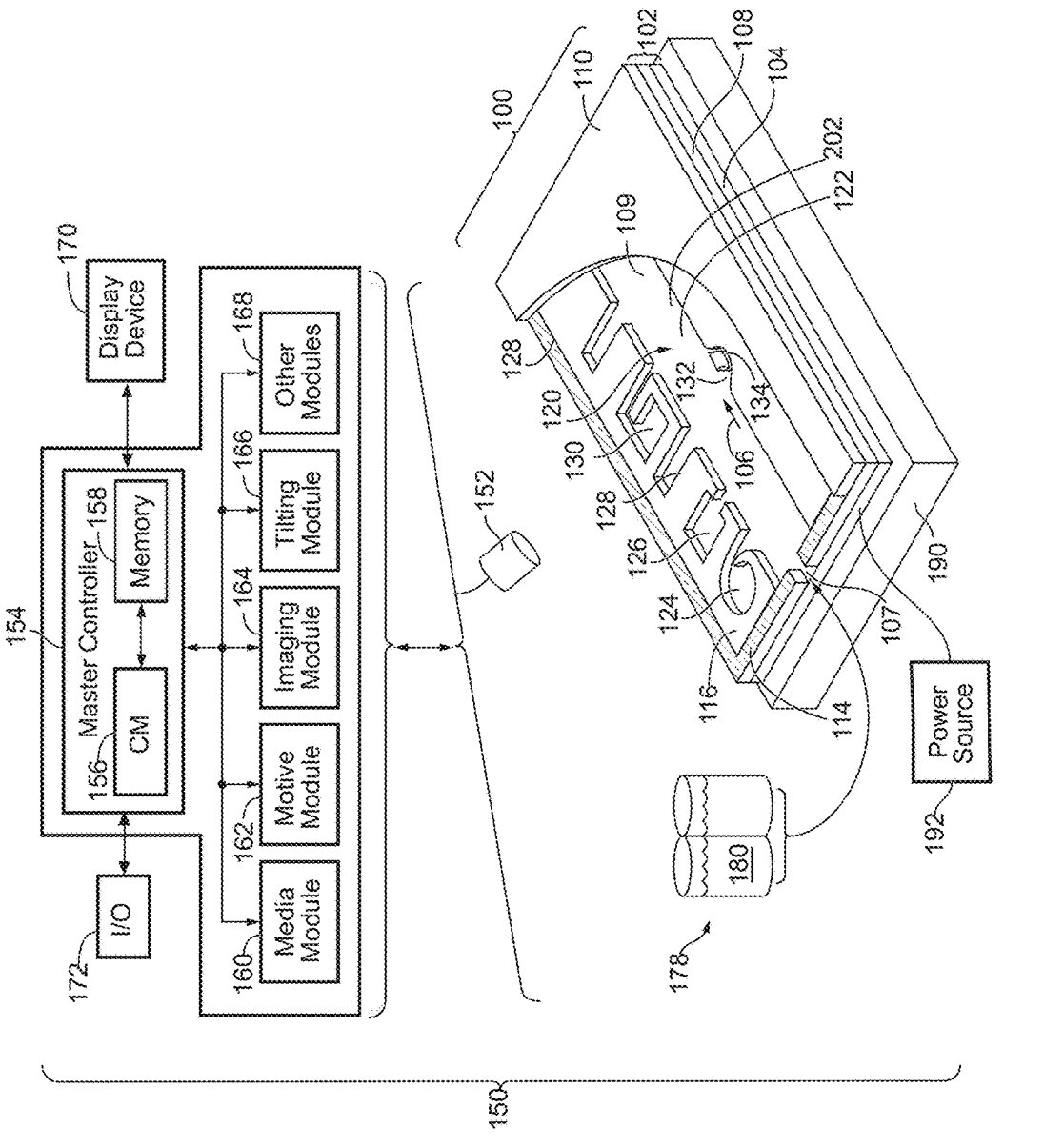
FIG. 1A illustrates a microfluidic device and a system with associated control equipment according to some embodiments of the disclosure.

This specification describes exemplary embodiments and applications of the disclosure. The disclosure, however, is not limited to these exemplary embodiments and applications or to the manner in which the exemplary embodiments and applications operate or are described herein. Moreover, the figures may show simplified or partial views, and the dimensions of elements in the figures may be exaggerated or otherwise not in proportion. In addition, as the terms "on," "attached to," "connected to," "coupled to," or similar words are used herein, one element (e.g., a material, a layer, a substrate, etc.) can be "on," "attached to," "connected to," or "coupled to" another element regardless of whether the one element is directly on, attached to, connected to, or coupled to the other element or there are one or more intervening elements between the one element and the other element. Also, unless the context dictates otherwise, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements. Section divisions in the specification are for ease of review only and do not limit any combination of elements discussed.

Where dimensions of microfluidic features are described as having a width or an area, the dimension typically is described relative to an x-axial and/or y-axial dimension, both of which lie within a plane that is parallel to the substrate and/or cover of the microfluidic device. The height of a microfluidic feature may be described relative to a z-axial direction, which is perpendicular to a plane that is parallel to the substrate and/or cover of the microfluidic device. In some instances, a cross sectional area of a microfluidic feature, such as a channel or a passageway, may be in reference to a x-axial/z-axial, a y-axial/z-axial, or an x-axial/y-axial area.

As used herein, "substantially" means sufficient to work for the intended purpose. The term "substantially" thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, "substantially" means within ten percent.

The term "ones" means more than one. As used herein, the term "plurality" can be 2, 3, 4, 5, 6, 7, 8, 9, 10, or more.

As used herein: $\mu m$ means micrometer, $\mu m^3$ means cubic micrometer, pL means picoliter, nL means nanoliter, and $\mu L$ (or uL) means microliter.

As used herein, "air" refers to the composition of gases predominating in the atmosphere of the earth. The four most plentiful gases are nitrogen (typically present at a concentration of about 78% by volume, e.g., in a range from about 70-80%), oxygen (typically present at about 20.95% by volume at sea level, e.g. in a range from about 10% to about 25%), argon (typically present at about 1.0% by volume, e.g. in a range from about 0.1% to about 3%), and carbon dioxide (typically present at about 0.04%, e.g., in a range from about 0.01% to about 0.07%). Air may have other trace gases such as methane, nitrous oxide or ozone, trace pollutants and organic materials such as pollen, diesel particulates and the like. Air may include water vapor (typically present at about 0.25%, or may be present in a range from about 10 ppm to about 5% by volume). Air may be provided for use in culturing experiments as a filtered, controlled composition and may be conditioned as described herein.

As used herein, the term "disposed" encompasses within its meaning "located."

As used herein, a "microfluidic device" or "microfluidic apparatus" is a device that includes one or more discrete microfluidic circuits configured to hold a fluid, each microfluidic circuit comprised of fluidically interconnected circuit elements, including but not limited to region(s), flow path(s), channel(s), chamber(s), and/or pen(s), and at least one port configured to allow the fluid (and, optionally, micro-objects suspended in the fluid) to flow into and/or out of the microfluidic device. Typically, a microfluidic circuit of a microfluidic device will include a flow region, which may include a microfluidic channel, and at least one chamber, and will hold a volume of fluid of less than about 1 mL, e.g., less than about 750, 500, 250, 200, 150, 100, 75, 50, 25, 20, 15, 10, 9, 8, 7, 6, 5, 4, 3, or 2 $\mu L$. In certain embodiments, the microfluidic circuit holds about 1-2, 1-3, 1-4, 1-5, 2-5, 2-8, 2-10, 2-12, 2-15, 2-20, 5-20, 5-30, 5-40, 5-50, 10-50, 10-75, 10-100, 20-100, 20-150, 20-200, 50-200, 50-250, or 50-300 µL. The microfluidic circuit may be configured to have a first end fluidically connected with a first port (e.g., an inlet) in the microfluidic device and a second end fluidically connected with a second port (e.g., an outlet) in the microfluidic device.

As used herein, a "nanofluidic device" or "nanofluidic apparatus" is a type of microfluidic device having a microfluidic circuit that contains at least one circuit element configured to hold a volume of fluid of less than about 1 µL, e.g., less than about 750, 500, 250, 200, 150, 100, 75, 50, 25, 20, 15, 10, 9, 8, 7, 6, 5, 4, 3, 2, 1 nL or less. A nanofluidic device may comprise a plurality of circuit elements (e.g., at least 2, 3, 4, 5, 6, 7, 8, 9, 10, 15, 20, 25, 50, 75, 100, 150, 200, 250, 300, 400, 500, 600, 700, 800, 900, 1000, 1500, 2000, 2500, 3000, 3500, 4000, 4500, 5000, 6000, 7000, 8000, 9000, 10,000, or more). In certain embodiments, one or more (e.g., all) of the at least one circuit elements is configured to hold a volume of fluid of about 100 µL to 1 nL, 100 µL to 2 nL, 100 µL to 5 nL, 250 µL to 2 nL, 250 µL to 5 nL, 250 µL to 10 nL, 500 µL to 5 nL, 500 µL to 10 nL, 500 µL to 15 nL, 750 µL to 10 nL, 750 µL to 15 nL, 750 µL to 20 nL, 1 to 10 nL, 1 to 15 nL, 1 to 20 nL, 1 to 25 nL, or 1 to 50 nL. In other embodiments, one or more (e.g., all) of the at least one circuit elements are configured to hold a volume of fluid of about 20 nL to 200 nL, 100 to 200 nL, 100 to 300 nL, 100 to 400 nL, 100 to 500 nL, 200 to 300 nL, 200 to 400 nL, 200 to 500 nL, 200 to 600 nL, 200 to 700 nL, 250 to 400 nL, 250 to 500 nL, 250 to 600 nL, or 250 to 750 nL.

A microfluidic device or a nanofluidic device may be referred to herein as a "microfluidic chip" or a "chip"; or "nanofluidic chip" or "chip".

A "microfluidic channel" or "flow channel" as used herein refers to flow region of a microfluidic device having a length that is significantly longer than both the horizontal and vertical dimensions. For example, the flow channel can be at least 5 times the length of either the horizontal or vertical dimension, e.g., at least 10 times the length, at least 25 times the length, at least 100 times the length, at least 200 times the length, at least 500 times the length, at least 1,000 times the length, at least 5,000 times the length, or longer. In some embodiments, the length of a flow channel is about 100,000 microns to about 500,000 microns, including any value therebetween. In some embodiments, the horizontal dimension is about 100 microns to about 1000 microns (e.g., about 150 to about 500 microns) and the vertical dimension is about 25 microns to about 200 microns, (e.g., from about 40 to about 150 microns). It is noted that a flow channel may have a variety of different spatial configurations in a microfluidic device, and thus is not restricted to a perfectly linear element. For example, a flow channel may be, or include one or more sections having, the following configurations: curve, bend, spiral, incline, decline, fork (e.g., multiple different flow paths), and any combination thereof. In addition, a flow channel may have different cross-sectional areas along its path, widening and constricting to provide a desired fluid flow therein. The flow channel may include valves, and the valves may be of any type known in the art of microfluidics. Examples of microfluidic channels that include valves are disclosed in U.S. Pat. Nos. 6,408,878 and 9,227, 200, each of which is herein incorporated by reference in its entirety.

As used herein, the term "transparent" refers to a material which allows visible light to pass through without substantially altering the light as is passes through.

As used herein, "brightfield" illumination and/or image refers to white light illumination of the microfluidic field of view from a broad-spectrum light source, where contrast is formed by absorbance of light by objects in the field of view.

As used herein, "structured light" is projected light that is modulated to provide one or more illumination effects. A first illumination effect may be projected light illuminating a portion of a surface of a device without illuminating (or at least minimizing illumination of) an adjacent portion of the surface, e.g., a projected light pattern, as described more fully below, used to activate DEP forces within a DEP substrate. When using structured light patterns to activate DEP forces, the intensity, e.g., variation in duty cycle of a structured light modulator such as a DMD, may be used to change the optical power applied to the light activated DEP actuators, and thus change DEP force without changing the nominal voltage or frequency. Another illumination effect that may be produced by structured light includes projected light that may be corrected for surface irregularities and for irregularities associated with the light projection itself, e.g., fall-off at the edge of an illuminated field. Structured light is typically generated by a structured light modulator, such as a digital mirror device (DMD), a microshutter array system (MSA), a liquid crystal display (LCD), or the like. Illumination of a small area of the surface, e.g., a selected area of interest, with structured light improves the signal-to-noise-ratio (SNR), as illumination of only the selected area of interest reduces stray/scattered light, thereby lowering the dark level of the image. An important aspect of structured light is that it may be changed quickly over time. A light pattern from the structured light modulator, e.g., DMD, may be used to autofocus on difficult targets such as clean mirrors or surfaces that are far out of focus. Using a clean mirror, a number of self-test features may be replicated such as measurement of modulation transfer function and field curvature/tilt, without requiring a more expensive Shack-Hartmann sensor. In another use of structured light patterns, spatial power distribution may be measured at the sample surface with a simple power meter, in place of a camera. Structured light patterns may also be used as a reference feature for optical module/system component alignment as well used as a manual readout for manual focus. Another illumination effect made possible by use of structured light patterns is selective curing, e.g., solidification of hydrogels within the microfluidic device.

As used herein, to "illuminate" a micro-object means to shine light upon the micro-object such that the light is incident upon the micro-object; and to "completely illuminate" a micro-object means to shine light upon the micro-object and a portion of the substrate of the microfluidic device that completely surrounds the micro-object.

As used herein, the term "micro-object" refers generally to any microscopic object that may be isolated and/or manipulated in accordance with the present disclosure. Non-limiting examples of micro-objects include: inanimate micro-objects such as microparticles; microbeads (e.g., polystyrene beads, glass beads, amorphous solid substrates, Luminex™ beads, or the like); magnetic beads; microrods; microwires; quantum dots, and the like; biological micro-objects such as cells; biological organelles; vesicles, or complexes; synthetic vesicles; liposomes (e.g., synthetic or derived from membrane preparations); lipid nanorafts, and the like; or a combination of inanimate micro-objects and biological micro-objects (e.g., microbeads attached to cells, liposome-coated micro-beads, liposome-coated magnetic beads, or the like). Beads may include moieties/molecules covalently or non-covalently attached, such as fluorescent labels, proteins (including receptor molecules), carbohydrates, antigens, small molecule signaling moieties, or other chemical/biological species capable of use in an assay. In some variations, beads/solid substrates including moieties/molecules may be capture beads, e.g., configured to bind molecules including small molecules, peptides, proteins or nucleic acids present in proximity either selectively or nonselectively. In one nonlimiting example, a capture bead may include a nucleic acid sequence configured to bind nucleic acids having a specific nucleic acid sequence or the nucleic acid sequence of the capture bead may be configured to bind a set of nucleic acids having related nucleic acid sequences. Either type of binding may be understood to be selective. Capture beads containing moieties/molecules may bind nonselectively when binding of structurally different but physico-chemically similar molecules is performed, for example, size exclusion beads or zeolites configured to capture molecules of selected size or charge. Lipid nanorafts have been described, for example, in Ritchie et al. (2009) "Reconstitution of Membrane Proteins in Phospholipid Bilayer Nanodiscs," Methods Enzymol., 464:211-231.

As used herein, the term "cell" is used interchangeably with the term "biological cell." Non-limiting examples of biological cells include eukaryotic cells, plant cells, animal cells, such as mammalian cells, reptilian cells, avian cells, fish cells, or the like, prokaryotic cells, bacterial cells, fungal cells, protozoan cells, or the like, cells dissociated from a tissue, such as muscle, cartilage, fat, skin, liver, lung, neural tissue, and the like, immunological cells, such as T cells, B cells, natural killer cells, macrophages, and the like, embryos (e.g., zygotes), oocytes, ova, sperm cells, hybridomas, cultured cells, cells from a cell line, cancer cells, infected cells, transfected and/or transformed cells, reporter cells, and the like. A mammalian cell can be, for example, from a human, a mouse, a rat, a horse, a goat, a sheep, a cow, a primate, or the like.

A colony of biological cells is "clonal" if all of the living cells in the colony that are capable of reproducing are daughter cells derived from a single parent cell. In certain embodiments, all the daughter cells in a clonal colony are derived from the single parent cell by no more than 10 divisions. In other embodiments, all the daughter cells in a clonal colony are derived from the single parent cell by no more than 14 divisions. In other embodiments, all the daughter cells in a clonal colony are derived from the single parent cell by no more than 17 divisions. In other embodiments, all the daughter cells in a clonal colony are derived from the single parent cell by no more than 20 divisions. The term "clonal cells" refers to cells of the same clonal colony.

As used herein, a "colony" of biological cells refers to 2 or more cells (e.g. about 2 to about 20, about 4 to about 40, about 6 to about 60, about 8 to about 80, about 10 to about 100, about 20 to about 200, about 40 to about 400, about 60 to about 600, about 80 to about 800, about 100 to about 1000, or greater than 1000 cells).

As used herein, the term "maintaining (a) cell(s)" refers to providing an environment comprising both fluidic and gaseous components and, optionally a surface, that provides the conditions necessary to keep the cells viable and/or expanding.

As used herein, the term "expanding" when referring to cells, refers to increasing in cell number.

As referred to herein, "gas permeable" means that the material or structure is permeable to at least one of oxygen, carbon dioxide, or nitrogen. In some embodiments, the gas permeable material or structure is permeable to more than one of oxygen, carbon dioxide and nitrogen and may further be permeable to all three of these gases.

A "component" of a fluidic medium is any chemical or biochemical molecule present in the medium, including solvent molecules, ions, small molecules, antibiotics, nucleotides and nucleosides, nucleic acids, amino acids, peptides, proteins, sugars, carbohydrates, lipids, fatty acids, cholesterol, metabolites, or the like.

As used herein in reference to a fluidic medium, "diffuse" and "diffusion" refer to thermodynamic movement of a component of the fluidic medium down a concentration gradient.

The phrase "flow of a medium" means bulk movement of a fluidic medium primarily due to any mechanism other than diffusion, and may encompass perfusion. For example, flow of a medium can involve movement of the fluidic medium from one point to another point due to a pressure differential between the points. Such flow can include a continuous, pulsed, periodic, random, intermittent, or reciprocating flow of the liquid, or any combination thereof. When one fluidic medium flows into another fluidic medium, turbulence and mixing of the media can result. Flowing can comprise pulling solution through and out of the microfluidic channel (e.g., aspirating) or pushing fluid into and through a microfluidic channel (e.g. perfusing).

The phrase "substantially no flow" refers to a rate of flow of a fluidic medium that, when averaged over time, is less than the rate of diffusion of components of a material (e.g., an analyte of interest) into or within the fluidic medium. The rate of diffusion of components of such a material can depend on, for example, temperature, the size of the components, and the strength of interactions between the components and the fluidic medium.

As used herein in reference to different regions within a microfluidic device, the phrase "fluidically connected" means that, when the different regions are substantially filled with fluid, such as fluidic media, the fluid in each of the regions is connected so as to form a single body of fluid. This does not mean that the fluids (or fluidic media) in the different regions are necessarily identical in composition. Rather, the fluids in different fluidically connected regions of a microfluidic device can have different compositions (e.g., different concentrations of solutes, such as proteins, carbohydrates, ions, or other molecules) which are in flux as solutes move down their respective concentration gradients and/or fluids flow through the device.

As used herein, a "flow path" refers to one or more fluidically connected circuit elements (e.g. channel(s), region(s), chamber(s) and the like) that define, and are subject to, the trajectory of a flow of medium. A flow path is thus an example of a swept region of a microfluidic device. Other circuit elements (e.g., unswept regions) may be fluidically connected with the circuit elements that comprise the flow path without being subject to the flow of medium in the flow path.

As used herein, "isolating a micro-object" confines a micro-object to a defined area within the microfluidic device.

As used herein, "pen" or "penning" refers to disposing micro-objects within a chamber (e.g., a sequestration pen) within the microfluidic device. Forces used to pen a micro-object may be any suitable force as described herein such as dielectrophoresis (DEP), e.g., an optically actuated dielectrophoretic force (OEP); gravity; magnetic forces; locally actuated fluid flow; or tilting. In some embodiments, penning a plurality of micro-objects may reposition substantially all the micro-objects. In some other embodiments, a selected number of the plurality of micro-objects may be penned, and the remainder of the plurality may not be penned. In some embodiments, when selected micro-objects are penned, a DEP force, e.g., an optically actuated DEP force or a magnetic force may be used to reposition the selected micro-objects. Typically micro-objects may be introduced to a flow region, e.g., a microfluidic channel, of the microfluidic device and introduced into a chamber by penning.

As used herein, "unpen" or "unpenning" refers to repositioning micro-objects from within a chamber, e.g., a sequestration pen, to a new location within a flow region, e.g., a microfluidic channel, of the microfluidic device. Forces used to unpen a micro-object may be any suitable force as described herein such as dielectrophoresis, e.g., an optically actuated dielectrophoretic force; gravity; magnetic forces; locally actuated fluid flow; or tilting. In some embodiments, unpenning a plurality of micro-objects may reposition substantially all the micro-objects. In some other embodiments, a selected number of the plurality of micro-objects may be unpenned, and the remainder of the plurality may not be unpenned. In some embodiments, when selected micro-objects are unpenned, a DEP force, e.g., an optically actuated DEP force or a magnetic force may be used to reposition the selected micro-objects.

As used herein, "export" or "exporting" can include or consist of repositioning micro-objects from a location within a flow region, e.g., a microfluidic channel, of a microfluidic device to a location outside of the microfluidic device, such as a 96 well plate or other receiving vessel. The orientation of the chamber(s) having an opening to the microfluidic channel permits easy export of micro-objects that have been positioned or repositioned (e.g., unpenned from a chamber) to be disposed within the microfluidic channel. In some embodiments, micro-objects within the microfluidic channel may be exported without requiring disassembly (e.g., removal of the cover of the device) or insertion of a tool into the chamber(s) or microfluidic channel to remove micro-objects for further processing. "Export" or "exporting" may comprise "unpen" or "unpenning" as described above, and may further comprise repositioning micro-objects from within a chamber, which may include a sequestration pen, to a new location within a flow region, e.g., a microfluidic channel, of a microfluidic device.

A microfluidic (or nanofluidic) device can comprise "swept" regions and "unswept" regions. As used herein, a "swept" region is comprised of one or more fluidically interconnected circuit elements of a microfluidic circuit, each of which experiences a flow of medium when fluid is flowing through the microfluidic circuit. The circuit elements of a swept region can include, for example, regions, channels, and all or parts of chambers. As used herein, an "unswept" region is comprised of one or more fluidically interconnected circuit element of a microfluidic circuit, each of which experiences substantially no flux of fluid when fluid is flowing through the microfluidic circuit. An unswept region can be fluidically connected to a swept region, provided the fluidic connections are structured to enable diffusion but substantially no flow of media between the swept region and the unswept region. The microfluidic device can thus be structured to substantially isolate an unswept region from a flow of medium in a swept region, while enabling substantially only diffusive fluidic communication between the swept region and the unswept region. For example, a flow channel of a micro-fluidic device is an example of a swept region while an isolation region (described in further detail below) of a microfluidic device is an example of an unswept region.

As used herein, a "non-sweeping" rate of fluidic medium flow means a rate of flow sufficient to permit components of a second fluidic medium in an isolation region of the sequestration pen to diffuse into the first fluidic medium in the flow region and/or components of the first fluidic medium to diffuse into the second fluidic medium in the isolation region; and further wherein the first medium does not substantially flow into the isolation region.

Microfluidic device/system feature cross-applicability. It should be appreciated that various features of microfluidic devices, systems, and motive technologies described herein may be combinable or interchangeable. For example, features described herein with reference to the microfluidic device 100, 175, 200, 300, 400, 520 and system attributes as described in FIGS. 1A-5B may be combinable or interchangeable.

Microfluidic devices. FIG. 1A illustrates an example of a microfluidic device 100. A perspective view of the microfluidic device 100 is shown having a partial cut-away of its cover 110 to provide a partial view into the microfluidic device 100. The microfluidic device 100 generally comprises a microfluidic circuit 120 comprising a flow path 106 through which a fluidic medium 180 can flow, optionally carrying one or more micro-objects (not shown) into and/or through the microfluidic circuit 120.

As generally illustrated in FIG. 1A, the microfluidic circuit 120 is defined by an enclosure 102. Although the enclosure 102 can be physically structured in different configurations, in the example shown in FIG. 1A the enclosure 102 is depicted as comprising a support structure 104 (e.g., a base), a microfluidic circuit structure 108, and a cover 110. The support structure 104, microfluidic circuit structure 108, and cover 110 can be attached to each other. For example, the microfluidic circuit structure 108 can be disposed on an inner surface 109 of the support structure 104, and the cover 110 can be disposed over the microfluidic circuit structure 108. Together with the support structure 104 and cover 110, the microfluidic circuit structure 108 can define the elements of the microfluidic circuit 120, forming a three-layer structure.

The support structure 104 can be at the bottom and the cover 110 at the top of the microfluidic circuit 120 as illustrated in FIG. 1A. Alternatively, the support structure 104 and the cover 110 can be configured in other orientations. For example, the support structure 104 can be at the top and the cover 110 at the bottom of the microfluidic circuit 120. Regardless, there can be one or more ports 107 each comprising a passage into or out of the enclosure 102. Examples of a passage include a valve, a gate, a pass-through hole, or the like. As illustrated, port 107 is a pass-through hole created by a gap in the microfluidic circuit structure 108. However, the port 107 can be situated in other components of the enclosure 102, such as the cover 110. Only one port 107 is illustrated in FIG. 1A but the microfluidic circuit 120 can have two or more ports 107. For example, there can be a first port 107 that functions as an inlet for fluid entering the microfluidic circuit 120, and there can be a second port 107 that functions as an outlet for fluid exiting the microfluidic circuit 120. Whether a port 107 function as an inlet or an outlet can depend upon the direction that fluid flows through flow path 106.

The support structure 104 can comprise one or more electrodes (not shown) and a substrate or a plurality of interconnected substrates. For example, the support structure 104 can comprise one or more semiconductor substrates, each of which is electrically connected to an electrode (e.g., all or a subset of the semiconductor substrates can be electrically connected to a single electrode). The support structure 104 can further comprise a printed circuit board assembly ("PCBA"). For example, the semiconductor substrate(s) can be mounted on a PCBA.

The microfluidic circuit structure 108 can define circuit elements of the microfluidic circuit 120. Such circuit elements can comprise spaces or regions that can be fluidly interconnected when microfluidic circuit 120 is filled with fluid, such as flow regions (which may include or be one or more flow channels), chambers (which class of circuit elements may also include sub-classes including sequestration pens), traps, and the like. Circuit elements can also include barriers, and the like. In the microfluidic circuit 120 illustrated in FIG. 1A, the microfluidic circuit structure 108 comprises a frame 114 and a microfluidic circuit material 116. The frame 114 can partially or completely enclose the microfluidic circuit material 116. The frame 114 can be, for example, a relatively rigid structure substantially surrounding the microfluidic circuit material 116. For example, the frame 114 can comprise a metal material. However, the microfluidic circuit structure need not include a frame 114. For example, the microfluidic circuit structure can consist of (or consist essentially of) the microfluidic circuit material 116.

The microfluidic circuit material 116 can be patterned with cavities or the like to define the circuit elements and interconnections of the microfluidic circuit 120, such as chambers, pens and microfluidic channels. The microfluidic circuit material 116 can comprise a flexible material, such as a flexible polymer (e.g. rubber, plastic, elastomer, silicone, polydimethylsiloxane ("PDMS"), or the like), which can be gas permeable. Other examples of materials that can form the microfluidic circuit material 116 include molded glass, an etchable material such as silicone (e.g. photo-patternable silicone or "PPS"), photo-resist (e.g., SU8), or the like. In some embodiments, such materials—and thus the microfluidic circuit material 116—can be rigid and/or substantially impermeable to gas. Regardless, microfluidic circuit material 116 can be disposed on the support structure 104 and inside the frame 114.

The microfluidic circuit 120 can include a flow region in which one or more chambers can be disposed and/or fluidically connected thereto. A chamber can have one or more openings fluidically connecting the chamber with one or more flow regions. In some embodiments, a flow region comprises or corresponds to a microfluidic channel 122. Although a single microfluidic circuit 120 is illustrated in FIG. 1A, suitable microfluidic devices can include a plurality (e.g., 2 or 3) of such microfluidic circuits. In some embodiments, the microfluidic device 100 can be configured to be a nanofluidic device. As illustrated in FIG. 1A, the microfluidic circuit 120 may include a plurality of microfluidic sequestration pens 124, 126, 128, and 130, where each sequestration pens may have one or more openings. In some embodiments of sequestration pens, a sequestration pen may have only a single opening in fluidic communication with the flow path 106. In some other embodiments, a sequestration pen may have more than one opening in fluidic communication with the flow path 106, e.g., n number of openings, but with n−1 openings that are valved, such that all but one opening is closable. When all the valved openings are closed, the sequestration pen limits exchange of materials from the flow region into the sequestration pen to occur only by diffusion. In some embodiments, the sequestration pens comprise various features and structures (e.g., isolation regions) that have been optimized for retaining micro-objects within the sequestration pen (and therefore within a microfluidic device such as microfluidic device 100) even when a medium 180 is flowing through the flow path 106.

The cover 110 can be an integral part of the frame 114 and/or the microfluidic circuit material 116. Alternatively, the cover 110 can be a structurally distinct element, as illustrated in FIG. 1A. The cover 110 can comprise the same or different materials than the frame 114 and/or the microfluidic circuit material 116. In some embodiments, the cover 110 can be an integral part of the microfluidic circuit material 116. Similarly, the support structure 104 can be a separate structure from the frame 114 or microfluidic circuit material 116 as illustrated, or an integral part of the frame 114 or microfluidic circuit material 116. Likewise, the frame 114 and microfluidic circuit material 116 can be separate structures as shown in FIG. 1A or integral portions of the same structure. Regardless of the various possible integrations, the microfluidic device can retain a three-layer structure that includes a base layer and a cover layer that sandwich a middle layer in which the microfluidic circuit 120 is located.

In some embodiments, the cover 110 can comprise a rigid material. The rigid material may be glass or a material with similar properties. In some embodiments, the cover 110 can comprise a deformable material. The deformable material can be a polymer, such as PDMS. In some embodiments, the cover 110 can comprise both rigid and deformable materials. For example, one or more portions of cover 110 (e.g., one or more portions positioned over sequestration pens 124, 126, 128, 130) can comprise a deformable material that interfaces with rigid materials of the cover 110. Microfluidic devices having covers that include both rigid and deformable materials have been described, for example, in U.S. Pat. No. 10,058,865 (Breinlinger et al.), the contents of which are incorporated herein by reference. In some embodiments, the cover 110 can further include one or more electrodes. The one or more electrodes can comprise a conductive oxide, such as indium-tin-oxide (ITO), which may be coated on glass or a similarly insulating material. Alternatively, the one or more electrodes can be flexible electrodes, such as single-walled nanotubes, multi-walled nanotubes, nanowires, clusters of electrically conductive nanoparticles, or combinations thereof, embedded in a deformable material, such as a polymer (e.g., PDMS). Flexible electrodes that can be used in microfluidic devices have been described, for example, in U.S. Pat. No. 9,227,200 (Chiou et al.), the contents of which are incorporated herein by reference. In some embodiments, the cover 110 and/or the support structure 104 can be transparent to light. The cover 110 may also include at least one material that is gas permeable (e.g., PDMS or PPS).

In the example shown in FIG. 1A, the microfluidic circuit 120 is illustrated as comprising a microfluidic channel 122 and sequestration pens 124, 126, 128, 130. Each pen comprises an opening to channel 122, but otherwise is enclosed such that the pens can substantially isolate micro-objects inside the pen from fluidic medium 180 and/or micro-objects in the flow path 106 of channel 122 or in other pens. The walls of the sequestration pen extend from the inner surface 109 of the base to the inside surface of the cover 110 to provide enclosure. The opening of the sequestration pen to the microfluidic channel 122 is oriented at an angle to the flow 106 of fluidic medium 180 such that flow 106 is not directed into the pens. The vector of bulk fluid flow in channel 122 may be tangential or parallel to the plane of the opening of the sequestration pen, and is not directed into the opening of the pen. In some instances, pens 124, 126, 128, 130 are configured to physically isolate one or more micro-objects within the microfluidic circuit 120. Sequestration pens in accordance with the present disclosure can comprise various shapes, surfaces and features that are optimized for use with DEP, OET, OEW, fluid flow, magnetic forces, centripetal, and/or gravitational forces, as will be discussed and shown in detail below.

The microfluidic circuit 120 may comprise any number of microfluidic sequestration pens. Although five sequestration pens are shown, microfluidic circuit 120 may have fewer or more sequestration pens. As shown, microfluidic sequestration pens 124, 126, 128, and 130 of microfluidic circuit 120 each comprise differing features and shapes which may provide one or more benefits useful for maintaining, isolating, assaying or culturing biological micro-objects. In some embodiments, the microfluidic circuit 120 comprises a plurality of identical microfluidic sequestration pens.

Figure 1B:
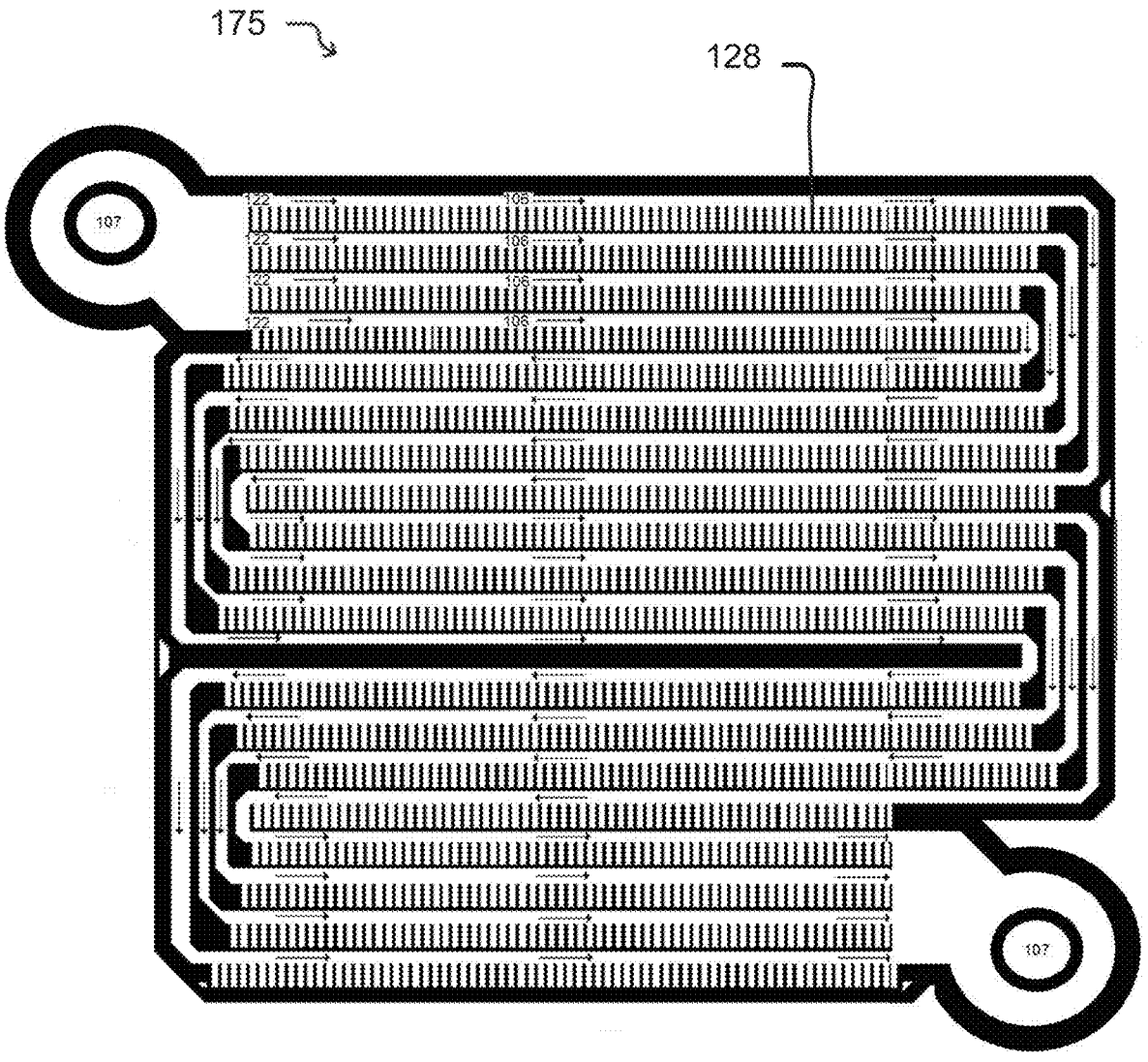
FIG. 1B illustrates a microfluidic device with sequestration pens according to an embodiment of the disclosure.

In the embodiment illustrated in FIG. 1A, a single flow path 106 containing a single channel 122 is shown. However, other embodiments may contain multiple channels 122 within a single flow path 106, as shown in FIG. 1B. The microfluidic circuit 120 further comprises an inlet valve or port 107 in fluid communication with the flow path 106, whereby fluidic medium 180 can access the flow path 106 (and channel 122). In some instances, the flow path 106 comprises a substantially straight path. In other instances, the flow path 106 is arranged in a non-linear or winding manner, such as a zigzag pattern, whereby the flow path 106 travels across the microfluidic device 100 two or more times, e.g., in alternating directions. The flow in the flow path 106 may proceed from inlet to outlet or may be reversed and proceed from outlet to inlet.

One example of a multi-channel device, microfluidic device 175, is shown in FIG. 1, which may be like microfluidic device 100 in other respects. Microfluidic device 175 and its constituent circuit elements (e.g., channels 122 and sequestration pens 128) may have any of the dimensions discussed herein. The microfluidic circuit illustrated in FIG. 1B has two inlet/outlet ports 107 and a flow path 106 containing four distinct channels 122. The number of channels into which the microfluidic circuit is sub-divided may be chosen to reduce fluidic resistance. For example, the microfluidic circuit may include 1, 2, 3, 4, 5, 6, 7, 8, 9, 10, or more channels to provide a selected range of fluidic resistance. Microfluidic device 175 further comprises a plurality of sequestration pens opening off of each channel 122, where each of the sequestration pens is similar to sequestration pen 128 of FIG. 1A, and may have any of the dimensions or functions of any sequestration pen as described herein. However, the sequestration pens of microfluidic device 175 can have different shapes, such as any of the shapes of sequestration pens 124, 126, or 130 of FIG. 1A or as described anywhere else herein. Moreover, microfluidic device 175 can include sequestration pens having a mixture of different shapes. In some instances, a plurality of sequestration pens is configured (e.g., relative to a channel 122) such that the sequestration pens can be loaded with target micro-objects in parallel.

Returning to FIG. 1A, microfluidic circuit 120 further may include one or more optional micro-object traps 132. The optional traps 132 may be formed in a wall forming the boundary of a channel 122, and may be positioned opposite an opening of one or more of the microfluidic sequestration pens 124, 126, 128, 130. The optional traps 132 may be configured to receive or capture a single micro-object from the flow path 106, or may be configured to receive or capture a plurality of micro-objects from the flow path 106. In some instances, the optional traps 132 comprise a volume approximately equal to the volume of a single target micro-object.

Sequestration pens. The microfluidic devices described herein may include one or more sequestration pens, where each sequestration pen is suitable for holding one or more micro-objects (e.g., biological cells, or groups of cells that are associated together). The sequestration pens may be disposed within and open to a flow region, which in some embodiments is a microfluidic channel. Each of the sequestration pens can have one or more openings for fluidic communication to one or more microfluidic channels. In some embodiments, a sequestration pen may have only one opening to a microfluidic channel.

Figure 2A:
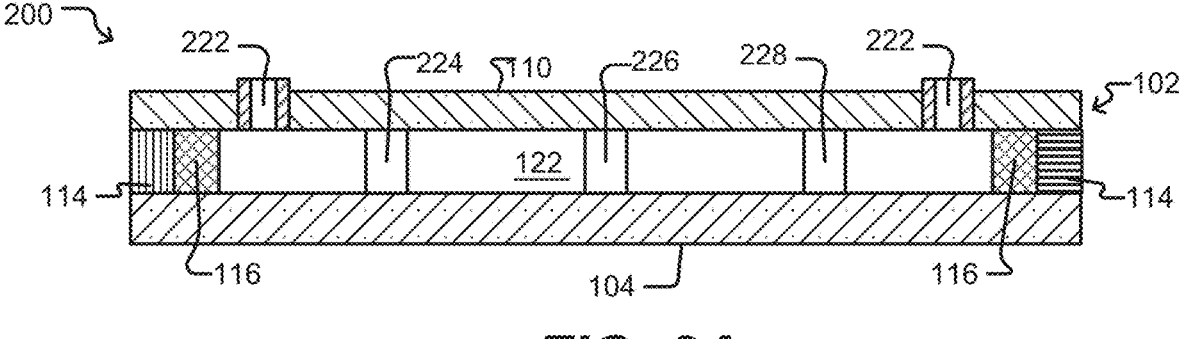
FIGS. 2A to 2B illustrate a microfluidic device having sequestration pens according to some embodiments of the disclosure.
Figure 2B:
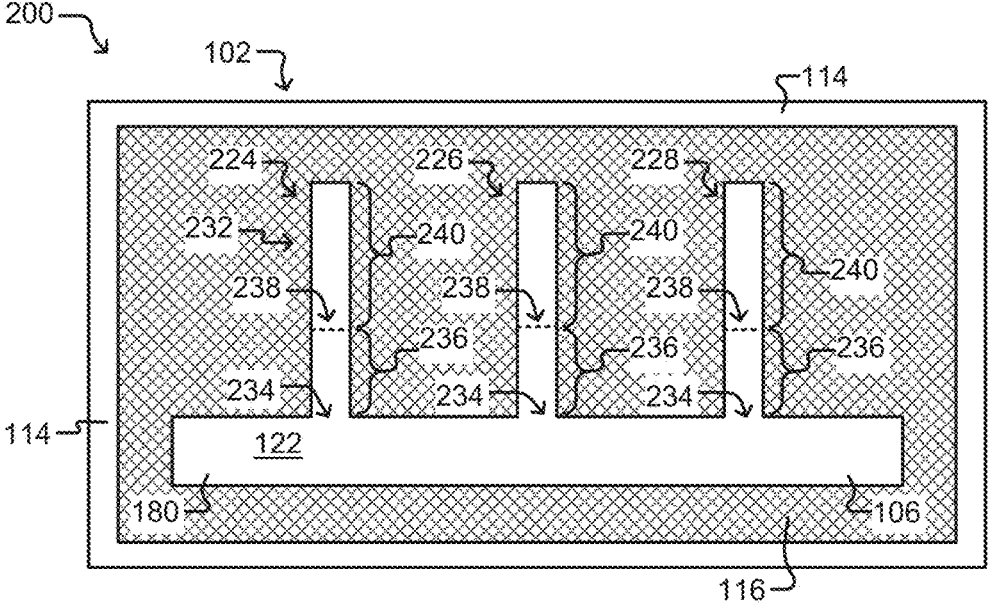
Figure 2C:
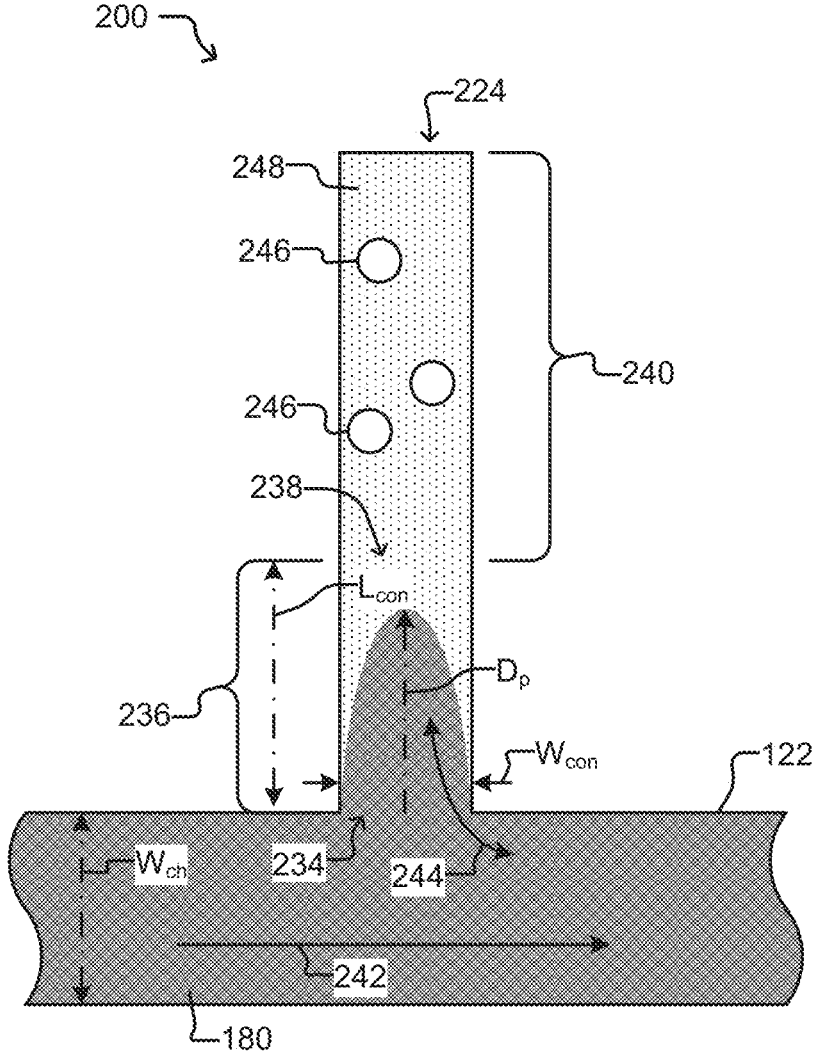
FIG. 2C illustrates a sequestration pen of a microfluidic device according to some embodiments of the disclosure.

FIGS. 2A-2C show sequestration pens 224, 226, and 228 of a microfluidic device 200, which may be like sequestration pen 128 of FIG. 1A. Each sequestration pen 224, 226, and 228 can comprise an isolation region 240 and a connection region 236 fluidically connecting the isolation region 240 to a flow region, which may, in some embodiments include a microfluidic channel, such as channel 122. The connection region 236 can comprise a proximal opening 234 to the flow region (e.g., microfluidic channel 122) and a distal opening 238 to the isolation region 240. The connection region 236 can be configured so that the maximum penetration depth of a flow of a fluidic medium (not shown) flowing in the microfluidic channel 122 past the sequestration pen 224, 226, and 228 does not extend into the isolation region 240, as discussed below for FIG. 2C. In some embodiments, streamlines from the flow in the microfluidic channel do not enter the isolation region. Thus, due to the connection region 236, a micro-object (not shown) or other material (not shown) disposed in the isolation region 240 of a sequestration pen 224, 226, and 228 can be isolated from, and not substantially affected by, a flow of fluidic medium 180 in the microfluidic channel 122.

The sequestration pens 224, 226, and 228 of FIGS. 2A-2C each have a single opening which opens directly to the microfluidic channel 122. The opening of the sequestration pen may open laterally from the microfluidic channel 122, as shown in FIG. 2A, which depicts a vertical cross-section of microfluidic device 200. FIG. 2B shows a horizontal cross-section of microfluidic device 200. An electrode activation substrate 206 can underlie both the microfluidic channel 122 and the sequestration pens 224, 226, and 228. The upper surface of the electrode activation substrate 206 within an enclosure of a sequestration pen, forming the floor of the sequestration pen, can be disposed at the same level or substantially the same level of the upper surface the of electrode activation substrate 206 within the microfluidic channel 122 (or flow region if a channel is not present), forming the floor of the flow channel (or flow region, respectively) of the microfluidic device. The electrode activation substrate 206 may be featureless or may have an irregular or patterned surface that varies from its highest elevation to its lowest depression by less than about 3 micrometers (microns), 2.5 microns, 2 microns, 1.5 microns, 1 micron, 0.9 microns, 0.5 microns, 0.4 microns, 0.2 microns, 0.1 microns or less. The variation of elevation in the upper surface of the substrate across both the microfluidic channel 122 (or flow region) and sequestration pens may be equal to or less than about 10%, 7%, 5%, 3%, 2%, 1%. 0.9%, 0.8%, 0.5%, 0.3% or 0.1% of the height of the walls of the sequestration pen. Alternatively, the variation of elevation in the upper surface of the substrate across both the microfluidic channel 122 (or flow region) and sequestration pens may be equal to or less than about 2%, 1%. 0.9%, 0.8%, 0.5%, 0.3%, 0.2%, or 0.1% of the height of the substrate. While described in detail for the microfluidic device 200, this may also apply to any of the microfluidic devices described herein.

The microfluidic channel 122 and connection region 236 can be examples of swept regions, and the isolation regions 240 of the sequestration pens 224, 226, and 228 can be examples of unswept regions. Sequestration pens like 224, 226, 228 have isolation regions wherein each isolation region has only one opening, which opens to the connection region of the sequestration pen. Fluidic media exchange in and out of the isolation region so configured can be limited to occurring substantially only by diffusion. As noted, the microfluidic channel 122 and sequestration pens 224, 226, and 228 can be configured to contain one or more fluidic media 180. In the example shown in FIGS. 2A-2B, ports 222 are connected to the microfluidic channel 122 and allow the fluidic medium 180 to be introduced into or removed from the microfluidic device 200. Prior to introduction of the fluidic medium 180, the microfluidic device may be primed with a gas such as carbon dioxide gas. Once the microfluidic device 200 contains the fluidic medium 180, the flow 242 (see FIG. 2C) of fluidic medium 180 in the microfluidic channel 122 can be selectively generated and stopped. For example, as shown, the ports 222 can be disposed at different locations (e.g., opposite ends) of the flow region (microfluidic channel 122), and a flow 242 of the fluidic medium can be created from one port 222 functioning as an inlet to another port 222 functioning as an outlet.

FIG. 2C illustrates a detailed view of an example of a sequestration pen 224, which may contain one or more micro-objects 246, according to some embodiments. The flow 242 of fluidic medium 180 in the microfluidic channel 122 past the proximal opening 234 of the connection region 236 of sequestration pen 224 can cause a secondary flow 244 of the fluidic medium 180 into and out of the sequestration pen 224. To sequester the micro-objects 246 in the isolation region 240 of the sequestration pen 224 from the secondary flow 244, the length $L_{con}$ of the connection region 236 of the sequestration pen 224 (i.e., from the proximal opening 234 to the distal opening 238) should be greater than the penetration depth $D_p$ of the secondary flow 244 into the connection region 236. The penetration depth $D_p$ depends upon a number of factors, including the shape of the microfluidic channel 122, which may be defined by a width $W_{con}$ of the connection region 236 at the proximal opening 234; a width $W_{ch}$ of the microfluidic channel 122 at the proximal opening 234; a height $H_{ch}$ of the channel 122 at the proximal opening 234; and the width of the distal opening 238 of the connection region 236. Of these factors, the width $W_{con}$ of the connection region 236 at the proximal opening 234 and the height $H_{ch}$ of the channel 122 at the proximal opening 234 tend to be the most significant. In addition, the penetration depth $D_p$ can be influenced by the velocity of the fluidic medium 180 in the channel 122 and the viscosity of fluidic medium 180. However, these factors (i.e., velocity and viscosity) can vary widely without dramatic changes in penetration depth $D_p$. For example, for a microfluidic chip 200 having a width $W_{con}$ of the connection region 236 at the proximal opening 234 of about 50 microns, a height $H_{ch}$ of the channel 122 at the proximal opening 122 of about 40 microns, and a width $W_{ch}$ of the microfluidic channel 122 at the proximal opening 122 of about 100 microns to about 150 microns, the penetration depth $D_p$ of the secondary flow 244 ranges from less than 1.0 times $W_{con}$ (i.e., less than 50 microns) at a flow rate of 0.1 microliters/sec to about 2.0 times $W_{con}$ (i.e., about 100 microns) at a flow rate of 20 microliters/sec, which represents an increase in $D_p$ of only about 2.5-fold over a 200-fold increase in the velocity of the fluidic medium 180.

In some embodiments, the walls of the microfluidic channel 122 and sequestration pen 224, 226, or 228 can be oriented as follows with respect to the vector of the flow 242 of fluidic medium 180 in the microfluidic channel 122: the microfluidic channel width $W_{ch}$ (or cross-sectional area of the microfluidic channel 122) can be substantially perpendicular to the flow 242 of medium 180; the width $W_{con}$ (or cross-sectional area) of the connection region 236 at opening 234 can be substantially parallel to the flow 242 of medium 180 in the microfluidic channel 122; and/or the length $L_{con}$ of the connection region can be substantially perpendicular to the flow 242 of medium 180 in the microfluidic channel 122. The foregoing are examples only, and the relative position of the microfluidic channel 122 and sequestration pens 224, 226 and 228 can be in other orientations with respect to each other.

In some embodiments, for a given microfluidic device, the configurations of the microfluidic channel 122 and the opening 234 may be fixed, whereas the rate of flow 242 of fluidic medium 180 in the microfluidic channel 122 may be variable. Accordingly, for each sequestration pen 224, a maximal velocity $V_{max}$ for the flow 242 of fluidic medium 180 in channel 122 may be identified that ensures that the penetration depth $D_p$ of the secondary flow 244 does not exceed the length $L_{con}$ of the connection region 236. When $V_{max}$ is not exceeded, the resulting secondary flow 244 can be wholly contained within the connection region 236 and does not enter the isolation region 240. Thus, the flow 242 of fluidic medium 180 in the microfluidic channel 122 (swept region) is prevented from drawing micro-objects 246 out of the isolation region 240, which is an unswept region of the microfluidic circuit, resulting in the micro-objects 246 being retained within the isolation region 240. Accordingly, selection of microfluidic circuit element dimensions and further selection of the operating parameters (e.g., velocity of fluidic medium 180) can prevent contamination of the isolation region 240 of sequestration pen 224 by materials from the microfluidic channel 122 or another sequestration pen 226 or 228. It should be noted, however, that for many microfluidic chip configurations, there is no need to worry about $V_{max}$ per se, because the chip will break from the pressure associated with flowing fluidic medium 180 at high velocity through the chip before $V_{max}$ can be achieved.

Components (not shown) in the first fluidic medium 180 in the microfluidic channel 122 can mix with the second fluidic medium 248 in the isolation region 240 substantially only by diffusion of components of the first medium 180 from the microfluidic channel 122 through the connection region 236 and into the second fluidic medium 248 in the isolation region 240. Similarly, components (not shown) of the second medium 248 in the isolation region 240 can mix with the first medium 180 in the microfluidic channel 122 substantially only by diffusion of components of the second medium 248 from the isolation region 240 through the connection region 236 and into the first medium 180 in the microfluidic channel 122. In some embodiments, the extent of fluidic medium exchange between the isolation region of a sequestration pen and the flow region by diffusion is greater than about 90%, 91%, 92%, 93%, 94% 95%, 96%, 97%, 98%, or greater than about 99% of fluidic exchange.

In some embodiments, the first medium 180 can be the same medium or a different medium than the second medium 248. In some embodiments, the first medium 180 and the second medium 248 can start out being the same, then become different (e.g., through conditioning of the second medium 248 by one or more cells in the isolation region 240, or by changing the medium 180 flowing through the microfluidic channel 122).

As illustrated in FIG. 2C, the width $W_{con}$ of the connection region 236 can be uniform from the proximal opening 234 to the distal opening 238. The width $W_{con}$ of the connection region 236 at the distal opening 238 can be any of the values identified herein for the width $W_{con}$ of the connection region 236 at the proximal opening 234. In some embodiments, the width of the isolation region 240 at the distal opening 238 can be substantially the same as the width $W_{con}$ of the connection region 236 at the proximal opening 234. Alternatively, the width $W_{con}$ of the connection region 236 at the distal opening 238 can be different (e.g., larger or smaller) than the width $W_{con}$ of the connection region 236 at the proximal opening 234. In some embodiments, the width $W_{con}$ of the connection region 236 may be narrowed or widened between the proximal opening 234 and distal opening 238. For example, the connection region 236 may be narrowed or widened between the proximal opening and the distal opening, using a variety of different geometries (e.g., chamfering the connection region, beveling the connection region). Further, any part or subpart of the connection region 236 may be narrowed or widened (e.g. a portion of the connection region adjacent to the proximal opening 234).

Figure 3:
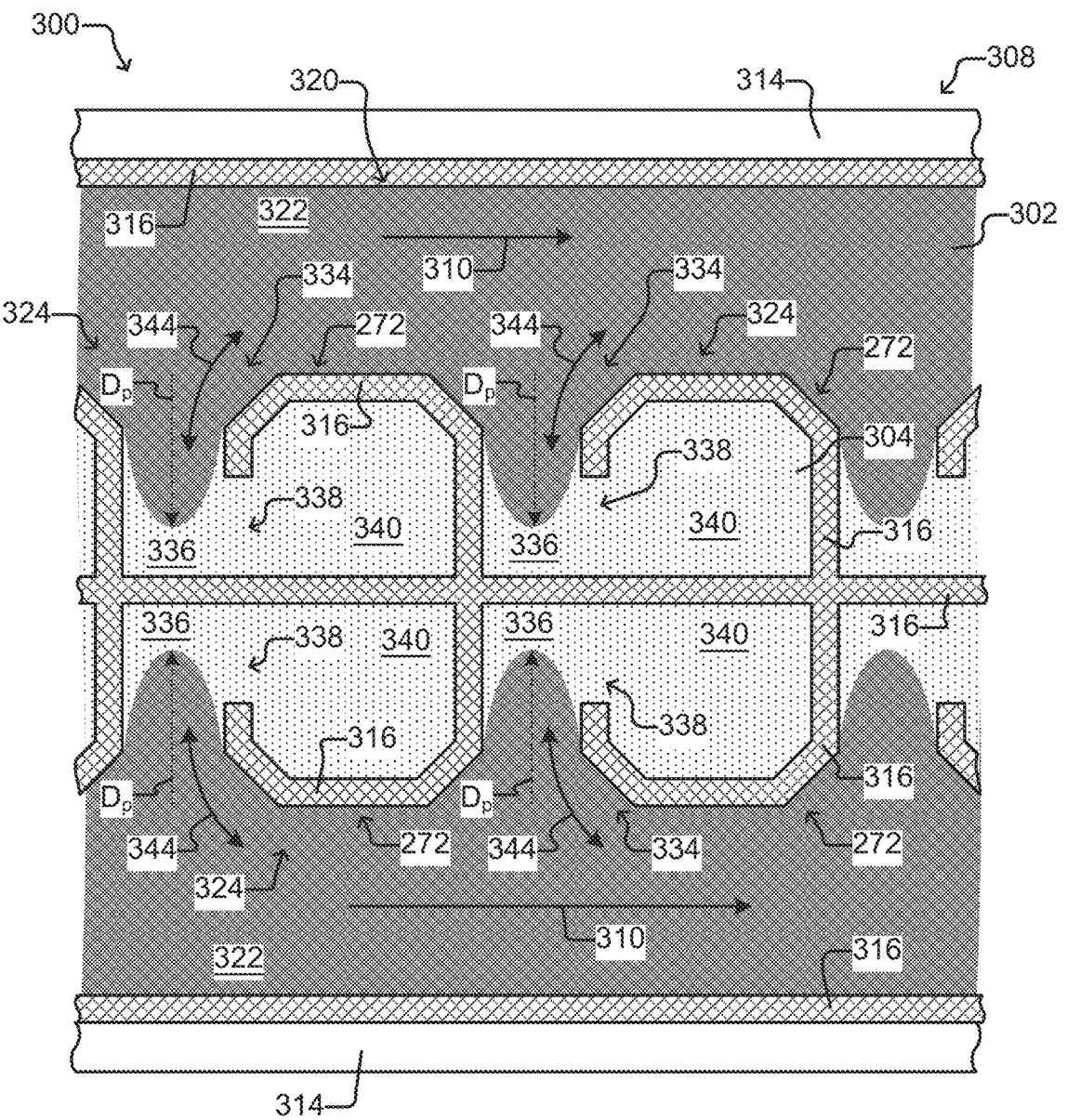
FIG. 3 illustrates a sequestration pen of a microfluidic device according to some embodiments of the disclosure.

FIG. 3 depicts another exemplary embodiment of a microfluidic device 300 containing microfluidic circuit structure 308, which includes a channel 322 and sequestration pen 324, which has features and properties like any of the sequestration pens described herein for microfluidic devices 100, 175, 200, 400, 520 and any other microfluidic devices described herein.

The microfluidic device 300 of FIG. 3 comprises a support structure (not visible in FIG. 3, but can be the same or generally similar to the support structure 104 of device 100 depicted in FIG. 1A), a microfluidic circuit structure 308, and a cover (not visible in FIG. 3, but can be the same or generally similar to the cover 122 of device 100 depicted in FIG. 1A). The microfluidic circuit structure 308 includes a frame 314 and microfluidic circuit material 316, which can be the same as or generally similar to the frame 114 and microfluidic circuit material 116 of device 100 shown in FIG. 1A. As shown in FIG. 3, the microfluidic circuit 320 defined by the microfluidic circuit material 316 can comprise multiple channels 322 (two are shown but there can be more) to which multiple sequestration pens 324 are fluidically connected.

Each sequestration pen 324 can comprise an isolation structure 272, an isolation region 340 within the isolation structure 272, and a connection region 336. From a proximal opening 334 at the microfluidic channel 322 to a distal opening 338 at the isolation structure 272, the connection region 336 fluidically connects the microfluidic channel 322 to the isolation region 340. Generally, in accordance with the above discussion of FIGS. 2B and 2C, a flow 310 of a first fluidic medium 304 in a channel 322 can create secondary flows 344 of the first medium 302 from the microfluidic channel 322 into and/or out of the respective connection regions 336 of the sequestration pens 324.

Figure 4:
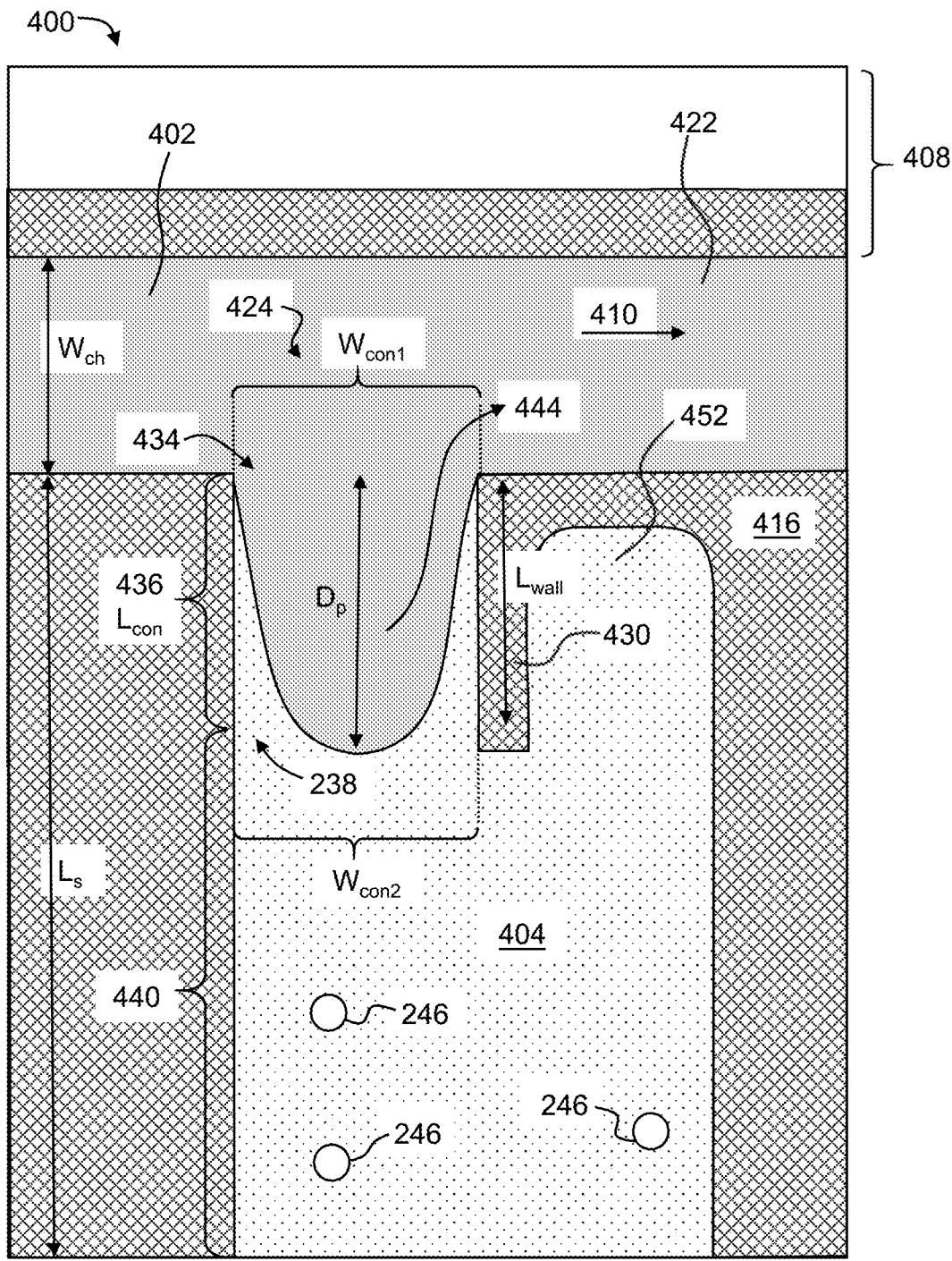
FIG. 4 illustrates an exemplary microfluidic device containing a sequestration pen according to some embodiments of the disclosure.

The exemplary microfluidic devices of FIG. 4 includes a microfluidic channel 422, having a width $W_{ch}$, as described herein, and containing a flow 310 of first fluidic medium 402 and one or more sequestration pens 424 (only one illustrated in FIG. 4). The sequestration pens 424 each have a length Ls, a connection region 436, and an isolation region 440, where the isolation region 440 contains a second fluidic medium 404. The connection region 436 has a proximal opening 434, having a width $W_{con1}$, which opens to the microfluidic channel 422, and a distal opening 238, having a width $W_{con2}$, which opens to the isolation region 440. The width $W_{con1}$ may or may not be the same as $W_{con2}$, as described herein. The walls of each sequestration pen 424 may be formed of microfluidic circuit material 416, which may further form the connection region walls 430. A connection region wall 430 can correspond to a structure that is laterally positioned with respect to the proximal opening 434 and at least partially extends into the enclosed portion of the sequestration pen 424. In some embodiments, the length $L_{con}$ of the connection region 436 is at least partially defined by length $L_{wall}$ of the connection region wall 430. The connection region wall 430 may have a length $L_{wall}$, selected to be more than the penetration depth $D_p$ of the secondary flow 444. Thus, the secondary flow 444 can be wholly contained within the connection region without extending into the isolation region 440.

The connection region wall 430 may define a hook region 452, which is a sub-region of the isolation region 440 of the sequestration pen 424. Since the connection region wall 430 extends into the inner cavity of the sequestration pen, the connection region wall 430 can act as a physical barrier to shield hook region 452 from secondary flow 444, with selection of the length of $L_{wall}$, contributing to the extent of the hook region. In some embodiments, the longer the length $L_{wall}$ of the connection region wall 430, the more sheltered the hook region 452.

In sequestration pens configured like those of FIGS. 2A-2C and 3, the isolation region may have a shape and size of any type, and may be selected to regulate diffusion of nutrients, reagents, and/or media into the sequestration pen to reach to a far wall of the sequestration pen, e.g., opposite the proximal opening of the connection region to the flow region (or microfluidic channel). The size and shape of the isolation region may further be selected to regulate diffusion of waste products and/or secreted products of a biological micro-object out from the isolation region to the flow region via the proximal opening of the connection region of the sequestration pen. In general, the shape of the isolation region is not critical to the ability of the sequestration pen to isolate micro-objects from direct flow in the flow region.

In some other embodiments of sequestration pens, the isolation region may have more than one opening fluidically connecting the isolation region with the flow region of the microfluidic device. However, for an isolation region having a number of n openings fluidically connecting the isolation region to the flow region (or two or more flow regions), n–1 openings can be valved. When the n–1 valved openings are closed, the isolation region has only one effective opening, and exchange of materials into/out of the isolation region occurs only by diffusion.

Examples of microfluidic devices having pens in which biological micro-objects can be placed, cultured, and/or monitored have been described, for example, in U.S. Pat. No. 9,857,333 (Chapman, et al.), U.S. Pat. No. 10,010,882 (White, et al.), and U.S. Pat. No. 9,889,445 (Chapman, et al.), each of which is incorporated herein by reference in its entirety.

Microfluidic circuit element dimensions. Various dimensions and/or features of the sequestration pens and the microfluidic channels to which the sequestration pens open, as described herein, may be selected to limit introduction of contaminants or unwanted micro-objects into the isolation region of a sequestration pen from the flow region/microfluidic channel; limit the exchange of components in the fluidic medium from the channel or from the isolation region to substantially only diffusive exchange; facilitate the transfer of micro-objects into and/or out of the sequestration pens; and/or facilitate growth or expansion of the biological cells. Microfluidic channels and sequestration pens, for any of the embodiments described herein, may have any suitable combination of dimensions, may be selected by one of skill from the teachings of this disclosure.

For any of the microfluidic devices described herein, a microfluidic channel may have a uniform cross sectional height along its length that is a substantially uniform cross sectional height, and may be any cross sectional height as described herein. At any point along the microfluidic channel, the substantially uniform cross sectional height of the channel, the upper surface of which is defined by the inner surface of the cover and the lower surface of which is defined by the inner surface of the base, may be substantially the same as the cross sectional height at any other point along the channel, e.g., having a cross sectional height that is no more than about 10%, about 9%, about 8%, about 7%, about 6%, about 5%, about 4%, about 3%, about 2% or about 1% or less, different from the cross-sectional height of any other location within the channel.

Additionally, the chamber(s), e.g., sequestration pen(s), of the microfluidic devices described herein, may be disposed substantially in a coplanar orientation relative to the microfluidic channel into which the chamber(s) open. That is, the enclosed volume of the chamber(s) is formed by an upper surface that is defined by the inner surface of the cover, a lower surface defined by the inner surface of the base, and walls defined by the microfluidic circuit material. Therefore, the lower surface of the chamber(s) may be coplanar to the lower surface of the microfluidic channel, e.g., substantially coplanar. The upper surface of the chamber may be may be coplanar to the upper surface of the microfluidic channel, e.g., substantially coplanar. Accordingly the chamber(s) may have a cross-sectional height, which may have any values as described herein, that is the same as the channel, e.g., substantially the same, and the chamber(s) and microfluidic channel(s) within the microfluidic device may have a substantially uniform cross sectional height throughout the flow region of the microfluidic device, and may be substantially coplanar throughout the microfluidic device.

Coplanarity of the lower surfaces of the chamber(s) and the microfluidic channel(s) can offer distinct advantage with repositioning micro-objects within the microfluidic device using DEP or magnetic force. Penning and unpenning of micro-objects, and in particular selective penning/selective unpenning, can be greatly facilitated when the lower surfaces of the chamber(s) and the microfluidic channel to which the chamber(s) open have a coplanar orientation.

The proximal opening of the connection region of a sequestration pen may have a width (e.g., $W_{con}$ or $W_{con1}$) that is at least as large as the largest dimension of a micro-object (e.g., a biological cell, which may be a plant cell, such as a plant protoplast) for which the sequestration pen is intended. In some embodiments, the proximal opening has a width (e.g., $W_{con}$ or $W_{con1}$) of about 20 microns, about 40 microns, about 50 microns, about 60 microns, about 75 microns, about 100 microns, about 150 microns, about 200 microns, or about 300 microns. The foregoing are examples only, and the width (e.g., $W_{con}$ or $W_{con1}$) of a proximal opening can be selected to be a value between any of the values listed above (e.g., about 20-200 microns, about 20-150 microns, about 20-100 microns, about 20-75 microns, about 20-60 microns, about 50-300 microns, about 50-200 microns, about 50-150 microns, about 50-100 microns, about 50-75 microns, about 75-150 microns, about 75-100 microns, about 100-300 microns, about 100-200 microns, or about 200-300 microns).

In some embodiments, the connection region of the sequestration pen may have a length (e.g., $L_{con}$) from the proximal opening to the distal opening to the isolation region of the sequestration pen that is at least 0.5 times, at least 0.6 times, at least 0.7 times, at least 0.8 times, at least 0.9 times, at least 1.0 times, at least 1.1 times, at least 1.2 times, at least 1.3 times, at least 1.4 times, at least 1.5 times, at least 1.75 times, at least 2.0 times, at least 2.25. times, at least 2.5 times, at least 2.75 times, at least 3.0 times, at least 3.5 times, at least 4.0 times, at least 4.5 times, at least 5.0 times, at least 6.0 times, at least 7.0 times, at least 8.0 times, at least 9.0 times, or at least 10.0 times the width (e.g., $W_{con}$ or $W_{con1}$) of the proximal opening. Thus, for example, the proximal opening of the connection region of a sequestration pen may have a width (e.g., $W_{con}$ or $W_{con1}$) from about 20 microns to about 200 microns (e.g., about 50 microns to about 150 microns), and the connection region may have a length $L_{con}$ that is at least 1.0 times (e.g., at least 1.5 times, or at least 2.0 times) the width of the proximal opening. As another example, the proximal opening of the connection region of a sequestration pen may have a width (e.g., $W_{con}$ or $W_{con1}$) from about 20 microns to about 100 microns (e.g., about 20 microns to about 60 microns), and the connection region may have a length $L_{con}$ that is at least 1.0 times (e.g., at least 1.5 times, or at least 2.0 times) the width of the proximal opening.

The microfluidic channel of a microfluidic device to which a sequestration pen opens may have specified size (e.g., width or height). In some embodiments, the height (e.g., $H_{ch}$) of the microfluidic channel at a proximal opening to the connection region of a sequestration pen can be within any of the following ranges: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height (e.g., $H_{ch}$) of the microfluidic channel (e.g., 122) can be selected to be between any of the values listed above. Moreover, the height (e.g., $H_{ch}$) of the microfluidic channel 122 can be selected to be any of these heights in regions of the microfluidic channel other than at a proximal opening of a sequestration pen.

The width (e.g., $W_{ch}$) of the microfluidic channel at the proximal opening to the connection region of a sequestration pen can be within any of the following ranges: about 20-500 microns, 20-400 microns, 20-300 microns, 20-200 microns, 20-150 microns, 20-100 microns, 20-80 microns, 20-60 microns, 30-400 microns, 30-300 microns, 30-200 microns, 30-150 microns, 30-100 microns, 30-80 microns, 30-60 microns, 40-300 microns, 40-200 microns, 40-150 microns, 40-100 microns, 40-80 microns, 40-60 microns, 50-1000 microns, 50-500 microns, 50-400 microns, 50-300 microns, 50-250 microns, 50-200 microns, 50-150 microns, 50-100 microns, 50-80 microns, 60-300 microns, 60-200 microns, 60-150 microns, 60-100 microns, 60-80 microns, 70-500 microns, 70-400 microns, 70-300 microns, 70-250 microns, 70-200 microns, 70-150 microns, 70-100 microns, 80-100 microns, 90-400 microns, 90-300 microns, 90-250 microns, 90-200 microns, 90-150 microns, 100-300 microns, 100-250 microns, 100-200 microns, 100-150 microns, 100-120 microns, 200-800 microns, 200-700 microns, or 200-600 microns. The foregoing are examples only, and the width (e.g., $W_{ch}$) of the microfluidic channel can be a value selected to be between any of the values listed above. Moreover, the width (e.g., $W_{ch}$) of the microfluidic channel can be selected to be in any of these widths in regions of the microfluidic channel other than at a proximal opening of a sequestration pen. In some embodiments, the width $W_{ch}$ of the microfluidic channel at the proximal opening to the connection region of the sequestration pen (e.g., taken transverse to the direction of bulk flow of fluid through the channel) can be substantially perpendicular to a width (e.g., $W_{con}$ or $W_{con1}$) of the proximal opening.

A cross-sectional area of the microfluidic channel at a proximal opening to the connection region of a sequestration pen can be about 500-50,000 square microns, 500-40,000 square microns, 500-30,000 square microns, 500-25,000 square microns, 500-20,000 square microns, 500-15,000 square microns, 500-10,000 square microns, 500-7,500 square microns, 500-5,000 square microns, 1,000-25,000 square microns, 1,000-20,000 square microns, 1,000-15,000 square microns, 1,000-10,000 square microns, 1,000-7,500 square microns, 1,000-5,000 square microns, 2,000-20,000 square microns, 2,000-15,000 square microns, 2,000-10,000 square microns, 2,000-7,500 square microns, 2,000-6,000 square microns, 3,000-20,000 square microns, 3,000-15,000 square microns, 3,000-10,000 square microns, 3,000-7,500 square microns, or 3,000 to 6,000 square microns. The foregoing are examples only, and the cross-sectional area of the microfluidic channel at the proximal opening can be selected to be between any of the values listed above. In various embodiments, and the cross-sectional area of the microfluidic channel at regions of the microfluidic channel other than at the proximal opening can also be selected to be between any of the values listed above. In some embodiments, the cross-sectional area is selected to be a substantially uniform value for the entire length of the microfluidic channel.

In some embodiments, the microfluidic chip is configured such that the proximal opening (e.g., 234 or 334) of the connection region of a sequestration pen may have a width (e.g., $W_{con}$ or $W_{con1}$) from about 20 microns to about 200 microns (e.g., about 50 microns to about 150 microns), the connection region may have a length $L_{con}$(e.g., 236 or 336) that is at least 1.0 times (e.g., at least 1.5 times, or at least 2.0 times) the width of the proximal opening, and the microfluidic channel may have a height (e.g., $H_{ch}$) at the proximal opening of about 30 microns to about 60 microns. As another example, the proximal opening (e.g., 234 or 334) of the connection region of a sequestration pen may have a width (e.g., $W_{con}$ or $W_{con1}$) from about 20 microns to about 100 microns (e.g., about 20 microns to about 60 microns), the connection region may have a length $L_{con}$(e.g., 236 or 336) that is at least 1.0 times (e.g., at least 1.5 times, or at least 2.0 times) the width of the proximal opening, and the microfluidic channel may have a height (e.g., $H_{ch}$) at the proximal opening of about 30 microns to about 60 microns. The foregoing are examples only, and the width (e.g., $W_{con}$ or $W_{con1}$) of the proximal opening (e.g., 234 or 274), the length (e.g., $L_{con}$) of the connection region, and/or the width (e.g., $W_{ch}$) of the microfluidic channel (e.g., 122 or 322), can be a value selected to be between any of the values listed above.

In some embodiments, the size $W_c$ (e.g., cross-sectional width $W_{ch}$, diameter, area, or the like) of the channel 122, 322, 618, 718 can be about one and a quarter (1.25), about one and a half (1.5), about two, about two and a half (2.5), about three (3), or more times the size Wo (e.g., cross-sectional width $W_{con}$, diameter, area, or the like) of a chamber opening, e.g., sequestration pen opening 234, 334, and the like. This can reduce the extent of secondary flow and the rate of diffusion (or diffusion flux) through the opening 234, 334 for materials diffusing from a selected chamber (e.g., like sequestration pens 224, 226 of FIG. 2B) into channel 122, 322, 618, 718 and subsequently re-entering a downstream or adjacent chamber (e.g., like sequestration pen 228). The rate of diffusion of a molecule (e.g., an analyte of interest, such as an antibody) is dependent on a number of factors, including (without limitation) temperature, viscosity of the medium, and the coefficient of diffusion $D_0$ of the molecule. For example, the $D_0$ for an IgG antibody in aqueous solution at about 20° C. is about $4.4 \times 10^{-7}$ cm²/sec, while the kinematic viscosity of cell culture medium is about $9 \times 10^{-4}$ m²/sec. Thus, an antibody in cell culture medium at about 20° C. can have a rate of diffusion of about 0.5 microns/sec. Accordingly, in some embodiments, a time period for diffusion from a biological microobject located within a sequestration pen such as 224, 226, 228, 324 into the channel 122, 322, 618, 718 can be about 10 minutes or less (e.g., about 9, 8, 7, 6, 5 minutes, or less). The time period for diffusion can be manipulated by changing parameters that influence the rate of diffusion. For example, the temperature of the media can be increased (e.g., to a physiological temperature such as about 37° C.) or decreased (e.g., to about 15° C., 10° C., or 4° C.) thereby increasing or decreasing the rate of diffusion, respectively. Alternatively, or in addition, the concentrations of solutes in the medium can be increased or decreased as discussed herein to isolate a selected pen from solutes from other upstream pens.

Accordingly, in some variations, the width (e.g., $W_{ch}$) of the microfluidic channel at the proximal opening to the connection region of a sequestration pen may be about 50 to 500 microns, about 50 to 300 microns, about 50 to 200 microns, about 70 to 500 microns, about to 70-300 microns, about 70 to 250 microns, about 70 to 200 microns, about 70 to 150 microns, about 70 to 100 microns, about 80 to 500 microns, about 80 to 300 microns, about 80 to 250 microns, about 80 to 200 microns, about 80 to 150 microns, about 90 to 500 microns, about 90 to 300 microns, about 90 to 250 microns, about 90 to 200 microns, about 90 to 150 microns, about 100 to 500 microns, about 100 to 300 microns, about 100 to 250 microns, about 100 to 200 microns, or about 100 to 150 microns. In some embodiments, the width $W_{ch}$ of the microfluidic channel at the proximal opening to the connection region of a sequestration pen may be about 70 to 250 microns, about 80 to 200 microns, or about 90 to 150 microns. The width Wcon of the opening of the chamber (e.g., sequestration pen) may be about 20 to 100 microns; about 30 to 90 microns; or about 20 to 60 microns. In some embodiments, $W_{ch}$ is about 70-250 microns and $W_{co}$n is about 20 to 100 microns; $W_{ch}$ is about 80 to 200 microns and $W_{con}$ is about 30 to 90 microns; $W_{ch}$ is about 90 to 150 microns, and $W_{con}$ is about 20 to 60 microns; or any combination of the widths of $W_{ch}$ and $W_{con}$ thereof.

In some embodiments, the proximal opening (e.g., 234 or 334) of the connection region of a sequestration pen has a width (e.g., $W_{con}$ or $W_{con1}$) that is 2.0 times or less (e.g., 2.0, 1.9, 1.8, 1.5, 1.3, 1.0, 0.8, 0.5, or 0.1 times) the height (e.g., $H_{ch}$) of the flow region/microfluidic channel at the proximal opening, or has a value that lies within a range defined by any two of the foregoing values.

In some embodiments, the width $W_{con1}$ of a proximal opening (e.g., 234 or 334) of a connection region of a sequestration pen may be the same as a width $W_{con2}$ of the distal opening (e.g., 238 or 338) to the isolation region thereof. In some embodiments, the width $W_{con1}$ of the proximal opening may be different than a width $W_{con2}$ of the distal opening, and $W_{con1}$ and/or $W_{con2}$ may be selected from any of the values described for $W_{con}$ or $W_{con1}$. In some embodiments, the walls (including a connection region wall) that define the proximal opening and distal opening may be substantially parallel with respect to each other. In some embodiments, the walls that define the proximal opening and distal opening may be selected to not be parallel with respect to each other.

The length (e.g., $L_{con}$) of the connection region can be about 1-600 microns, 5-550 microns, 10-500 microns, 15-400 microns, 20-300 microns, 20-500 microns, 40-400 microns, 60-300 microns, 80-200 microns, about 100-150 microns, about 20-300 microns, about 20-250 microns, about 20-200 microns, about 20-150 microns, about 20-100 microns, about 30-250 microns, about 30-200 microns, about 30-150 microns, about 30-100 microns, about 30-80 microns, about 30-50 microns, about 45-250 microns, about 45-200 microns, about 45-100 microns, about 45-80 microns, about 45-60 microns, about 60-200 microns, about 60-150 microns, about 60-100 microns or about 60-80 microns. The foregoing are examples only, and length (e.g., $L_{con}$) of a connection region can be selected to be a value that is between any of the values listed above.

The connection region wall of a sequestration pen may have a length (e.g., $L_{wall}$) that is at least 0.5 times, at least 0.6 times, at least 0.7 times, at least 0.8 times, at least 0.9 times, at least 1.0 times, at least 1.1 times, at least 1.2 times, at least 1.3 times, at least 1.4 times, at least 1.5 times, at least 1.75 times, at least 2.0 times, at least 2.25 times, at least 2.5 times, at least 2.75 times, at least 3.0 times, or at least 3.5 times the width (e.g., $W_{con}$ or $W_{con1}$) of the proximal opening of the connection region of the sequestration pen. In some embodiments, the connection region wall may have a length $L_{wall}$ of about 20-200 microns, about 20-150 microns, about 20-100 microns, about 20-80 microns, or about 20-50 microns. The foregoing are examples only, and a connection region wall may have a length $L_{wall}$ selected to be between any of the values listed above.

A sequestration pen may have a length Ls of about 40-600 microns, about 40-500 microns, about 40-400 microns, about 40-300 microns, about 40-200 microns, about 40-100 microns or about 40-80 microns. The foregoing are examples only, and a sequestration pen may have a length $L_s$ selected to be between any of the values listed above.

According to some embodiments, a sequestration pen may have a specified height (e.g., $H_s$). In some embodiments, a sequestration pen has a height $H_s$ of about 20 microns to about 200 microns (e.g., about 20 microns to about 150 microns, about 20 microns to about 100 microns, about 20 microns to about 60 microns, about 30 microns to about 150 microns, about 30 microns to about 100 microns, about 30 microns to about 60 microns, about 40 microns to about 150 microns, about 40 microns to about 100 microns, or about 40 microns to about 60 microns). The foregoing are examples only, and a sequestration pen can have a height $H_s$ selected to be between any of the values listed above.

The height $H_{con}$ of a connection region at a proximal opening of a sequestration pen can be a height within any of the following heights: 20-100 microns, 20-90 microns, 20-80 microns, 20-70 microns, 20-60 microns, 20-50 microns, 30-100 microns, 30-90 microns, 30-80 microns, 30-70 microns, 30-60 microns, 30-50 microns, 40-100 microns, 40-90 microns, 40-80 microns, 40-70 microns, 40-60 microns, or 40-50 microns. The foregoing are examples only, and the height $H_{con}$ of the connection region can be selected to be between any of the values listed above. Typically, the height $H_{con}$ of the connection region is selected to be the same as the height $H_{ch}$ of the microfluidic channel at the proximal opening of the connection region. Additionally, the height $H_s$ of the sequestration pen is typically selected to be the same as the height $H_{con}$ of a connection region and/or the height $H_{ch}$ of the microfluidic channel. In some embodiments, $H_s$, $H_{con}$, and $H_{ch}$ may be selected to be the same value of any of the values listed above for a selected microfluidic device.

The isolation region can be configured to contain only one, two, three, four, five, or a similar relatively small number of micro-objects. In other embodiments, the isolation region may contain more than 10, more than 50 or more than 100 micro-objects. Accordingly, the volume of an isolation region can be, for example, at least $1 \times 10^4$, $1 \times 10^5$, $5 \times 10^5$, $8 \times 10^5$, $1 \times 10^6$, $2 \times 10^6$, $4 \times 10^6$, $6 \times 10^6$, $1 \times 10^7$, $3 \times 10^7$, $5 \times 10^7$ $1 \times 10^8$, $5 \times 10^8$, or $8 \times 10^8$ cubic microns, or more. The foregoing are examples only, and the isolation region can be configured to contain numbers of micro-objects and volumes selected to be between any of the values listed above (e.g., a volume between $1 \times 10^5$ cubic microns and $5 \times 10^5$ cubic microns, between $5 \times 10^5$ cubic microns and $1 \times 10^6$ cubic microns, between $1 \times 10^6$ cubic microns and $2 \times 10^6$ cubic microns, or between $2 \times 10^6$ cubic microns and $1 \times 10^7$ cubic microns).

According to some embodiments, a sequestration pen of a microfluidic device may have a specified volume. The specified volume of the sequestration pen (or the isolation region of the sequestration pen) may be selected such that a single cell or a small number of cells (e.g., 2-10 or 2-5) can rapidly condition the medium and thereby attain favorable (or optimal) growth conditions. In some embodiments, the sequestration pen has a volume of about $5 \times 10^5$, $6 \times 10^5$, $8 \times 10^5$, $1 \times 10^6$, $2 \times 10^6$, $4 \times 10^6$, $8 \times 10^6$, $1 \times 10^7$, $3 \times 10^7$, $5 \times 10^7$, or about $8 \times 10^7$ cubic microns, or more. In some embodiments, the sequestration pen has a volume of about 1 nanoliter to about 50 nanoliters, 2 nanoliters to about 25 nanoliters, 2 nanoliters to about 20 nanoliters, about 2 nanoliters to about 15 nanoliters, or about 2 nanoliters to about 10 nanoliters. The foregoing are examples only, and a sequestration pen can have a volume selected to be any value that is between any of the values listed above.

According to some embodiments, the flow of fluidic medium within the microfluidic channel (e.g., 122 or 322) may have a specified maximum velocity (e.g., $V_{max}$). In some embodiments, the maximum velocity (e.g., $V_{max}$) may be set at around 0.2, 0.5, 0.7, 1.0, 1.3, 1.5, 2.0, 2.5, 3.0, 3.5, 4.0, 4.5, 5.0, 5.5, 6.0, 6.7, 7.0, 7.5, 8.0, 8.5, 9.0, 10, 11, 12, 13, 14, 15, 16, 17, 18, 19, 20, 22, 24, or 25 microliters/sec. The foregoing are examples only, and the flow of fluidic medium within the microfluidic channel can have a maximum velocity (e.g., $V_{max}$) selected to be a value between any of the values listed above. The flow of fluidic medium within the microfluidic channel typically may be flowed at a rate less than the $V_{max}$. While the $V_{max}$ may vary depending on the specific size and numbers of channel and sequestration pens opening thereto, a fluidic medium may be flowed at about 0.1 microliters/sec to about 20 microliters/sec; about 0.1 microliters/sec to about 15 microliters/sec; about 0.1 microliters/sec to about 12 microliters/sec, about 0.1 microliters/sec to about 10 microliters/sec; about 0.1 microliter/sec to about 7 microliters/sec without exceeding the $V_{max}$. In some portions of a typical workflow, a flow rate of a fluidic medium may be about 0.1 microliters/sec; about 0.5 microliters/sec; about 1.0 microliters/sec; about 2.0 microliters/sec; about 3.0 microliters/sec; about 4.0 microliters/sec;

about 5.0 microliters/sec; about 6.0 microliters/sec; about 7.0 microliters/sec; about 8.0 microliters/sec; about 9.0 microliters/sec; about 10.0 microliters/sec; about 11.0 microliters/sec; or any range defined by two of the foregoing values, e.g., 1-5 microliters/sec or 5-10 microliters/sec. The flow rate of a fluidic medium in the microfluidic channel may be equal to or less than about 12 microliters/sec; about 10 microliters/sec; about 8 microliters/sec, or about 6 microliters/sec.

In various embodiment, the microfluidic device has sequestration pens configured as in any of the embodiments discussed herein where the microfluidic device has about 5 to about 10 sequestration pens, about 10 to about 50 sequestration pens, about 25 to about 200 sequestration pens, about 100 to about 500 sequestration pens, about 200 to about 1000 sequestration pens, about 500 to about 1500 sequestration pens, about 1000 to about 2500 sequestration pens, about 2000 to about 5000 sequestration pens, about 3500 to about 7000 sequestration pens, about 5000 to about 10,000 sequestration pens, about 7,500 to about 15,000 sequestration pens, about 12,500 to about 20,000 sequestration pens, about 15,000 to about 25,000 sequestration pens, about 20,000 to about 30,000 sequestration pens, about 25,000 to about 35,000 sequestration pens, about 30,000 to about 40,000 sequestration pens, about 35,000 to about 45,000 sequestration pens, or about 40,000 to about 50,000 sequestration pens. The sequestration pens need not all be the same size and may include a variety of configurations (e.g., different widths, different features within the sequestration pen).

Coating solutions and coating agents. In some embodiments, at least one inner surface of the microfluidic device includes a coating material that provides a layer of organic and/or hydrophilic molecules suitable for maintenance, expansion and/or movement of biological micro-object(s) (i.e., the biological micro-object exhibits increased viability, greater expansion and/or greater portability within the microfluidic device). The conditioned surface may reduce surface fouling, participate in providing a layer of hydration, and/or otherwise shield the biological micro-objects from contact with the non-organic materials of the microfluidic device interior.

In some embodiments, substantially all the inner surfaces of the microfluidic device include the coating material. The coated inner surface(s) may include the surface of a flow region (e.g., channel), chamber, or sequestration pen, or a combination thereof. In some embodiments, each of a plurality of sequestration pens has at least one inner surface coated with coating materials. In other embodiments, each of a plurality of flow regions or channels has at least one inner surface coated with coating materials. In some embodiments, at least one inner surface of each of a plurality of sequestration pens and each of a plurality of channels is coated with coating materials. The coating may be applied before or after introduction of biological micro-object(s), or may be introduced concurrently with the biological micro-object(s). In some embodiments, the biological micro-object(s) may be imported into the microfluidic device in a fluidic medium that includes one or more coating agents. In other embodiments, the inner surface(s) of the microfluidic device (e.g., a microfluidic device having an electrode activation substrate such as, but not limited to, a device including dielectrophoresis (DEP) electrodes) may be treated or "primed" with a coating solution comprising a coating agent prior to introduction of the biological micro-object(s) into the microfluidic device. Any convenient coating agent/coating solution can be used, including but not limited to: serum or serum factors, bovine serum albumin (BSA), polymers, detergents, enzymes, and any combination thereof.

Synthetic polymer-based coating materials. The at least one inner surface may include a coating material that comprises a polymer. The polymer may be non-covalently bound (e.g., it may be non-specifically adhered) to the at least one surface. The polymer may have a variety of structural motifs, such as found in block polymers (and copolymers), star polymers (star copolymers), and graft or comb polymers (graft copolymers), all of which may be suitable for the methods disclosed herein. A wide variety of alkylene ether containing polymers may be suitable for use in the microfluidic devices described herein, including but not limited to Pluronic® polymers such as Pluronic® L44, L64, P85, and F127 (including F127NF). Other examples of suitable coating materials are described in US2016/0312165, the contents of which are herein incorporated by reference in their entirety.

Covalently linked coating materials. In some embodiments, the at least one inner surface includes covalently linked molecules that provide a layer of organic and/or hydrophilic molecules suitable for maintenance/expansion of biological micro-object(s) within the microfluidic device, providing a conditioned surface for such cells. The covalently linked molecules include a linking group, wherein the linking group is covalently linked to one or more surfaces of the microfluidic device, as described below. The linking group is also covalently linked to a surface modifying moiety configured to provide a layer of organic and/or hydrophilic molecules suitable for maintenance/expansion/movement of biological micro-object(s).

In some embodiments, the covalently linked moiety configured to provide a layer of organic and/or hydrophilic molecules suitable for maintenance/expansion of biological micro-object(s) may include alkyl or fluoroalkyl (which includes perfluoroalkyl) moieties; mono- or polysaccharides (which may include but is not limited to dextran); alcohols (including but not limited to propargyl alcohol); polyalcohols, including but not limited to polyvinyl alcohol; alkylene ethers, including but not limited to polyethylene glycol; polyelectrolytes (including but not limited to polyacrylic acid or polyvinyl phosphonic acid); amino groups (including derivatives thereof, such as, but not limited to alkylated amines, hydroxyalkylated amino group, guanidinium, and heterocylic groups containing an unaromatized nitrogen ring atom, such as, but not limited to morpholinyl or piperazinyl); carboxylic acids including but not limited to propiolic acid (which may provide a carboxylate anionic surface); phosphonic acids, including but not limited to ethynyl phosphonic acid (which may provide a phosphonate anionic surface); sulfonate anions; carboxybetaines; sulfobetaines; sulfamic acids; or amino acids.

In various embodiments, the covalently linked moiety configured to provide a layer of organic and/or hydrophilic molecules suitable for maintenance/expansion of biological micro-object(s) in the microfluidic device may include non-polymeric moieties such as an alkyl moiety, amino acid moiety, alcohol moiety, amino moiety, carboxylic acid moiety, phosphonic acid moiety, sulfonic acid moiety, sulfamic acid moiety, or saccharide moiety. Alternatively, the covalently linked moiety may include polymeric moieties, which may include any of these moieties.

In some embodiments, a microfluidic device may have a hydrophobic layer upon the inner surface of the base which includes a covalently linked alkyl moiety. The covalently linked alkyl moiety may comprise carbon atoms forming a linear chain (e.g., a linear chain of at least 10 carbons, or at least 14, 16, 18, 20, 22, or more carbons) and may be an unbranched alkyl moiety. In some embodiments, the alkyl group may include a substituted alkyl group (e.g., some of the carbons in the alkyl group can be fluorinated or perfluorinated). In some embodiments, the alkyl group may include a first segment, which may include a perfluoroalkyl group, joined to a second segment, which may include a non-substituted alkyl group, where the first and second segments may be joined directly or indirectly (e.g., by means of an ether linkage). The first segment of the alkyl group may be located distal to the linking group, and the second segment of the alkyl group may be located proximal to the linking group.

In other embodiments, the covalently linked moiety may include at least one amino acid, which may include more than one type of amino acid. Thus, the covalently linked moiety may include a peptide or a protein. In some embodiments, the covalently linked moiety may include an amino acid which may provide a zwitterionic surface to support cell growth, viability, portability, or any combination thereof.

In other embodiments, the covalently linked moiety may further include a streptavidin or biotin moiety. In some embodiments, a modified biological moiety such as, for example, a biotinylated protein or peptide may be introduced to the inner surface of a microfluidic device bearing covalently linked streptavidin, and couple via the covalently linked streptavidin to the surface, thereby providing a modified surface presenting the protein or peptide.

In other embodiments, the covalently linked moiety may include at least one alkylene oxide moiety and may include any alkylene oxide polymer as described above. One useful class of alkylene ether containing polymers is polyethylene glycol (PEG $M_w$<100,000 Da) or alternatively polyethylene oxide (PEO, $M_w$>100,000). In some embodiments, a PEG may have an $M_w$ of about 1000 Da, 5000 Da, 10,000 Da or 20,000 Da. In some embodiments, the PEG polymer may further be substituted with a hydrophilic or charged moiety, such as but not limited to an alcohol functionality or a carboxylic acid moiety.

The covalently linked moiety may include one or more saccharides. The covalently linked saccharides may be mono-, di-, or polysaccharides. The covalently linked saccharides may be modified to introduce a reactive pairing moiety which permits coupling or elaboration for attachment to the surface. One exemplary covalently linked moiety may include a dextran polysaccharide, which may be coupled indirectly to a surface via an unbranched linker.

The coating material providing a conditioned surface may comprise only one kind of covalently linked moiety or may include more than one different kind of covalently linked moiety. For example, a polyethylene glycol conditioned surface may have covalently linked alkylene oxide moieties having a specified number of alkylene oxide units which are all the same, e.g., having the same linking group and covalent attachment to the surface, the same overall length, and the same number of alkylene oxide units. Alternatively, the coating material may have more than one kind of covalently linked moiety attached to the surface. For example, the coating material may include the molecules having covalently linked alkylene oxide moieties having a first specified number of alkylene oxide units and may further include a further set of molecules having bulky moieties such as a protein or peptide connected to a covalently attached alkylene oxide linking moiety having a greater number of alkylene oxide units. The different types of molecules may be varied in any suitable ratio to obtain the surface characteristics desired. For example, the conditioned surface having a mixture of first molecules having a chemical structure having a first specified number of alkylene oxide units and second molecules including peptide or protein moieties, which may be coupled via a biotin/streptavidin binding pair to the covalently attached alkylene linking moiety, may have a ratio of first molecules:second molecules of about 99:1; about 90:10; about 75:25; about 50:50; about 30:70; about 20:80; about 10:90; or any ratio selected to be between these values. In this instance, the first set of molecules having different, less sterically demanding termini and fewer backbone atoms can help to functionalize the entire substrate surface and thereby prevent undesired adhesion or contact with the silicon/silicon oxide, hafnium oxide or alumina making up the substrate itself. The selection of the ratio of mixture of first molecules to second molecules may also modulate the surface modification introduced by the second molecules bearing peptide or protein moieties.

Conditioned surface properties. Various factors can alter the physical thickness of the conditioned surface, such as the manner in which the conditioned surface is formed on the substrate (e.g. vapor deposition, liquid phase deposition, spin coating, flooding, and electrostatic coating). In some embodiments, the conditioned surface may have a thickness of about 1 nm to about 10 nm. In some embodiments, the covalently linked moieties of the conditioned surface may form a monolayer when covalently linked to the surface of the microfluidic device (which may include an electrode activation substrate having dielectrophoresis (DEP) or electrowetting (EW) electrodes) and may have a thickness of less than 10 nm (e.g., less than 5 nm, or about 1.5 to 3.0 nm). These values are in contrast to that of a surface prepared by spin coating, for example, which may typically have a thickness of about 30 nm. In some embodiments, the conditioned surface does not require a perfectly formed monolayer to be suitably functional for operation within a DEP-configured microfluidic device. In other embodiments, the conditioned surface formed by the covalently linked moieties may have a thickness of about 10 nm to about 50 nm.

Unitary or Multi-part conditioned surface. The covalently linked coating material may be formed by reaction of a molecule which already contains the moiety configured to provide a layer of organic and/or hydrophilic molecules suitable for maintenance/expansion of biological micro-object(s) in the microfluidic device, and may have a structure of Formula I, as shown below. Alternatively, the covalently linked coating material may be formed in a two-part sequence, having a structure of Formula II, by coupling the moiety configured to provide a layer of organic and/or hydrophilic molecules suitable for maintenance and/or expansion of biological micro-object(s) to a surface modifying ligand that itself has been covalently linked to the surface. In some embodiments, the surface may be formed in a two-part or three-part sequence, including a streptavidin/biotin binding pair, to introduce a protein, peptide, or mixed modified surface.

Formula I 33 34

-continued

Formula II

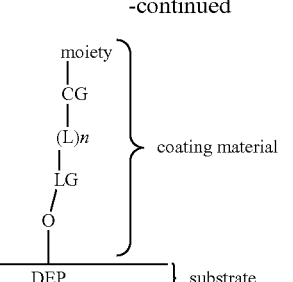

The coating material may be linked covalently to oxides of the surface of a DEP-configured or EW-configured substrate. The coating material may be attached to the oxides via a linking group ("LG"), which may be a siloxy or phosphonate ester group formed from the reaction of a siloxane or phosphonic acid group with the oxides. The moiety configured to provide a layer of organic and/or hydrophilic molecules suitable for maintenance/expansion of biological micro-object(s) in the microfluidic device can be any of the moieties described herein. The linking group LG may be directly or indirectly connected to the moiety configured to provide a layer of organic and/or hydrophilic molecules suitable for maintenance/expansion of biological micro-object(s) in the microfluidic device. When the linking group LG is directly connected to the moiety, optional linker ("L") is not present and n is 0. When the linking group LG is indirectly connected to the moiety, linker L is present and n is 1. The linker L may have a linear portion where a backbone of the linear portion may include 1 to 200 non-hydrogen atoms selected from any combination of silicon, carbon, nitrogen, oxygen, sulfur and/or phosphorus atoms, subject to chemical bonding limitations as is known in the art. It may be interrupted with any combination of one or more moieties, which may be chosen from ether, amino, carbonyl, amido, and/or phosphonate groups, arylene, heteroarylene, or heterocyclic groups. In some embodiments, the coupling group CG represents the resultant group from reaction of a reactive moiety $R_x$ and a reactive pairing moiety $R_{px}$ (i.e., a moiety configured to react with the reactive moiety $R_x$). CG may be a carboxamidyl group, a triazolylene group, substituted triazolylene group, a carboxamidyl, thioamidyl, an oxime, a mercaptyl, a disulfide, an ether, or alkenyl group, or any other suitable group that may be formed upon reaction of a reactive moiety with its respective reactive pairing moiety. In some embodiments, CG may further represent a streptavidin/biotin binding pair.

Figure 2D:
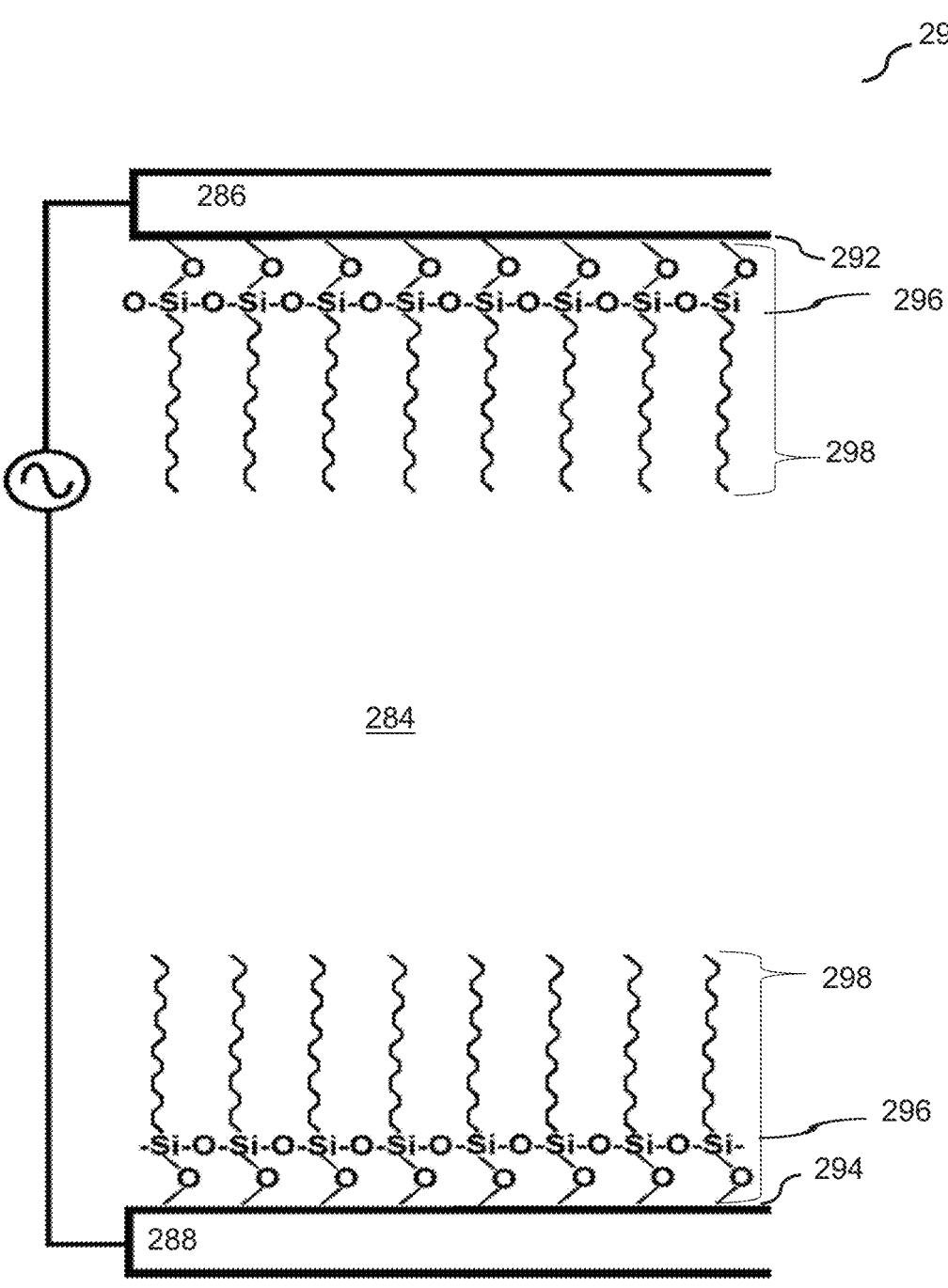
FIG. 2D illustrates a coated surface of the microfluidic device according to an embodiment of the disclosure.

FIG. 2D depicts a cross-sectional view of a microfluidic device 290 having an exemplary covalently linked coating material providing a conditioned surface. As illustrated, the coating materials 298 (shown schematically) can comprise a monolayer of densely-packed molecules covalently bound to both the inner surface 294 of a base 286, which may be a DEP substrate, and the inner surface 292 of a cover 288 of the microfluidic device 290. The coating material 298 can be disposed on substantially all inner surfaces 294, 292 proximal to, and facing inwards towards, the enclosure 284 of the microfluidic device 290, including, in some embodiments and as discussed above, the surfaces of microfluidic circuit material (not shown) used to define circuit elements and/or structures within the microfluidic device 290. In alternate embodiments, the coating material 298 can be disposed on only one or some of the inner surfaces of the microfluidic device 290.

In the embodiment shown in FIG. 2D, the coating material 298 can include a monolayer of organosiloxane molecules, each molecule covalently bonded to the inner surfaces 292, 294 of the microfluidic device 290 via a siloxy linker 296. Any of the above-discussed coating materials 298 can be used (e.g. an alkyl-terminated, a fluoroalkyl terminated moiety, a PEG-terminated moiety, a dextran terminated moiety, or a terminal moiety containing positive or negative charges for the organosiloxy moieties), where the terminal moiety is disposed at its enclosure-facing terminus (i.e. the portion of the monolayer of the coating material 298 that is not bound to the inner surfaces 292, 294 and is proximal to the enclosure 284).

In other embodiments, the coating material 298 used to coat the inner surface(s) 292, 294 of the microfluidic device 290 can include anionic, cationic, or zwitterionic moieties, or any combination thereof. Without intending to be limited by theory, by presenting cationic moieties, anionic moieties, and/or zwitterionic moieties at the inner surfaces of the enclosure 284 of the microfluidic circuit 120, the coating material 298 can form strong hydrogen bonds with water molecules such that the resulting water of hydration acts as a layer (or "shield") that separates the biological micro-objects from interactions with non-biological molecules (e.g., the silicon and/or silicon oxide of the substrate). In addition, in embodiments in which the coating material 298 is used in conjunction with coating agents, the anions, cations, and/or zwitterions of the coating material 298 can form ionic bonds with the charged portions of non-covalent coating agents (e.g. proteins in solution) that are present in a medium 180 (e.g. a coating solution) in the enclosure 284.

In still other embodiments, the coating material may comprise or be chemically modified to present a hydrophilic coating agent at its enclosure-facing terminus. In some embodiments, the coating material may include an alkylene ether containing polymer, such as PEG. In some embodiments, the coating material may include a polysaccharide, such as dextran. Like the charged moieties discussed above (e.g., anionic, cationic, and zwitterionic moieties), the hydrophilic coating agent can form strong hydrogen bonds with water molecules such that the resulting water of hydration acts as a layer (or "shield") that separates the biological micro-objects from interactions with non-biological molecules (e.g., the silicon and/or silicon oxide of the substrate).

Further details of suitable coating treatments and modifications, as well as methods of preparation, may be found at U.S. Patent Application Publication No. US2016/0312165 (Lowe, Jr., et al.), U.S. Patent Application Publication No US2017/0173580 (Lowe, Jr., et al), International Patent Application Publication WO2017/205830 (Lowe, Jr., et al.), and International Patent Application Publication WO2019/01880 (Beemiller et al.), each of which disclosures is herein incorporated by reference in its entirety.

Microfluidic device motive technologies. The microfluidic devices described herein can be used with any type of motive technology. As described herein, the control and monitoring equipment of the system can comprise a motive module for selecting and moving objects, such as micro-objects or droplets, in the microfluidic circuit of a microfluidic device. The motive technology(ies) may include, for example, dielectrophoresis (DEP), electrowetting (EW), and/or other motive technologies. The microfluidic device can have a variety of motive configurations, depending upon the type of object being moved and other considerations. Returning to FIG. 1A, for example, the support structure 104 and/or cover 110 of the microfluidic device 100 can comprise DEP electrode activation substrates for selectively inducing motive forces on micro-objects in the fluidic medium 180 in the microfluidic circuit 120 and thereby select, capture, and/or move individual micro-objects or groups of micro-objects.

In some embodiments, motive forces are applied across the fluidic medium 180 (e.g., in the flow path and/or in the sequestration pens) via one or more electrodes (not shown) to manipulate, transport, separate and sort micro-objects located therein. For example, in some embodiments, motive forces are applied to one or more portions of microfluidic circuit 120 in order to transfer a single micro-object from the flow path 106 into a desired microfluidic sequestration pen. In some embodiments, motive forces are used to prevent a micro-object within a sequestration pen from being displaced therefrom. Further, in some embodiments, motive forces are used to selectively remove a micro-object from a sequestration pen that was previously collected in accordance with the embodiments of the current disclosure.

In some embodiments, the microfluidic device is configured as an optically-actuated electrokinetic device, such as in optoelectronic tweezer (OET) and/or optoelectrowetting (OEW) configured device. Examples of suitable OET configured devices (e.g., containing optically actuated dielectrophoresis electrode activation substrates) can include those illustrated in U.S. Pat. No. RE 44,711 (Wu, et al.) (originally issued as U.S. Pat. No. 7,612,355), U.S. Pat. No. 7,956,339 (Ohta, et al.), U.S. Pat. No. 9,908,115 (Hobbs et al.), and U.S. Pat. No. 9,403,172 (Short et al), each of which is incorporated herein by reference in its entirety. Examples of suitable OEW configured devices can include those illustrated in U.S. Pat. No. 6,958,132 (Chiou, et al.), and U.S. Pat. No. 9,533,306 (Chiou, et al.), each of which is incorporated herein by reference in its entirety. Examples of suitable optically-actuated electrokinetic devices that include combined OET/OEW configured devices can include those illustrated in U.S. Patent Application Publication No. 2015/0306598 (Khandros, et al.), U.S. Patent Application Publication No 2015/0306599 (Khandros, et al.), and U.S. Patent Application Publication No. 2017/0173580 (Lowe, et al.), each of which is incorporated herein by reference in its entirety.

It should be understood that, for purposes of simplicity, the various examples of FIGS. 1-5B may illustrate portions of microfluidic devices while not depicting other portions. Further, FIGS. 1-5B may be part of, and implemented as, one or more microfluidic systems. In one non-limiting example, FIGS. 2E and 2F show a side cross-sectional view and a top cross-sectional view, respectively, of a portion of an enclosure 102 of the microfluidic device 200 having a region/chamber 202, which may be part of a fluidic circuit element having a more detailed structure, such as a growth chamber, a sequestration pen (which may be like any sequestration pen described herein), a flow region, or a flow channel. For instance, microfluidic device 200 may be similar to microfluidic devices 100, 175, 200, 300, 520 or any other microfluidic device as described herein. Furthermore, the microfluidic device 200 may include other fluidic circuit elements and may be part of a system including control and monitoring equipment 152, described above, having one or more of the media module 160, motive module 162, imaging module 164, optional tilting module 166, and other modules 168. Microfluidic devices 175, 200, 300, 520 and any other microfluidic devices described herein may similarly have any of the features described in detail for FIGS. 1A-1B and 2E-2F.

Figure 2E:
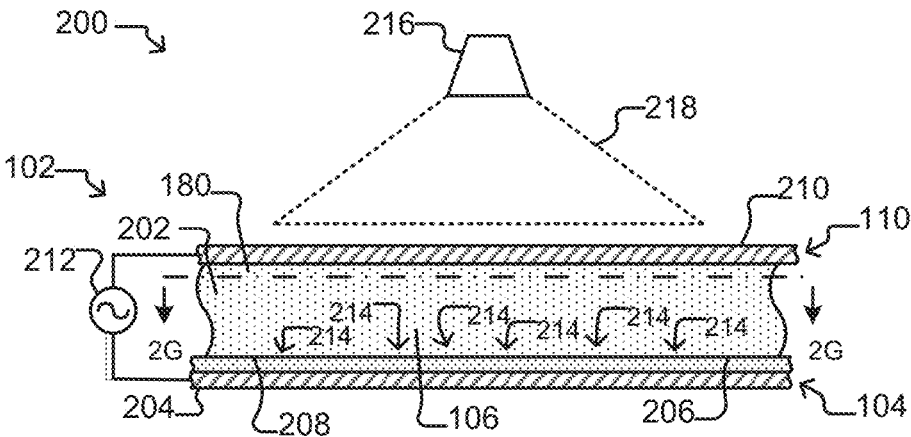
FIGS. 2E to 2F illustrate a microfluidic device according to some embodiments of the disclosure.

As shown in the example of FIG. 2E, the microfluidic device 200 includes a support structure 104 having a bottom electrode 204 and an electrode activation substrate 206 overlying the bottom electrode 204, and a cover 110 having a top electrode 210, with the top electrode 210 spaced apart from the bottom electrode 204. The top electrode 210 and the electrode activation substrate 206 define opposing surfaces of the region/chamber 202. A fluidic medium 180 contained in the region/chamber 202 thus provides a resistive connection between the top electrode 210 and the electrode activation substrate 206. A power source 212 configured to be connected to the bottom electrode 204 and the top electrode 210 and create a biasing voltage between the electrodes, as required for the generation of DEP forces in the region/chamber 202, is also shown. The power source 212 can be, for example, an alternating current (AC) power source.

Figure 2F:
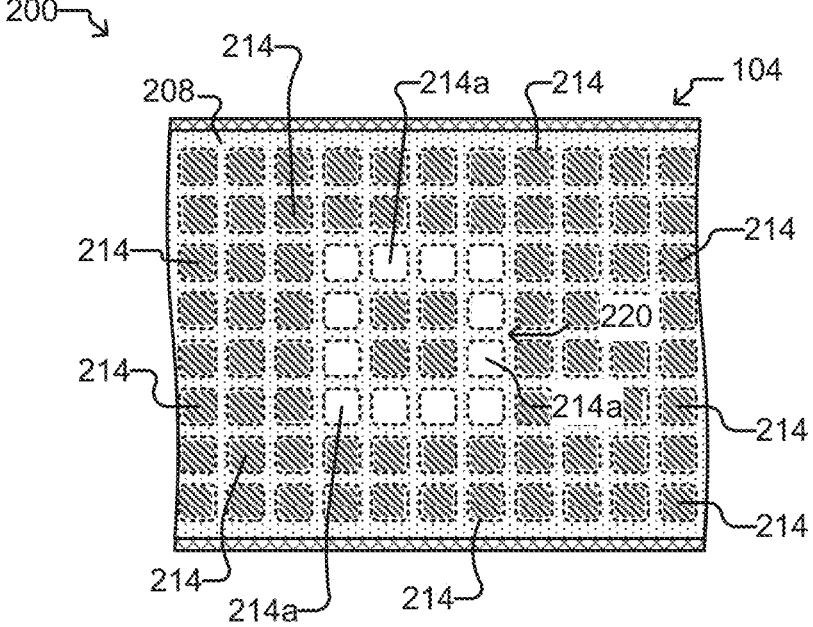

In certain embodiments, the microfluidic device 200 illustrated in FIGS. 2E and 2F can have an optically-actuated DEP electrode activation substrate. Accordingly, changing patterns of light 218 from the light source 216, which may be controlled by the motive module 162, can selectively activate and deactivate changing patterns of DEP electrodes at regions 214 of the inner surface 208 of the electrode activation substrate 206. (Hereinafter the regions 214 of a microfluidic device having a DEP electrode activation substrate are referred to as "DEP electrode regions.") As illustrated in FIG. 2F, a light pattern 218 directed onto the inner surface 208 of the electrode activation substrate 206 can illuminate select DEP electrode regions 214a (shown in white) in a pattern, such as a square. The non-illuminated DEP electrode regions 214 (cross-hatched) are hereinafter referred to as "dark" DEP electrode regions 214. The relative electrical impedance through the DEP electrode activation substrate 206 (i.e., from the bottom electrode 204 up to the inner surface 208 of the electrode activation substrate 206 which interfaces with the fluidic medium 180 in the flow region 106) is greater than the relative electrical impedance through the fluidic medium 180 in the region/chamber 202 (i.e., from the inner surface 208 of the electrode activation substrate 206 to the top electrode 210 of the cover 110) at each dark DEP electrode region 214. An illuminated DEP electrode region 214a, however, exhibits a reduced relative impedance through the electrode activation substrate 206 that is less than the relative impedance through the fluidic medium 180 in the region/chamber 202 at each illuminated DEP electrode region 214a.

With the power source 212 activated, the foregoing DEP configuration creates an electric field gradient in the fluidic medium 180 between illuminated DEP electrode regions 214a and adjacent dark DEP electrode regions 214, which in turn creates local DEP forces that attract or repel nearby micro-objects (not shown) in the fluidic medium 180. DEP electrodes that attract or repel micro-objects in the fluidic medium 180 can thus be selectively activated and deactivated at many different such DEP electrode regions 214 at the inner surface 208 of the region/chamber 202 by changing light patterns 218 projected from a light source 216 into the microfluidic device 200. Whether the DEP forces attract or repel nearby micro-objects can depend on such parameters as the frequency of the power source 212 and the dielectric properties of the fluidic medium 180 and/or micro-objects (not shown). Depending on the frequency of the power applied to the DEP configuration and selection of fluidic media (e.g., a highly conductive media such as PBS or other media appropriate for maintaining biological cells), negative DEP forces may be produced. Negative DEP forces may repel the micro-objects away from the location of the induced non-uniform electrical field. In some embodiments, a microfluidic device incorporating DEP technology may generate negative DEP forces.

The square pattern 220 of illuminated DEP electrode regions 214a illustrated in FIG. 2F is an example only. Any pattern of the DEP electrode regions 214 can be illuminated (and thereby activated) by the pattern of light 218 projected into the microfluidic device 200, and the pattern of illuminated/activated DEP electrode regions 414 can be repeatedly changed by changing or moving the light pattern 218.

In some embodiments, the electrode activation substrate 206 can comprise or consist of a photoconductive material. In such embodiments, the inner surface 208 of the electrode activation substrate 206 can be featureless. For example, the electrode activation substrate 206 can comprise or consist of a layer of hydrogenated amorphous silicon (a-Si:H). The a-Si:H can comprise, for example, about 8% to 40% hydrogen (calculated as 100*the number of hydrogen atoms/the total number of hydrogen and silicon atoms). The layer of a-Si:H can have a thickness of about 500 nm to about 2.0 μm. In such embodiments, the DEP electrode regions 214 can be created anywhere and in any pattern on the inner surface 208 of the electrode activation substrate 206, in accordance with the light pattern 218. The number and pattern of the DEP electrode regions 214 thus need not be fixed, but can correspond to the light pattern 218. Examples of microfluidic devices having a DEP configuration comprising a photoconductive layer such as discussed above have been described, for example, in U.S. Pat. No. RE 44,711 (Wu, et al.) (originally issued as U.S. Pat. No. 7,612,355), each of which is incorporated herein by reference in its entirety.

In other embodiments, the electrode activation substrate 206 can comprise a substrate comprising a plurality of doped layers, electrically insulating layers (or regions), and electrically conductive layers that form semiconductor integrated circuits, such as is known in semiconductor fields. For example, the electrode activation substrate 206 can comprise a plurality of phototransistors, including, for example, lateral bipolar phototransistors, with each phototransistor corresponding to a DEP electrode region 214. Alternatively, the electrode activation substrate 206 can comprise electrodes (e.g., conductive metal electrodes) controlled by phototransistor switches, with each such electrode corresponding to a DEP electrode region 214. The electrode activation substrate 206 can include a pattern of such phototransistors or phototransistor-controlled electrodes. The pattern, for example, can be an array of substantially square phototransistors or phototransistor-controlled electrodes arranged in rows and columns. Alternatively, the pattern can be an array of substantially hexagonal phototransistors or phototransistor-controlled electrodes that form a hexagonal lattice. Regardless of the pattern, electric circuit elements can form electrical connections between the DEP electrode regions 214 at the inner surface 208 of the electrode activation substrate 206 and the bottom electrode 204, and those electrical connections (i.e., phototransistors or electrodes) can be selectively activated and deactivated by the light pattern 218, as described above.

Examples of microfluidic devices having electrode activation substrates that comprise phototransistors have been described, for example, in U.S. Pat. No. 7,956,339 (Ohta et al.) and U.S. Pat. No. 9,908,115 (Hobbs et al.), the entire contents of each of which are incorporated herein by reference. Examples of microfluidic devices having electrode activation substrates that comprise electrodes controlled by phototransistor switches have been described, for example, in U.S. Pat. No. 9,403,172 (Short et al.), which is incorporated herein by reference in its entirety.

In some embodiments of a DEP configured microfluidic device, the top electrode 210 is part of a first wall (or cover 110) of the enclosure 202, and the electrode activation substrate 206 and bottom electrode 204 are part of a second wall (or support structure 104) of the enclosure 102. The region/chamber 202 can be between the first wall and the second wall. In other embodiments, the electrode 210 is part of the second wall (or support structure 104) and one or both of the electrode activation substrate 206 and/or the electrode 210 are part of the first wall (or cover 110). Moreover, the light source 216 can alternatively be used to illuminate the enclosure 102 from below.

With the microfluidic device 200 of FIGS. 2E-2F having a DEP electrode activation substrate, the motive module 162 of control and monitoring equipment 152, as described for FIG. 1A herein, can select a micro-object (not shown) in the fluidic medium 180 in the region/chamber 202 by projecting a light pattern 218 into the microfluidic device 200 to activate a first set of one or more DEP electrodes at DEP electrode regions 214a of the inner surface 208 of the electrode activation substrate 206 in a pattern (e.g., square pattern 220) that surrounds and captures the micro-object. The motive module 162 can then move the in situ-generated captured micro-object by moving the light pattern 218 relative to the microfluidic device 200 to activate a second set of one or more DEP electrodes at DEP electrode regions 214. Alternatively, the microfluidic device 200 can be moved relative to the light pattern 218.

In other embodiments, the microfluidic device 200 may be a DEP configured device that does not rely upon light activation of DEP electrodes at the inner surface 208 of the electrode activation substrate 206. For example, the electrode activation substrate 206 can comprise selectively addressable and energizable electrodes positioned opposite to a surface including at least one electrode (e.g., cover 110). Switches (e.g., transistor switches in a semiconductor substrate) may be selectively opened and closed to activate or inactivate DEP electrodes at DEP electrode regions 214, thereby creating a net DEP force on a micro-object (not shown) in region/chamber 202 in the vicinity of the activated DEP electrodes. Depending on such characteristics as the frequency of the power source 212 and the dielectric properties of the medium (not shown) and/or micro-objects in the region/chamber 202, the DEP force can attract or repel a nearby micro-object. By selectively activating and deactivating a set of DEP electrodes (e.g., at a set of DEP electrodes regions 214 that forms a square pattern 220), one or more micro-objects in region/chamber 202 can be selected and moved within the region/chamber 202. The motive module 162 in FIG. 1A can control such switches and thus activate and deactivate individual ones of the DEP electrodes to select, and move particular micro-objects (not shown) around the region/chamber 204. Microfluidic devices having a DEP electrode activation substrates that includes selectively addressable and energizable electrodes are known in the art and have been described, for example, in U.S. Pat. No. 6,294,063 (Becker, et al.) and U.S. Pat. No. 6,942,776 (Medoro), each of which is incorporated herein by reference in its entirety.

Regardless of whether the microfluidic device 200 has a dielectrophoretic electrode activation substrate, an electrowetting electrode activation substrate or a combination of both a dielectrophoretic and an electrowetting activation substrate, a power source 212 can be used to provide a potential (e.g., an AC voltage potential) that powers the electrical circuits of the microfluidic device 200. The power source 212 can be the same as, or a component of, the power source 192 referenced in FIG. 1A. Power source 212 can be configured to provide an AC voltage and/or current to the top electrode 210 and the bottom electrode 204. For an AC voltage, the power source 212 can provide a frequency range and an average or peak power (e.g., voltage or current) range sufficient to generate net DEP forces (or electrowetting forces) strong enough to select and move individual micro-objects (not shown) in the region/chamber 202, as discussed above, and/or to change the wetting properties of the inner surface 208 of the support structure 104 in the region/chamber 202, as also discussed above. Such frequency ranges and average or peak power ranges are known in the art. See, e.g., U.S. Pat. No. 6,958,132 (Chiou, et al.), U.S. Pat. No. RE44,711 (Wu, et al.) (originally issued as U.S. Pat. No. 7,612,355), and U.S. Patent Application Publication Nos. 2014/0124370 (Short, et al.), 2015/0306598 (Khandros, et al.), 2015/0306599 (Khandros, et al.), and 2017/0173580 (Lowe, Jr. et al.), each of which disclosures are herein incorporated by reference in its entirety.

Other forces may be utilized within the microfluidic devices, alone or in combination, to move selected micro-objects. Bulk fluidic flow within the microfluidic channel may move micro-objects within the flow region. Localized fluidic flow, which may be operated within the microfluidic channel, within a sequestration pen, or within another kind of chamber (e.g., a reservoir) can be also be used to move selected micro-objects. Localized fluidic flow can be used to move selected micro-objects out of the flow region into a non-flow region such as a sequestration pen or the reverse, from a non-flow region into a flow region. The localized flow can be actuated by deforming a deformable wall of the microfluidic device, as described in U.S. Pat. No. 10,058,865 (Breinlinger, et al.), which is incorporated herein by reference in its entirety.

Gravity may be used to move micro-objects within the microfluidic channel, into a sequestration pen, and/or out of a sequestration pen or other chamber, as described in U.S. Pat. No. 9,744,533 (Breinlinger, et al.), which is incorporated herein by reference in its entirety. Use of gravity (e.g., by tilting the microfluidic device and/or the support to which the microfluidic device is attached) may be useful for bulk movement of cells into or out of the sequestration pens from/to the flow region. Magnetic forces may be employed to move micro-objects including paramagnetic materials, which can include magnetic micro-objects attached to or associated with a biological micro-object. Alternatively, or in additional, centripetal forces may be used to move micro-objects within the microfluidic channel, as well as into or out of sequestration pens or other chambers in the microfluidic device.

In another alternative mode of moving micro-objects, laser-generated dislodging forces may be used to export micro-objects or assist in exporting micro-objects from a sequestration pen or any other chamber in the microfluidic device, as described in International Patent Publication No. WO2017/117408 (Kurz, et al.), which is incorporated herein by reference in its entirety.

In some embodiments, DEP forces are combined with other forces, such as fluidic flow (e.g., bulk fluidic flow in a channel or localized fluidic flow actuated by deformation of a deformable surface of the microfluidic device, laser generated dislodging forces, and/or gravitational force), so as to manipulate, transport, separate and sort micro-objects and/or droplets within the microfluidic circuit 120. In some embodiments, the DEP forces can be applied prior to the other forces. In other embodiments, the DEP forces can be applied after the other forces. In still other instances, the DEP forces can be applied in an alternating manner with the other forces. For the microfluidic devices described herein, repositioning of micro-objects may not generally rely upon gravity or hydrodynamic forces to position or trap micro-objects at a selected position. Gravity may be chosen as one form of repositioning force, but the ability to reposition of micro-objects within the microfluidic device does not rely solely upon the use of gravity. While fluid flow in the microfluidic channels may be used to introduce micro-objects into the microfluidic channels (e.g. flow region), such regional flow is not relied upon to pen or unpen micro-objects, while localized flow (e.g., force derived from actuating a deformable surface) may, in some embodiments, be selected from amongst the other types of repositioning forces described herein to pen or unpen micro-objects or to export them from the microfluidic device.

When DEP is used to reposition micro-objects, bulk fluidic flow in a channel is generally stopped prior to applying DEP to micro-objects to reposition the micro-objects within the microfluidic circuit of the device, whether the micro-objects are being repositioned from the channel into a sequestration pen or from a sequestration pen into the channel. Bulk fluidic flow may be resumed thereafter.

System. Returning to FIG. 1A, a system 150 for operating and controlling microfluidic devices is shown, such as for controlling the microfluidic device 100. The electrical power source 192 can provide electric power to the microfluidic device 100, providing biasing voltages or currents as needed. The electrical power source 192 can, for example, comprise one or more alternating current (AC) and/or direct current (DC) voltage or current sources.

System 150 can further include a media source 178. The media source 178 (e.g., a container, reservoir, or the like) can comprise multiple sections or containers, each for holding a different fluidic medium 180. Thus, the media source 178 can be a device that is outside of and separate from the microfluidic device 100, as illustrated in FIG. 1A. Alternatively, the media source 178 can be located in whole or in part inside the enclosure 102 of the microfluidic device 100. For example, the media source 178 can comprise reservoirs that are part of the microfluidic device 100.

FIG. 1A also illustrates simplified block diagram depictions of examples of control and monitoring equipment 152 that constitute part of system 150 and can be utilized in conjunction with a microfluidic device 100. As shown, examples of such control and monitoring equipment 152 can include a master controller 154 comprising a media module 160 for controlling the media source 178, a motive module 162 for controlling movement and/or selection of micro-objects (not shown) and/or medium (e.g., droplets of medium) in the microfluidic circuit 120, an imaging module 164 for controlling an imaging device (e.g., a camera, microscope, light source or any combination thereof) for capturing images (e.g., digital images), and an optional tilting module 166 for controlling the tilting of the microfluidic device 100. The control equipment 152 can also include other modules 168 for controlling, monitoring, or performing other functions with respect to the microfluidic device 100. As shown, the monitoring equipment 152 can further include a display device 170 and an input/output device 172.

The master controller 154 can comprise a control module 156 and a digital memory 158. The control module 156 can comprise, for example, a digital processor configured to operate in accordance with machine executable instructions (e.g., software, firmware, source code, or the like) stored as non-transitory data or signals in the memory 158. Alternatively, or in addition, the control module 156 can comprise hardwired digital circuitry and/or analog circuitry. The media module 160, motive module 162, imaging module 164, optional tilting module 166, and/or other modules 168 can be similarly configured. Thus, functions, processes acts, actions, or steps of a process discussed herein as being performed with respect to the microfluidic device 100 or any other microfluidic apparatus can be performed by any one or more of the master controller 154, media module 160, motive module 162, imaging module 164, optional tilting module 166, and/or other modules 168 configured as discussed above. Similarly, the master controller 154, media module 160, motive module 162, imaging module 164, optional tilting module 166, and/or other modules 168 may be communicatively coupled to transmit and receive data used in any function, process, act, action or step discussed herein.

The media module 160 controls the media source 178. For example, the media module 160 can control the media source 178 to input a selected fluidic medium 180 into the enclosure 102 (e.g., through an inlet port 107). The media module 160 can also control removal of media from the enclosure 102 (e.g., through an outlet port (not shown)). One or more media can thus be selectively input into and removed from the microfluidic circuit 120. The media module 160 can also control the flow of fluidic medium 180 in the flow path 106 inside the microfluidic circuit 120. The media module 160 may also provide conditioning gaseous conditions to the media source 178, for example, providing an environment containing 5% $CO_2$ (or higher). The media module 160 may also control the temperature of an enclosure of the media source, for example, to provide feeder cells in the media source with proper temperature control.

Motive module. The motive module 162 can be configured to control selection and movement of micro-objects (not shown) in the microfluidic circuit 120. The enclosure 102 of the microfluidic device 100 can comprise one or more electrokinetic mechanisms including a dielectrophoresis (DEP) electrode activation substrate, optoelectronic tweezers (OET) electrode activation substrate, electrowetting (EW) electrode activation substrate, and/or an optoelectrowetting (OEW) electrode activation substrate, where the motive module 162 can control the activation of electrodes and/or transistors (e.g., phototransistors) to select and move micro-objects and/or droplets in the flow path 106 and/or within sequestration pens 124, 126, 128, and 130. The electrokinetic mechanism(s) may be any suitable single or combined mechanism as described within the paragraphs describing motive technologies for use within the microfluidic device. A DEP configured device may include one or more electrodes that apply a non-uniform electric field in the microfluidic circuit 120 sufficient to exert a dielectrophoretic force on micro-objects in the microfluidic circuit 120. An OET configured device may include photo-activatable electrodes to provide selective control of movement of micro-objects in the microfluidic circuit 120 via light-induced dielectrophoresis.

The imaging module 164 can control the imaging device. For example, the imaging module 164 can receive and process image data from the imaging device. Image data from the imaging device can comprise any type of information captured by the imaging device (e.g., the presence or absence of micro-objects, droplets of medium, accumulation of label, such as fluorescent label, etc.). Using the information captured by the imaging device, the imaging module

164 can further calculate the position of objects (e.g., micro-objects, droplets of medium) and/or the rate of motion of such objects within the microfluidic device 100.

The imaging device (part of imaging module 164, discussed below) can comprise a device, such as a digital camera, for capturing images inside microfluidic circuit 120. In some instances, the imaging device further comprises a detector having a fast frame rate and/or high sensitivity (e.g. for low light applications). The imaging device can also include a mechanism for directing stimulating radiation and/or light beams into the microfluidic circuit 120 and collecting radiation and/or light beams reflected or emitted from the microfluidic circuit 120 (or micro-objects contained therein). The emitted light beams may be in the visible spectrum and may, e.g., include fluorescent emissions. The reflected light beams may include reflected emissions originating from an LED or a wide spectrum lamp, such as a mercury lamp (e.g. a high-pressure mercury lamp) or a Xenon arc lamp. The imaging device may further include a microscope (or an optical train), which may or may not include an eyepiece.

Support Structure. System 150 may further comprise a support structure 190 configured to support and/or hold the enclosure 102 comprising the microfluidic circuit 120. In some embodiments, the optional tilting module 166 can be configured to activate the support structure 190 to rotate the microfluidic device 100 about one or more axes of rotation. The optional tilting module 166 can be configured to support and/or hold the microfluidic device 100 in a level orientation (i.e. at 0° relative to x- and y-axes), a vertical orientation (i.e. at 900 relative to the x-axis and/or the y-axis), or any orientation therebetween. The orientation of the microfluidic device 100 (and the microfluidic circuit 120) relative to an axis is referred to herein as the "tilt" of the microfluidic device 100 (and the microfluidic circuit 120). For example, support structure 190 can optionally be used to tilt the microfluidic device 100 (e.g., as controlled by optional tilting module 166) to 0.1°, 0.2°, 0.3°, 0.4°, 0.5°, 0.6°, 0.7°, 0.8°, 0.9°, 1°, 2°, 3°, 4°, 5°, 10°, 15°, 20°, 25°, 30°, 35°, 40°, 45°, 50°, 55°, 60°, 65°, 70°, 75°, 80°, 90° relative to the x-axis or any degree therebetween. When the microfluidic device is tilted at angles greater than about 15, tilting may be performed to create bulk movement of micro-objects into/out of sequestration pens from/into the flow region (e.g., microfluidic channel). In some embodiments, the support structure 190 can hold the microfluidic device 100 at a fixed angle of 0.1°, 0.2°, 0.3°, 0.4°, 0.5°, 0.6°, 0.7°, 0.8°, 0.9°, 1°, 2°, 3°, 4°, 5°, or 10° relative to the x-axis (horizontal), so long as DEP is an effective force to move micro-objects out of the sequestration pens into the microfluidic channel. Since the surface of the electrode activation substrate is substantially flat, DEP forces may be used even when the far end of the sequestration pen, opposite its opening to the microfluidic channel, is disposed at a position lower in a vertical direction than the microfluidic channel.

In some embodiments where the microfluidic device is tilted or held at a fixed angle relative to horizontal, the microfluidic device 100 may be disposed in an orientation such that the inner surface of the base of the flow path 106 is positioned at an angle above or below the inner surface of the base of the one or more sequestration pens opening laterally to the flow path. The term "above" as used herein denotes that the flow path 106 is positioned higher than the one or more sequestration pens on a vertical axis defined by the force of gravity (i.e. an object in a sequestration pen above a flow path 106 would have a higher gravitational potential energy than an object in the flow path), and inversely, for positioning of the flow path 106 below one or more sequestration pens. In some embodiments, the support structure 190 may be held at a fixed angle of less than about 5°, about 4°, about 3° or less than about 2° relative to the x-axis (horizontal), thereby placing the sequestration pens at a lower potential energy relative to the flow path. In some other embodiments, when long term culturing (e.g., for more than about 2, 3, 4, 5, 6, 7 or more days) is performed within the microfluidic device, the device may be supported on a culturing support and may be tilted at a greater angle of about 10°, 15°, 20°, 25°, 30°, or any angle therebetween to retain biological micro-objects within the sequestration pens during the long term culturing period. At the end of the culturing period, the microfluidic device containing the cultured biological micro-objects may be returned to the support 190 within system 150, where the angle of tilting is decreased to values as described above, affording the use of DEP to move the biological micro-objects out of the sequestration pens. Further examples of the use of gravitational forces induced by tilting are described in U.S. Pat. No. 9,744,533 (Breinlinger et al.), the contents of which are herein incorporated by reference in its entirety.

Figure 5A:
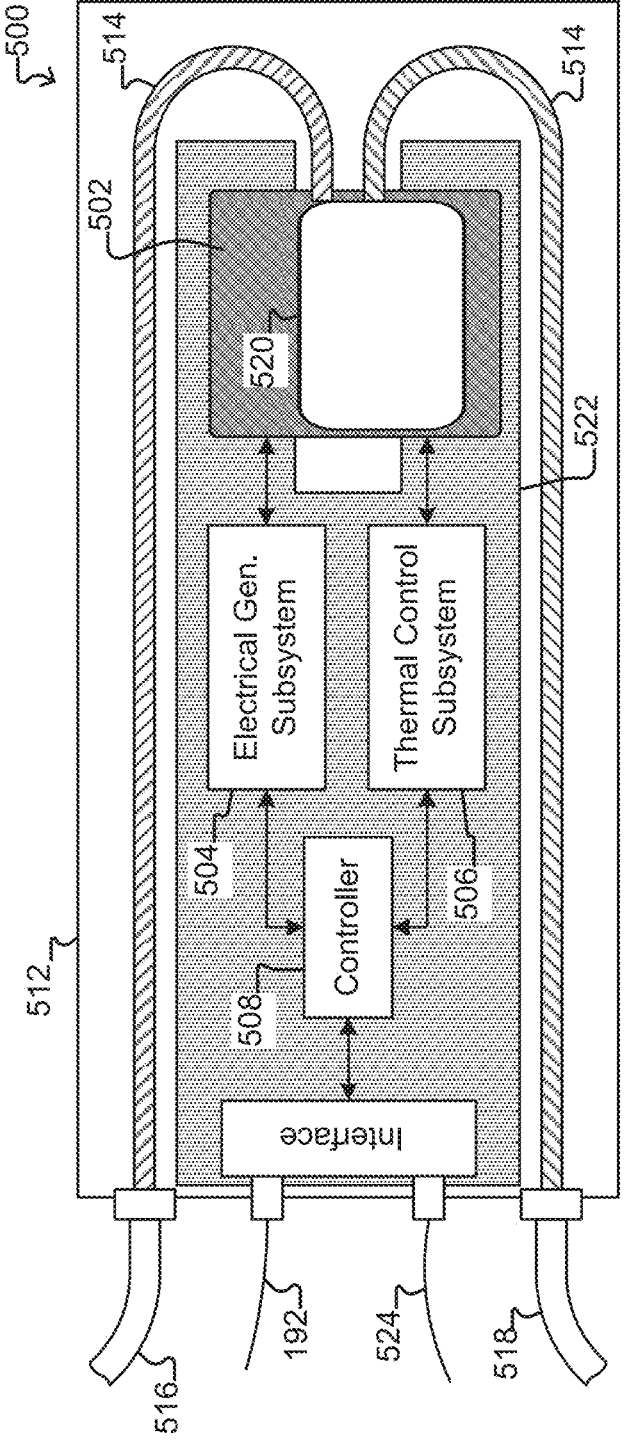
FIG. 5A illustrates a system for use with a microfluidic device and associated control equipment according to some embodiments of the disclosure.

Nest. Turning now to FIG. 5A, the system 150 can include a structure (also referred to as a "nest") 500 configured to hold a microfluidic device 520, which may be like microfluidic device 100, 200, or any other microfluidic device described herein. The nest 500 can include a socket 502 capable of interfacing with the microfluidic device 520 (e.g., an optically-actuated electrokinetic device 100, 200, etc.) and providing electrical connections from power source 192 to microfluidic device 520. The nest 500 can further include an integrated electrical signal generation subsystem 504. The electrical signal generation subsystem 504 can be configured to supply a biasing voltage to socket 502 such that the biasing voltage is applied across a pair of electrodes in the microfluidic device 520 when it is being held by socket 502. Thus, the electrical signal generation subsystem 504 can be part of power source 192. The ability to apply a biasing voltage to microfluidic device 520 does not mean that a biasing voltage will be applied at all times when the microfluidic device 520 is held by the socket 502. Rather, in most cases, the biasing voltage will be applied intermittently, e.g., only as needed to facilitate the generation of electrokinetic forces, such as dielectrophoresis or electrowetting, in the microfluidic device 520.

As illustrated in FIG. 5A, the nest 500 can include a printed circuit board assembly (PCBA) 522. The electrical signal generation subsystem 504 can be mounted on and electrically integrated into the PCBA 522. The exemplary support includes socket 502 mounted on PCBA 522, as well.

In some embodiments, the nest 500 can comprise an electrical signal generation subsystem 504 configured to measure the amplified voltage at the microfluidic device 520 and then adjust its own output voltage as needed such that the measured voltage at the microfluidic device 520 is the desired value. In some embodiments, the waveform amplification circuit can have a +6.5V to −6.5V power supply generated by a pair of DC-DC converters mounted on the PCBA 322, resulting in a signal of up to 13 Vpp at the microfluidic device 520.

In certain embodiments, the nest 500 further comprises a controller 508, such as a microprocessor used to sense and/or control the electrical signal generation subsystem 504. Examples of suitable microprocessors include the Arduino™ microprocessors, such as the Arduino Nano™. The controller 508 may be used to perform functions and analysis or may communicate with an external master controller 154 (shown in FIG. 1A) to perform functions and analysis. In the embodiment illustrated in FIG. 3A the controller 308 communicates with the master controller 154 (of FIG. 1A) through an interface (e.g., a plug or connector).

As illustrated in FIG. 5A, the support structure 500 (e.g., nest) can further include a thermal control subsystem 506. The thermal control subsystem 506 can be configured to regulate the temperature of microfluidic device 520 held by the support structure 500. For example, the thermal control subsystem 506 can include a Peltier thermoelectric device (not shown) and a cooling unit (not shown). In the embodiment illustrated in FIG. 5A, the support structure 500 comprises an inlet 516 and an outlet 518 to receive cooled fluid from an external reservoir (not shown) of the cooling unit, introduce the cooled fluid into the fluidic path 514 and through the cooling block, and then return the cooled fluid to the external reservoir. In some embodiments, the Peltier thermoelectric device, the cooling unit, and/or the fluidic path 514 can be mounted on a casing 512 of the support structure 500. In some embodiments, the thermal control subsystem 506 is configured to regulate the temperature of the Peltier thermoelectric device so as to achieve a target temperature for the microfluidic device 520. Temperature regulation of the Peltier thermoelectric device can be achieved, for example, by a thermoelectric power supply, such as a Pololu™ thermoelectric power supply (Pololu Robotics and Electronics Corp.). The thermal control subsystem 506 can include a feedback circuit, such as a temperature value provided by an analog circuit. Alternatively, the feedback circuit can be provided by a digital circuit.

The nest 500 can include a serial port 524 which allows the microprocessor of the controller 508 to communicate with an external master controller 154 via the interface. In addition, the microprocessor of the controller 508 can communicate (e.g., via a Plink tool (not shown)) with the electrical signal generation subsystem 504 and thermal control subsystem 506. Thus, via the combination of the controller 508, the interface, and the serial port 524, the electrical signal generation subsystem 504 and the thermal control subsystem 506 can communicate with the external master controller 154. In this manner, the master controller 154 can, among other things, assist the electrical signal generation subsystem 504 by performing scaling calculations for output voltage adjustments. A Graphical User Interface (GUI) (not shown) provided via a display device 170 coupled to the external master controller 154, can be configured to plot temperature and waveform data obtained from the thermal control subsystem 506 and the electrical signal generation subsystem 504, respectively. Alternatively, or in addition, the GUI can allow for updates to the controller 508, the thermal control subsystem 506, and the electrical signal generation subsystem 504.

Figure 5B:
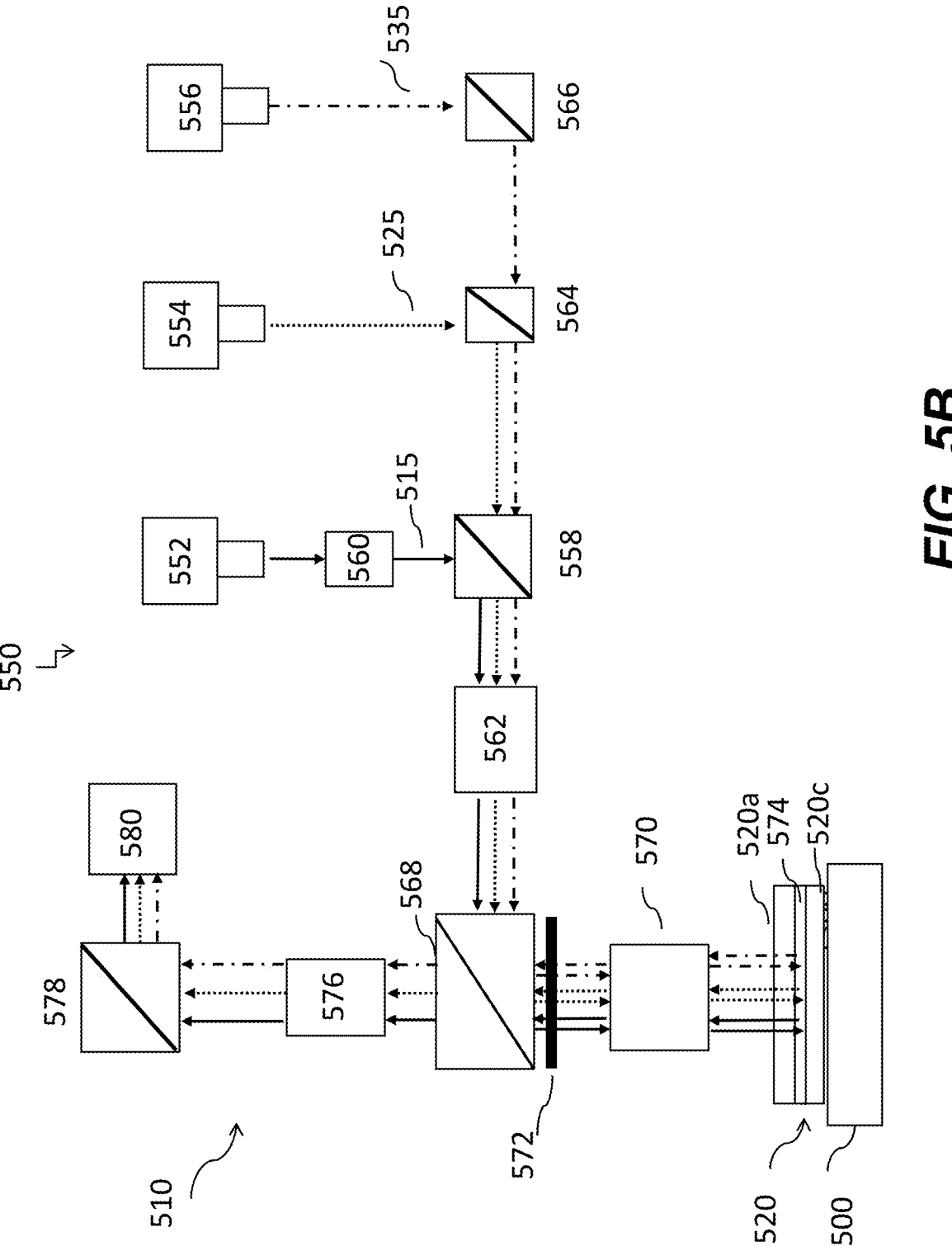
FIG. 5B illustrates an imaging device according to some embodiments of the disclosure.

Optical sub-system. FIG. 5B is a schematic of an optical sub-system 550 having an optical apparatus 510 for imaging and manipulating micro-objects in a microfluidic device 520, which can be any microfluidic device described herein. The optical apparatus 510 can be configured to perform imaging, analysis and manipulation of one or more micro-objects within the enclosure of the microfluidic device 520.

The optical apparatus 510 may have a first light source 552, a second light source 554, and a third light source 556. The first light source 552 can transmit light to a structured light modulator 560, which can include a digital mirror device (DMD) or a microshutter array system (MSA), either of which can be configured to receive light from the first light source 552 and selectively transmit a subset of the received light into the optical apparatus 510. Alternatively, the structured light modulator 560 can include a device that produces its own light (and thus dispenses with the need for a light source 552), such as an organic light emitting diode display (OLED), a liquid crystal on silicon (LCOS) device, a ferroelectric liquid crystal on silicon device (FLCOS), or a transmissive liquid crystal display (LCD). The structured light modulator 560 can be, for example, a projector. Thus, the structured light modulator 560 can be capable of emitting both structured and unstructured light. In certain embodiments, an imaging module and/or motive module of the system can control the structured light modulator 560.

In embodiments when the structured light modulator 560 includes a mirror, the modulator can have a plurality of mirrors. Each mirror of the plurality of mirrors can have a size of about 5 microns×5 microns to about 10 microns×10 microns, or any values therebetween. The structured light modulator 560 can include an array of mirrors (or pixels) that is 2000×1000, 2580×1600, 3000×2000, or any values therebetween. In some embodiments, only a portion of an illumination area of the structured light modulator 560 is used. The structured light modulator 560 can transmit the selected subset of light to a first dichroic beam splitter 558, which can reflect this light to a first tube lens 562.

The first tube lens 562 can have a large clear aperture, for example, a diameter larger than about 40 mm to about 50 mm, or more, providing a large field of view. Thus, the first tube lens 5621 can have an aperture that is large enough to capture all (or substantially all) of the light beams emanating from the structured light modulator 560.

The structured light 515 having a wavelength of about 400 nm to about 710 nm, may alternatively or in addition, provide fluorescent excitation illumination to the microfluidic device.

The second light source 554 may provide unstructured brightfield illumination. The brightfield illumination light 525 may have any suitable wavelength, and in some embodiments, may have a wavelength of about 400 nm to about 760 nm. The second light source 554 can transmit light to a second dichroic beam splitter 564 (which also may receive light 535 from the third light source 556), and the second light, brightfield illumination 525, may be transmitted therefrom to the first dichroic beam splitter 558. The second light, brightfield illumination 525, may then be transmitted from the first beam splitter 558 to the first tube lens 562.

The third light source 556 can transmit light through a matched pair relay lens (not shown) to a mirror 566. The third light illumination 535 may therefrom be reflected to the second dichroic beam splitter 5338 and be transmitted therefrom to the first beam splitter 5338, and onward to the first tube lens 5381. The third illumination light 535 may be a laser and may have any suitable wavelength. In some embodiments, the laser illumination 535 may have a wavelength of about 350 nm to about 900 nm. The laser illumination 535 may be configured to heat portions of one or more sequestration pens within the microfluidic device. The laser illumination 535 may be configured to heat fluidic medium, a micro-object, a wall or a portion of a wall of a sequestration pen, a metal target disposed within a microfluidic channel or sequestration pen of the microfluidic channel, or a photoreversible physical barrier within the microfluidic device, and described in more detail in U. S. Application Publication Nos. 2017/0165667 (Beaumont, et al.) and 2018/0298318 (Kurz, et al.), each of which disclosure is herein incorporated by reference in its entirety. In other embodiments, the laser illumination 535 may be configured to initiate photocleavage of surface modifying moieties of a modified surface of the microfluidic device or photocleavage of moieties providing adherent functionalities for micro-objects within a sequestration pen within the microfluidic device. Further details of photocleavage using a laser may be found in International Application Publication No. WO2017/205830 (Lowe, Jr. et al.), which disclosure is herein incorporated by reference in its entirety.

The light from the first, second, and third light sources (552, 554, 5560) passes through the first tube lens 562 and is transmitted to a third dichroic beam splitter 568 and filter changer 572. The third dichroic beam splitter 568 can reflect a portion of the light and transmit the light through one or more filters in the filter changer 572 and to the objective 570, which may be an objective changer with a plurality of different objectives that can be switched on demand. Some of the light (515, 525, and/or 535) may pass through the third dichroic beam splitter 568 and be terminated or absorbed by a beam block (not shown). The light reflected from the third dichroic beam splitter 568 passes through the objective 570 to illuminate the sample plane 574, which can be a portion of a microfluidic device 520 such as the sequestration pens described herein.

The nest 500, as described in FIG. 5A, can be integrated with the optical apparatus 510 and be a part of the apparatus 510. The nest 500 can provide electrical connection to the enclosure and be further configured to provide fluidic connections to the enclosure. Users may load the microfluidic apparatus 520 into the nest 500. In some other embodiments, the nest 500 can be a separate component independent of the optical apparatus 510.

Light can be reflected off and/or emitted from the sample plane 574 to pass back through the objective 570, through the filter changer 572, and through the third dichroic beam splitter 568 to a second tube lens 576. The light can pass through the second tube lens 576 (or imaging tube lens 576) and be reflected from a mirror 578 to an imaging sensor 580. Stray light baffles (not shown) can be placed between the first tube lens 562 and the third dichroic beam splitter 568, between the third dichroic beam splitter 568 and the second tube lens 576, and between the second tube lens 576 and the imaging sensor 580.

Objective. The optical apparatus can comprise the objective lens 570 that is specifically designed and configured for viewing and manipulating of micro-objects in the microfluidic device 520. For example, conventional microscope objective lenses are designed to view micro-objects on a slide or through 5 mm of aqueous fluid, while micro-objects in the microfluidic device 520 are inside the plurality of sequestration pens within the viewing plane 574 which have a depth of 20, 30, 40, 50, 60 70, 80 microns or any values therebetween. In some embodiments, a transparent cover 520a, for example, glass or ITO cover with a thickness of about 750 microns, can be placed on top of the plurality of sequestration pens, which are disposed above a microfluidic substrate 520c. Thus, the images of the micro-objects obtained by using the conventional microscope objective lenses may have large aberrations such as spherical and chromatic aberrations, which can degrade the quality of the images. The objective lens 570 of the optical apparatus 510 can be configured to correct the spherical and chromatic aberrations in the optical apparatus 1350. The objective lens 570 can have one or more magnification levels available such as, 4×, 10×, 20×.

Modes of illumination. In some embodiments, the structured light modulator 560 can be configured to modulate light beams received from the first light source 552 and transmits a plurality of illumination light beams 515, which are structured light beams, into the enclosure of the microfluidic device, e.g., the region containing the sequestration pens. The structured light beams can comprise the plurality of illumination light beams. The plurality of illumination light beams can be selectively activated to generate a plurality of illuminations patterns. In some embodiments, the structured light modulator 560 can be configured to generate an illumination pattern, similarly as described for FIGS. 4A-4B, which can be moved and adjusted. The optical apparatus 560 can further comprise a control unit (not shown) which is configured to adjust the illumination pattern to selectively activate the one or more of the plurality of DEP electrodes of a substrate 520c and generate DEP forces to move the one or more micro-objects inside the plurality of sequestration pens within the microfluidic device 520. For example, the plurality of illuminations patterns can be adjusted over time in a controlled manner to manipulate the micro-objects in the microfluidic device 520. Each of the plurality of illumination patterns can be shifted to shift the location of the DEP force generated and to move the structured light for one position to another in order to move the micro-objects within the enclosure of the microfluidic apparatus 520.

In some embodiments, the optical apparatus 510 may be configured such that each of the plurality of sequestration pens in the sample plane 574 within the field of view is simultaneously in focus at the image sensor 580 and at the structured light modulator 560. In some embodiments, the structured light modulator 560 can be disposed at a conjugate plane of the image sensor 580. In various embodiments, the optical apparatus 510 can have a confocal configuration or confocal property. The optical apparatus 510 can be further configured such that only each interior area of the flow region and/or each of the plurality of sequestration pens in the sample plane 574 within the field of view is imaged onto the image sensor 580 in order to reduce overall noise to thereby increase the contrast and resolution of the image.

In some embodiments, the first tube lens 562 can be configured to generate collimated light beams and transmit the collimated light beams to the objective lens 570. The objective 570 can receive the collimated light beams from the first tube lens 562 and focus the collimated light beams into each interior area of the flow region and each of the plurality of sequestration pens in the sample plane 574 within the field of view of the image sensor 580 or the optical apparatus 510. In some embodiments, the first tube lens 562 can be configured to generate a plurality of collimated light beams and transmit the plurality of collimated light beams to the objective lens 570. The objective 570 can receive the plurality of collimated light beams from the first tube lens 562 and converge the plurality of collimated light beams into each of the plurality of sequestration pens in the sample plane 574 within the field of view of the image sensor 580 or the optical apparatus 510.

In some embodiments, the optical apparatus 510 can be configured to illuminate the at least a portion of sequestration pens with a plurality of illumination spots. The objective 570 can receive the plurality of collimated light beams from the first tube lens 562 and project the plurality of illumination spots, which may form an illumination pattern, into each of the plurality of sequestration pens in the sample plane 574 within the field of view. For example, each of the plurality of illumination spots can have a size of about 5 microns×5 microns; 10 microns×10 microns; 10 microns× 30 microns, 30 microns×60 microns, 40 microns×40 microns, 40 microns×60 microns, 60 microns×120 microns, 80 microns×100 microns, 100 microns×140 microns and any values there between. The illumination spots may individually have a shape that is circular, square, or rectangular. Alternatively, the illumination spots may be grouped within a plurality of illumination spots (e.g., an illumination pattern) to form a larger polygonal shape such as a rectangle, square, or wedge shape. The illumination pattern may enclose (e.g., surround) an unilluminated space that may be square, rectangular or polygonal. For example, each of the plurality of illumination spots can have an area of about 150 to about 3000, about 4000 to about 10000, or 5000 to about 15000 square microns. An illumination pattern may have an area of about 1000 to about 8000, about 4000 to about 10000, 7000 to about 20000, 8000 to about 22000, 10000 to about 25000 square microns and any values there between.

The optical system 510 may be used to determine how to reposition micro-objects and into and out of the sequestration pens of the microfluidic device, as well as to count the number of micro-objects present within the microfluidic circuit of the device. Further details of repositioning and counting micro-objects are found in U. S. Application Publication No. 2016/0160259 (Du); U.S. Pat. No. 9,996,920 (Du et al.); and International Application Publication No. WO2017/102748 (Kim, et al.). The optical system 510 may also be employed in assay methods to determine concentrations of reagents/assay products, and further details are found in U.S. Pat. No. 8,921,055 (Chapman), U.S. Pat. No. 10,010,882 (White et al.), and U.S. Pat. No. 9,889,445 (Chapman et al.); International Application Publication No. WO2017/181135 (Lionberger, et al.); and International Application Serial No. PCT/US2018/055918 (Lionberger, et al.). Further details of the features of optical apparatuses suitable for use within a system for observing and manipulating micro-objects within a microfluidic device, as described herein, may be found in WO2018/102747 (Lundquist, et al), the disclosure of which is herein incorporated by reference in its entirety.

Additional system components for maintenance of viability of cells within the sequestration pens of the microfluidic device. In order to promote growth and/or expansion of cell populations, environmental conditions conducive to maintaining functional cells may be provided by additional components of the system. For example, such additional components can provide nutrients, cell growth signaling species, pH modulation, gas exchange, temperature control, and removal of waste products from cells.

Light sequencing and patterns for transport of micro-objects. In some embodiments, the present disclosure is directed to the use of pattern information to project various sequences of light patterns (referred to herein in some embodiments as "light sequences") to move, transport, and/ or capture micro-objects. The term "move" as used herein with respect to light sequences refers to a light sequence that is, in some embodiments, sequentially projected at positions on an internal surface of the microfluidic device (e.g., a surface of an electrode activation substrate) so that it appears to be moving along that surface of the microfluidic device. In some instances, certain experimental/workflow conditions (e.g. involving the use of positive dielectrophoresis (DEP)) tend to lead to the aggregation of micro-objects, making the selection and/or manipulation of individual micro-objects more difficult. Under such conditions, a light cage having a composite structure (e.g., formed by first and second light beams) can facilitate the manipulation of individual micro-objects by activating a first DEP force for controlling a first micro-object and activating a one or more additional DEP forces for controlling one or more micro-objects other than the first micro-object. In one aspect, the present disclosure is directed to light sequences, and methods for their use, that allow for controlled manipulation of micro-objects under positive DEP conditions.

In various embodiments, the light cage (or light pattern) projected upon the surface of the microfluidic device will be composed of light from a plurality of light pixels, each of which can have a substantially square or rectangular shape. By combining a plurality of such light pixels, a pattern can be generated that has any of a variety of shapes, including polyhedral shapes (e.g., triangular, quadrilateral (such as square, rhomboid, trapezoid), pentagonal, hexagonal, heptagonal, octagonal, etc.), circular or ellipsoidal shapes, or irregular shapes, including shapes that are a combination of polyhedral and circular/ellipsoidal elements. In various embodiments, the light pattern projected upon the surface of the microfluidic device will have any of the foregoing shapes, or an outline of such shape. The elements of the light cage (or light pattern) may be of varying length and width to illuminate an area of varying size, and thus a varying number of DEP electrodes (e.g., in an array of DEP electrodes, or "virtual" electrodes in an electrode activation substrate having a layer of amorphous silicon), thereby providing varying amounts of DEP force.

Depending on the embodiment, the velocity at which the light cage (or light pattern) is moved can vary according to the size and type of the micro-objects to be moved and speed required for the desired functionality (e.g. time limitations in moving micro-objects to an area of the microfluidic device). In most embodiments, the velocity at which the light cage (or light pattern) moves will range from about 1 microns/second to about 50 microns/second. In some embodiments, the velocity at which the light cage (or light pattern) moves will range from about 5 microns/seconds to about 30 microns/second. In some specific embodiments, the velocity at which the light cage (or light pattern) moves will range from about 10 microns/second to about 20 microns/second.

Light patterns for effective isolation of selected micro-objects. In certain embodiments of the disclosure, the sequences of light patterns project a shape which can illuminate, and optionally surround, one or more micro-objects (including cells), thereby specifically selecting the one or more micro-objects by activating a positive DEP force that attracts the one or more micro-objects. As used herein, such a shape illuminating, and optionally surrounding, the one or more micro-objects may be referred to as a "light cage". As discussed further below, it can be useful to generate specifically formatted shapes for a light cage to assist with transport of the one or more selected micro-objects, while preventing non-selected micro-objects adjacent to or in the transport path of the one or more selected micro-objects from being drawn into the group of one or more selected micro-objects.

Embodiments of using light patterns to selectively position micro-objects within a microfluidic device are illustrated in FIGS. 6A-6H. In these embodiments, the microfluidic device contains a microfluidic circuit 2000 with a flow region (e.g., channel 2254) through which a first liquid medium 2106 flows, as described herein. The microfluidic circuit 2000 also contains multiple sequestration pens 2124, 2126, 2128, 2130 that each contain an isolation region 2240 and a connection region 2236, as described herein. In other more embodiments, the microfluidic circuit 2000 can more generally include chambers, which can have any of the various shapes, sizes, and structures as are known in the art. The sequestration pens 2124, 2126, 2128, 2130 contain a second fluidic medium 2248, as shown in sequestration pen 2128 of FIG. 6A. The microfluidic circuit 2000 can also contain any of the other components described with respect to the microfluidic devices shown in FIGS. 1-4 and/or as described elsewhere herein. In addition, the microfluidic device contains an electrode activation substrate having a layer of photoconductive material (e.g., amorphous silicon or an array of phototransistors or semiconductor integrated circuits).

In these embodiments, the microfluidic circuit 2000 operates using positive DEP forces to manipulate and position the micro-objects. The positive DEP forces are generated using various light beams that are projected on the electrode activation substrate of the enclosure of the microfluidic device containing the microfluidic circuit 2000. The micro-objects, including any of the micro-objects described herein, are attracted to illuminated portions of the substrate, since that is where the positive DEP forces are being generated. This configuration differs from those known in the art where the light patterns are projected and produce negative DEP forces. Such negative DEP forces often repel the micro-objects.

The positive DEP forces used in these embodiments, though, tend to attract additional micro-objects other than a single micro-object of interest. This attraction makes it difficult to work with just the micro-object of interest without grouping or attracting other undesirable micro-objects with the micro-object of interest. Accordingly, in these embodiments the light patterns described herein have been modified so that a first light beam is use to activate positive DEP forces which capture the micro-object of interest and a second (or further) light beam is used to activate positive DEP forces that capture any other undesired micro-objects in the surrounding proximity or in any location where those undesired micro-objects are not desired to be located. In some configurations, the first light beam can be configured to project light 2108 with a substantially circular shape and a size sufficient to capture the desired micro-object of interest (or first micro-object) 2246, as shown in FIG. 6B. Of course, other sizes and shapes can be projected from the first light beam 2108, provided that the shape captures the desired micro-object of interest. Examples of other shapes that can be used include oblong, triangular, rectangular, square, or polygonal, as well as any irregular shape. In other configurations, the first light beam can project a shape with at least one dimension (whether length, width, and/or diameter) that is smaller than the opening of a chamber or a sequestration pen. For example, the shape of the projected light from the first light beam can have at least one dimension that is smaller than a width $W_{con}$ of a connection region 2236 (e.g., the width $W_{con}$ of a proximal opening of the connection region 2236) of the sequestration pen into which the micro-object of interest 2246 will be moved.

The second light beam can also project light having any shape and size that captures the other micro-object(s) in the proximity of the micro-object of interest. In these embodiments, proximate (or in proximity of) can be at least within about 10 microns (e.g., at least within about 15, about 20, about 25, about 30, about 35, about 40, about 45, about 50, or more microns, or any range defined by two of the foregoing endpoints) of the first micro-object. In some configurations, the second light beam can be configured to project a light pattern 2110 having a band of light with a substantially circular shape and a size sufficient to at least capture a second micro-object(s) 2244 that is in the proximity of the first micro-object 2246, as shown in FIG. 6B. Of course, other sizes and shapes can be used for light pattern 2110 provided that it captures at least the second micro-object(s). Examples of other shapes that can be used include oblong, triangular, rectangular, square, or polygonal, as well as any irregular shape. In other configurations, the light pattern projected by the second light beam can have any shape with at least one dimension (whether length, width, and/or diameter) that is larger than the opening of a chamber or sequestration pen, particularly a width $W_{con}$ of a connection region (e.g., of the proximal opening of the connection region) of the sequestration pen, into which the micro-object of interest 2246 will be moved.

The size of the first and second light beams will depend upon the size of the first and second micro-object(s) being captured. For example, FIG. 6B illustrates embodiments for capturing single bacterial cells, which have a diameter of about 1 micron. In these embodiments, the first light beam can have a substantially circular shape with a diameter of about 5 to about 10 microns and the sequestration pens (or chambers) can have openings, such as a proximal opening of a connection region with a size $W_{con}$, of about 20 microns or more. In these illustrated embodiments, the diameter of the light pattern 2110 projected by the second light beam can be greater than the openings of the sequestration pens (or chambers), such as the width $W_{con}$ of the proximal opening of the connection region (e.g., greater than about 20 microns). Accordingly, the diameter of the light pattern projected by the second light beam can be at least about 30 microns, or more (e.g., at least about 35 microns, at least about 40 microns, at least about 45 microns, at least about 50 microns, at least about 55 microns, at least about 60 microns, at least about 65 microns, at least about 70 microns, etc.). The thickness of the band (or line) of the light pattern projected by the second light beam can be, for example, about 5 microns, or more (e.g., about 8 microns, about 10 microns, about 15 microns, or more) or can range from about 5 microns to about 20 microns, or about 8 microns to about 15 microns.

The space between the light patterns projected by the first light beam and the second light beam can be varied as appropriate for the size of the micro-objects being captured. For example, the space between the light patterns projected by the first and second light beams can be at least about 15 microns (e.g., at least about 20 microns, at least about 25 microns, at least about 30 microns, at least about 35 microns, at least about 40 microns, at least about 45 microns, at least about 50 microns, at least about 55 microns, at least about 60 microns, at least about 65 microns, or more) or range from about 10 microns to about 30 microns, about 20 microns to about 40 microns, about 30 microns to about 50 microns, about 40 microns to about 60 microns, about 50 microns to about 70 microns, about 60 microns to about 80 microns, etc.). The space between the light patterns is highly dependent on the proximity of the second micro-object(s) to the first micro-objects and the density of micro-objects in the enclosure of the microfluidic device, with the gap being smaller (at least initially) when more second micro-objects are present. Relatedly, the space between the light patterns projected by the first and second light beams can increase over time, to facilitate separation of the first micro-object from the second micro-objects. This increase in space can occur shortly after the light patterns are initially projected upon the surface of the microfluidic device or as the first micro-object is being transported.

Even for similar micro-object types (e.g., bacterial cells), other sizes for the light patterns projected by the first or second light beams, and the space between the light patterns, can be suitable provided they respectively capture the first micro-object or the second micro-objects. For other types of micro-objects, such as those described herein, the first and/or second light beams can be larger or smaller. For example, where the micro-object is bigger (e.g., >3 microns), then one or more of these sizes (e.g., the length, width, or diameter of the light pattern projected by the first and/or second light beam) may need to be increased. Likewise, when the micro-object is smaller (e.g., <1 micron), then one or more of these sizes (e.g., the length, width, or diameter of the light pattern projected by the first and/or second light beam) can be decreased.

Figure 6A:
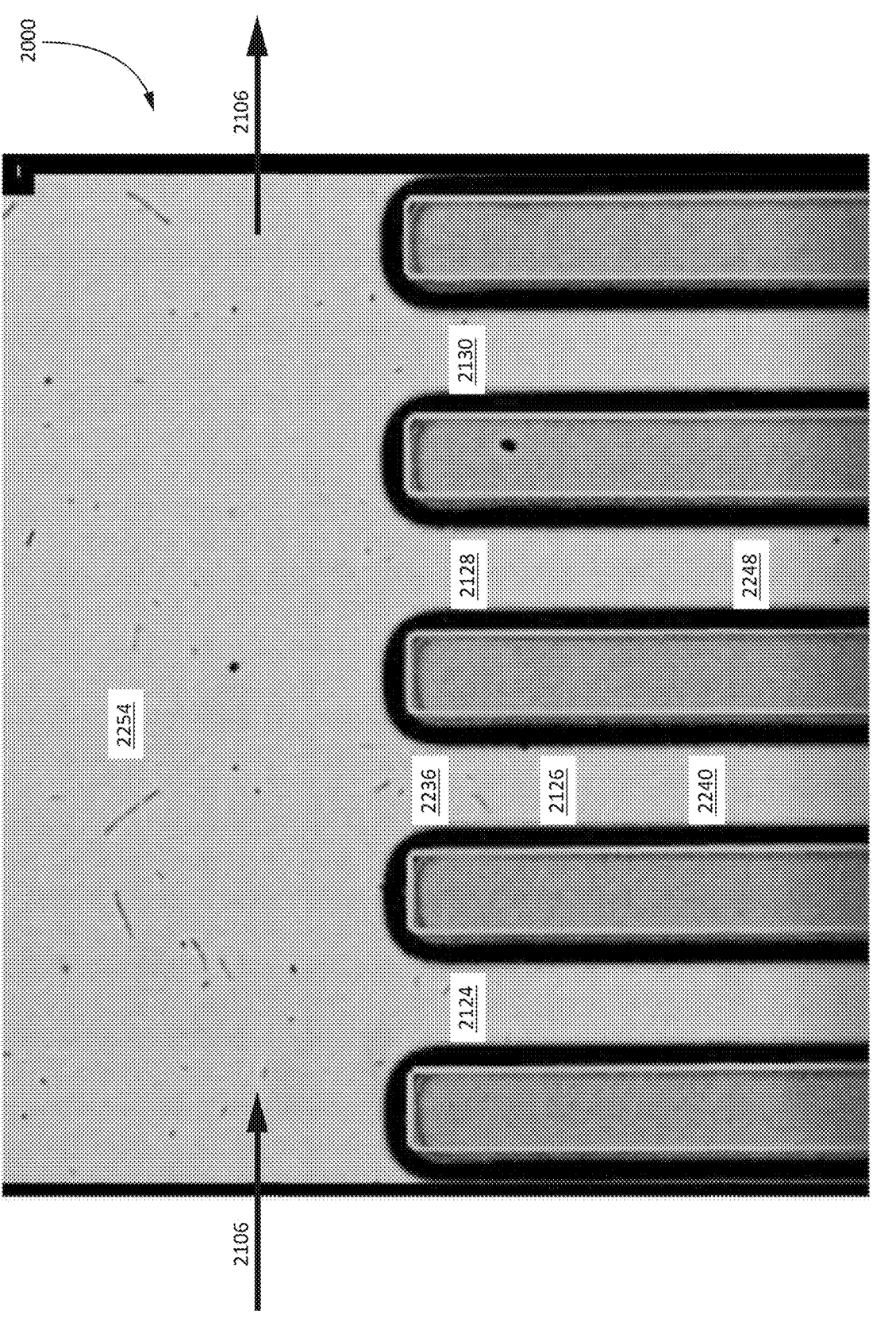
FIGS. 6A to 6H illustrate a process of using light beams to selectively reposition micro-objects from a flow region into a sequestration pen.
Figure 6B:
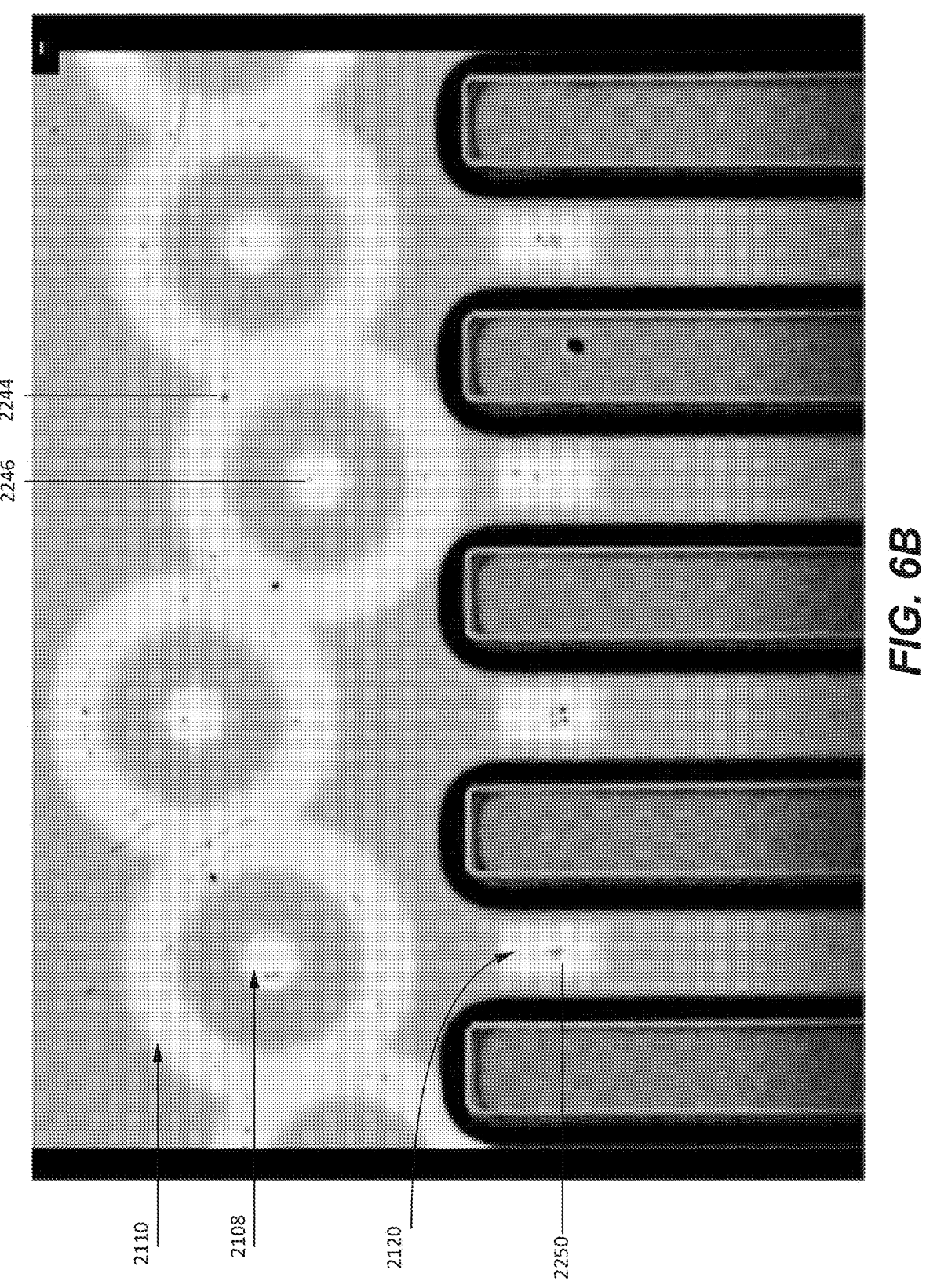

As illustrated in FIG. 6A, the first fluidic medium 2106 flows through the flow region (e.g., channel 2254). The first fluidic medium 2106 contains the first micro-object of interest 2246 as well as multiple second micro-objects 2244. Some of these second micro-objects 2244 might be proximal to or enter the opening of a chamber or sequestration pen (e.g., the proximal opening of a connection region 2236) when the first fluidic medium flows through the channel 2254, designated hereafter as third micro-object(s) 2250. To reduce and/or eliminate any third micro-object 2250 from entering and/or remaining in the opening (e.g., connection region 2236), light 2120 from a third light beam can be projected on the desired section of the connection region 2236.

The projected light 2120 of the third light beam can be used to capture and move any of the third micro-objects 2250 in the opening (e.g., connection region 2236) laterally and/or toward the channel (e.g., laterally within and/or outwardly away from the proximal opening of the connection region where it fluidically connects with the channel). The projected light 2120 of the third light beam can have any shape that captures the third micro-object(s), conforms to the shape of the opening (e.g., proximal opening of the connection region), and generally moves the third micro-objects away from the opening. In some configurations, the projected light 2120 of the third light beam can have the substantial rectangular shape, as illustrated in FIG. 6B. Examples of other shapes for the first light bar include triangular, rectangular, square, or polygonal, as well as any irregular shape. In some embodiments, the projected light 2120 can be adjacent to and/or incident upon a wall that forms the opening (e.g., a wall that forms the proximal opening of the connection region). In some related embodiments, there can be a projected light that is adjacent to and/or incident upon each of the two walls that form the opening (e.g., the walls on each side of the proximal opening of the connection region).

Once the first light beam has captured the first micro-object, the second light beam has captured any proximal second micro-objects, and the third light beam has captured any third micro-objects in or near the opening of the sequestration pen (or chamber), a process can be implemented to move the first micro-object into the sequestration pen (e.g., the isolation region 2240 of the sequestration pen) or the interior of the chamber. During this movement (or positioning) process, the second light beam maintains a separation between the first micro-object and the second micro-objects so that only the first micro-object enters the connection region and eventually the isolation region. As well, the second light beam keeps the second micro-objects from entering the connection region. And the third light beam moves the third micro-objects that are in the connection region into the microfluidic channel.

Figure 6C:
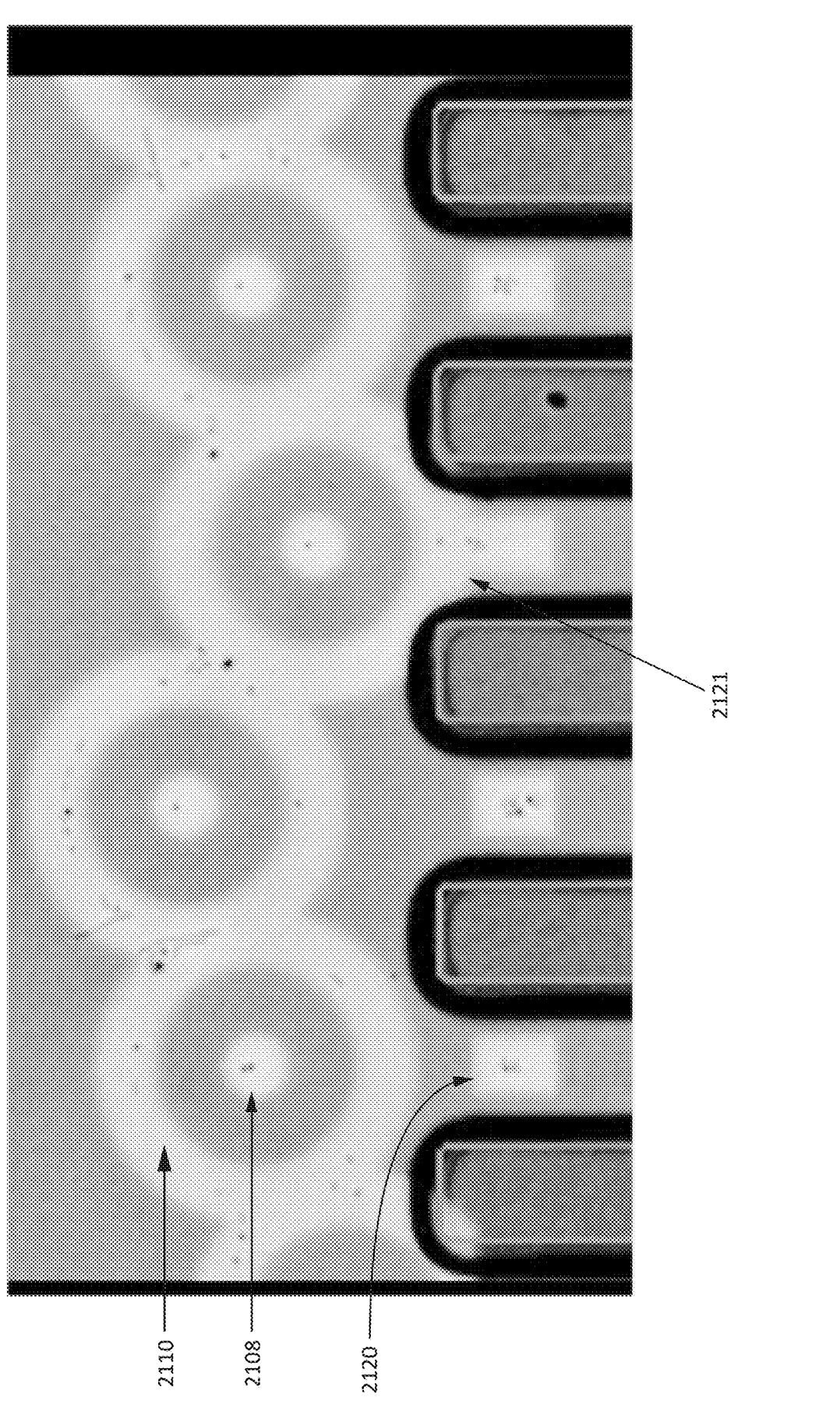
Figure 6D:
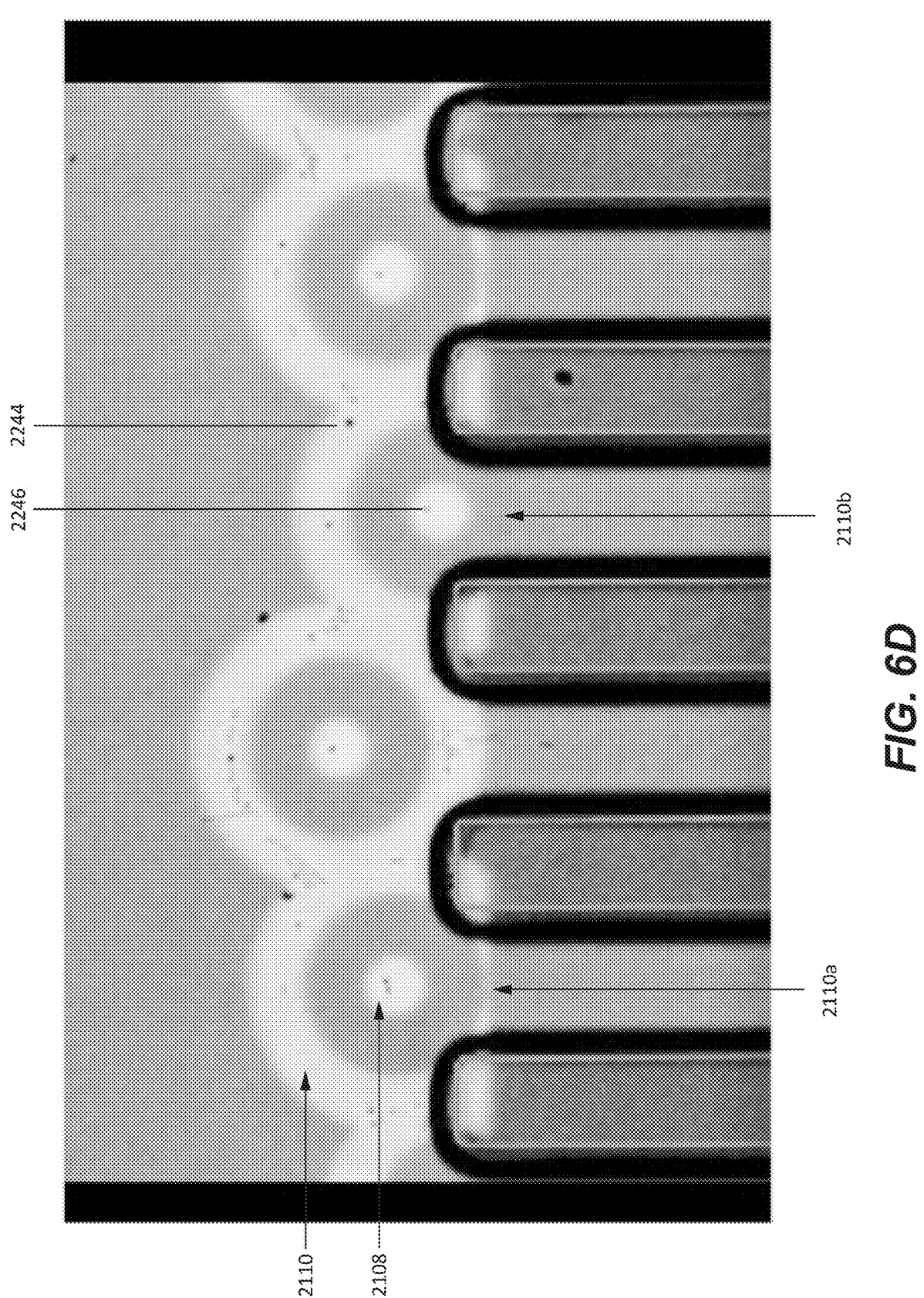

FIGS. 6C-6H illustrates the microfluidic circuit 2000 at sequential stages in this movement process. As depicted in FIG. 6C, the projected light 2108 from the first light beam (and the captured first micro-object 2246) have moved closer to the sequestration pens. As well, the projected light 2110 of the second light beam (and the captured second micro-objects 2244) have moved closer to the sequestration pens. At the same time, the projected light 2120 of the third light beam (and the captured third micro-objects 2250) has moved closer to the microfluidic channel. In fact, the projected light from one of the second light beams and from one of the third light beams have even touched at point 2121 shown in FIG. 6C. During this movement process, the shape and size of the light projected by the first and second light beams can change, provided they keep the first micro-object and the second micro-objects captured and separated from each other. As well, the shape of the light projected by the third light beam can change provided the third micro-objects remain captured therein. For example, the rectangular shape of the projected light of the third light beam can gradually shrink, drawing any third micro-object closer toward (and optionally out of) the opening of the sequestration pen (e.g., the proximal opening of the connection region).

Figure 6E:
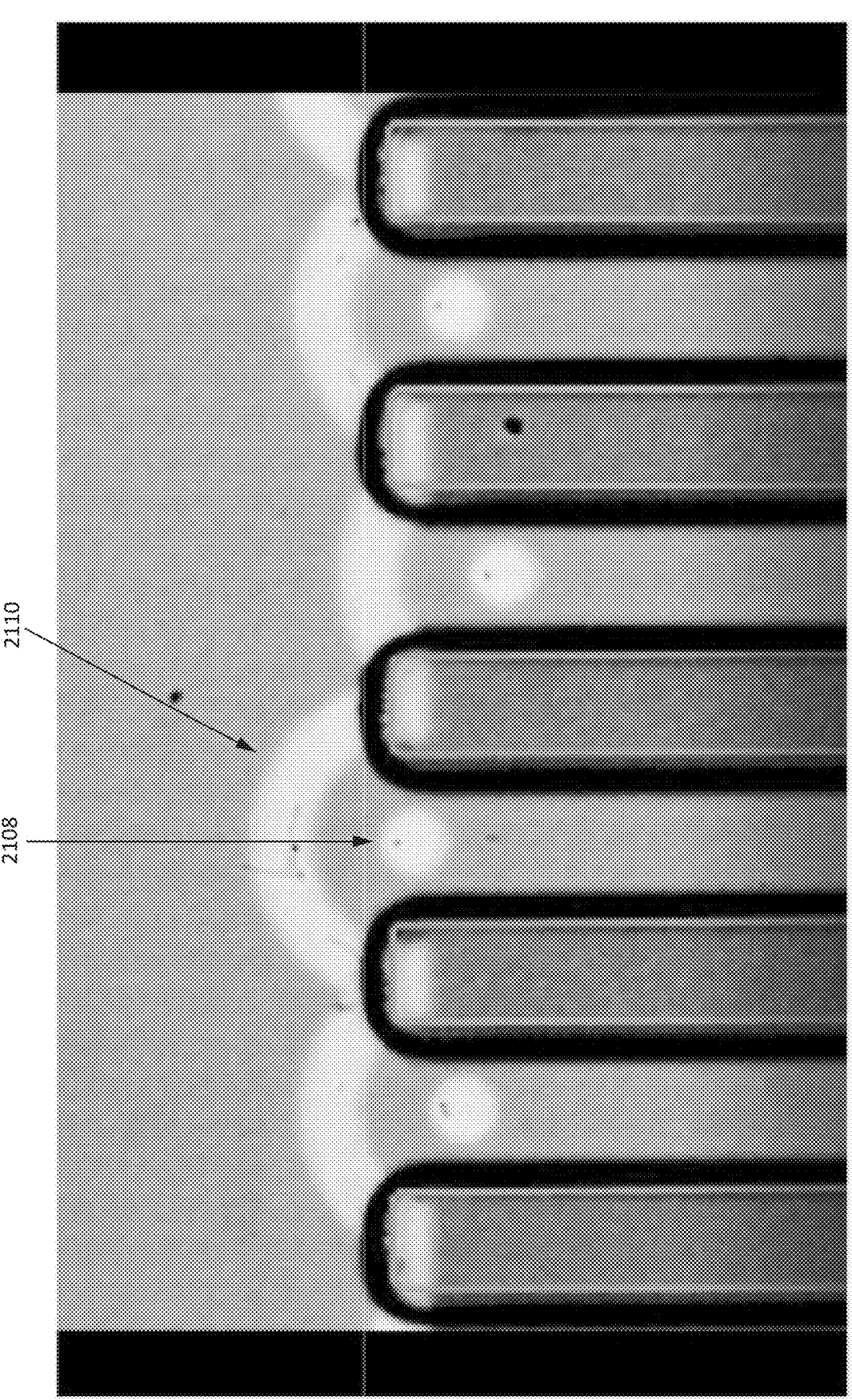

As shown in FIG. 6C, a portion of the light projected by the second light beam can enter part of the opening to the sequestration pen (e.g., the connection region) that is closest to the microfluidic channel. In certain embodiments, the projected light of the second light beam can enter to the extent of the thickness of the second light beam or a fraction thereof, such as about ¼, about ⅓, about ½, about ⅔, etc. of such thickness. The portion of the light projected by the second light beam that is located within the sequestration pen then can fade or dissipate (i.e., get progressively thinner) until a break in the projected light pattern is generated. This break can start in a portion of the light pattern projected by the second light beam that is somewhere within the middle portion of the opening of the sequestration pen (relative to the sides of that opening), as shown in the break 2110a shown in FIG. 6D. This break can then grow larger, as shown in break 2110b shown in FIG. 6D. In this breaking process, the second (and undesired) micro-objects captured by the second light beam can be pulled to the sides of the opening of the sequestration pen (e.g., the sides of the proximal opening of the connection region). This movement allows the light pattern projected by the first light beam to enter the sequestration pen (or chamber) without contacting any part of the second light beam (or the second micro-objects), keeping the first micro-object and the second micro-objects separated. As the projected light of the first light beam (with the captured first micro-object) fully enters the sequestration pen, as illustrated in FIG. 6E, the shape and size of the light pattern projected by the second light beam can change (e.g., flatten out) and pull away from the opening of the sequestration pen (or chamber), taking any second (undesirable) micro-objects away from the opening.

While the light patterns projected by the first and second lights beams are moving towards the sequestration pen (or chamber), the light pattern projected by the third light beam is moving out of the sequestration pen (or chamber), thereby removing any unwanted third micro-objects from the sequestration pen (or chamber). In some instances, the light pattern projected by the third light beam can even disappear before contacting the light pattern projected by the second light beam, provided that the captured third micro-objects are moved towards or into the channel. In other instances, though, the light pattern projected by the third light beam merges with the light pattern projected by the second light beam, facilitating movement of the third micro-objects into the flow region/microfluidic channel of the microfluidic device.

Figure 6F:
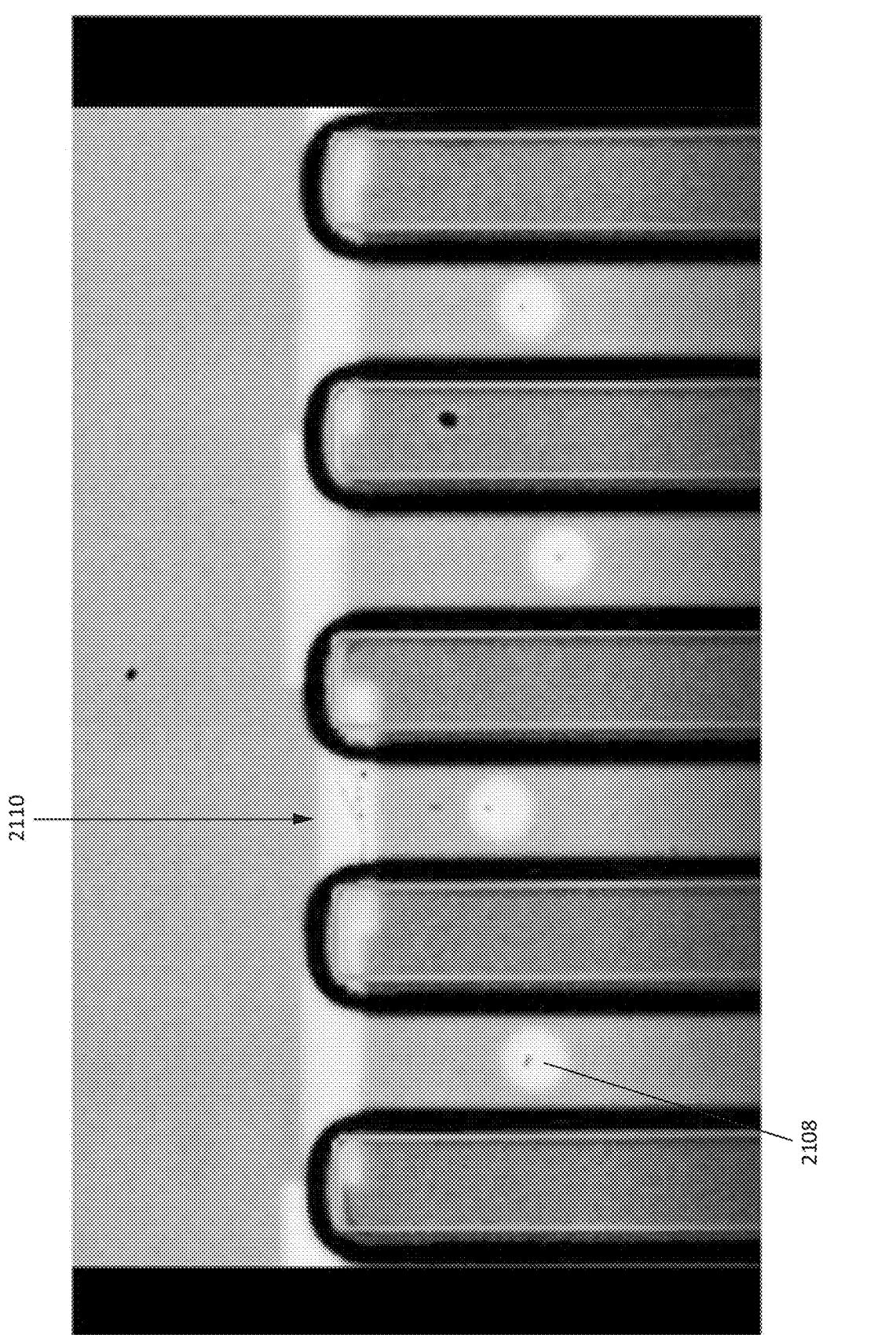
Figure 6G:
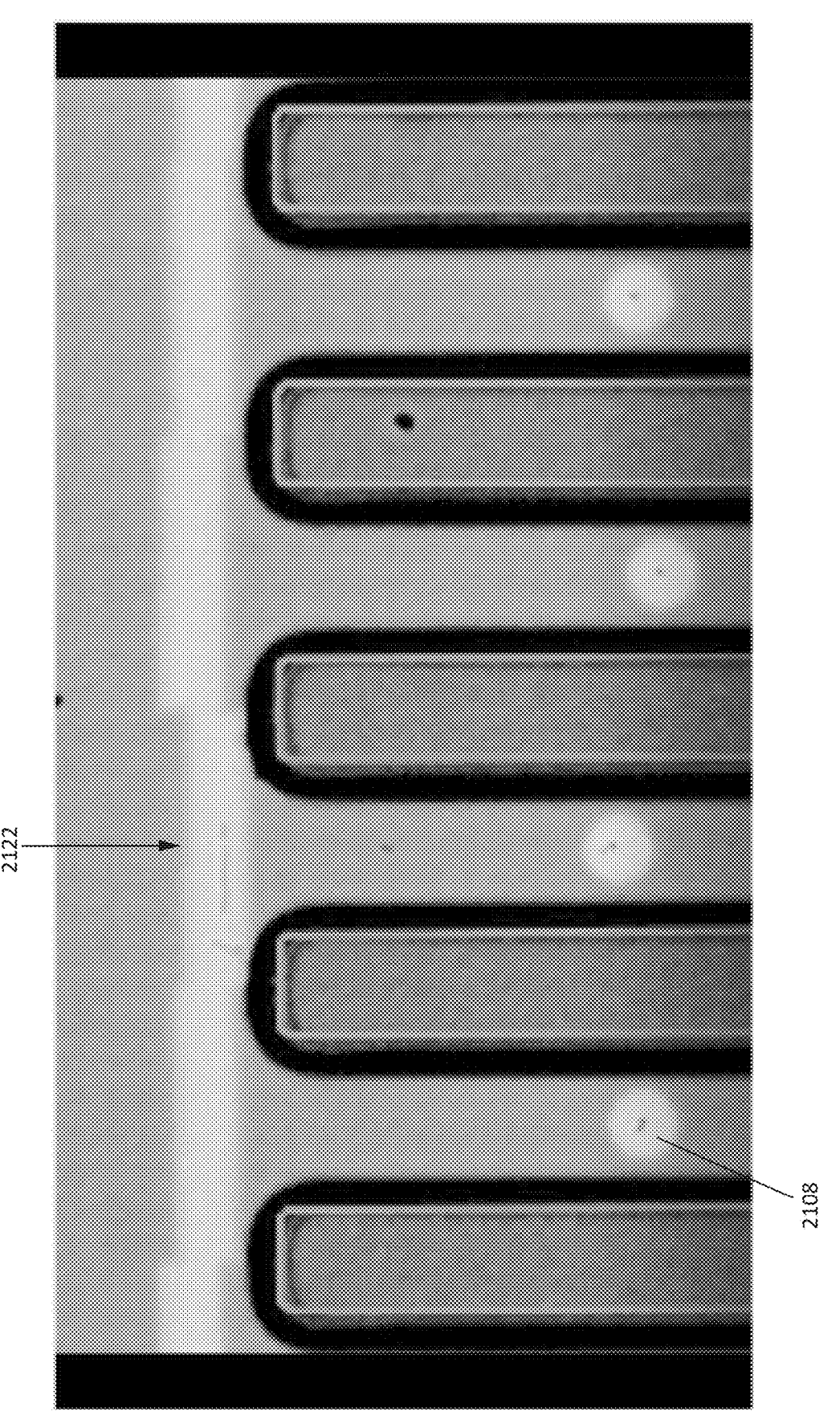
Figure 6H:
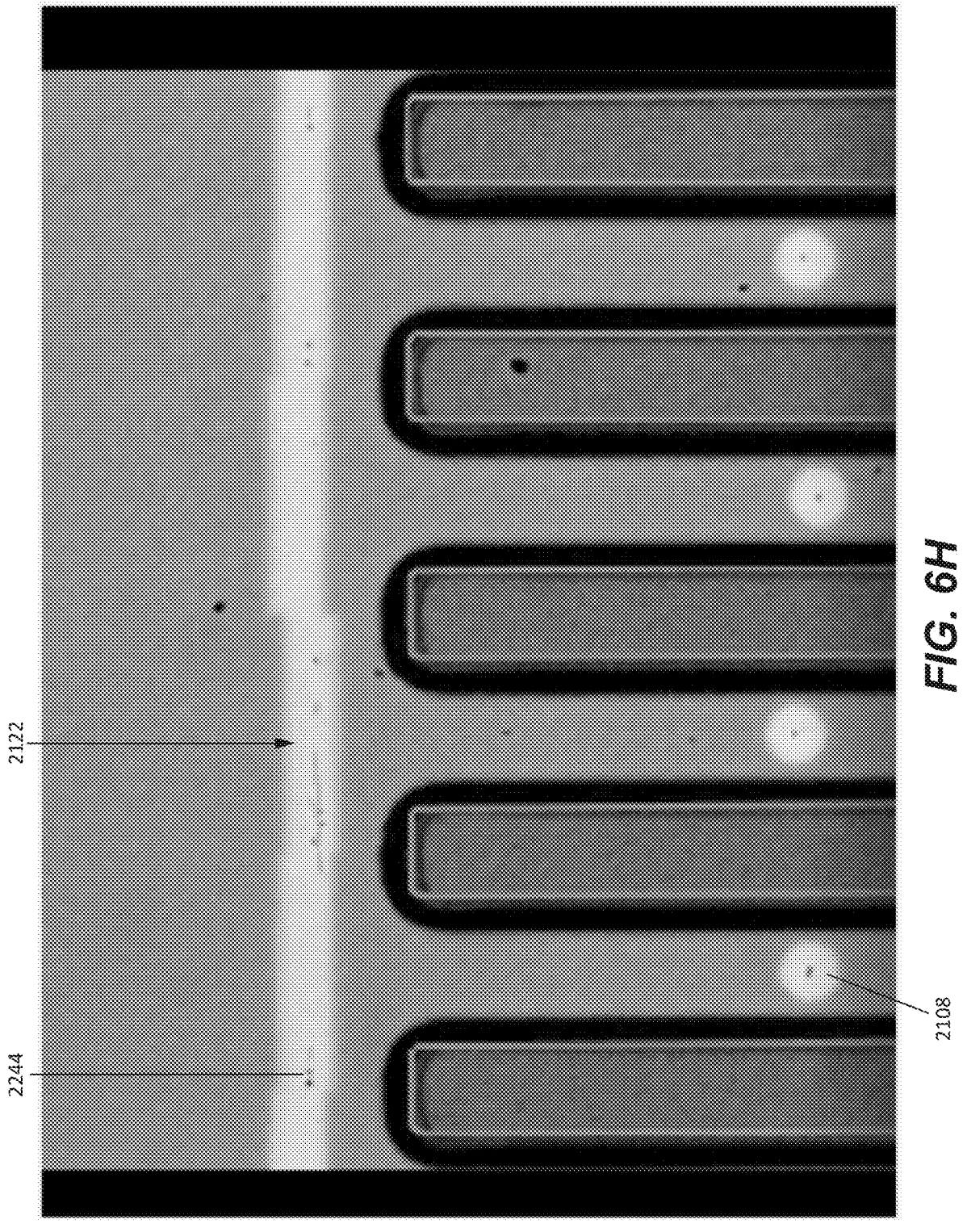

FIG. 6F shows a stage in this process where the projected light 2108 of the first light beam and the captured first micro-object have fully entered the sequestration pen. At this stage, the projected light 2110 of the second light beam has changed to appear more like a rectangular bar still containing undesired second micro-objects. The shape of the projected light of the second light beam could be changed to any shape other than rectangular bar provided that the second micro-objects and third micro-objects (if any) remained captured by the second light beam. The projected light of the second light beam continues to move away from the sequestration pen, as shown in FIG. 6G until the various projected light patterns merge into a larger line of projected light 2122 that contains the second micro-objects and third micro-objects (if any). The projected light 2108 of the first light beam and the captured first micro-object continue to move away from the opening of the sequestration pen until reaching the third position (e.g., the isolation region 2240), as shown in FIG. 6H. At that point, the first light beam can dissipate, leaving the first micro-object in the second fluidic medium within the sequestration pen (or chamber). The large line of projected light 2122 (formed from the merging of the light projected by the second light beams) can also dissipate, leaving the undesired, second and third micro-objects remaining in the first fluidic medium in the flow region/microfluidic channel.

In other embodiments, this positioning process can be reversed. In these embodiments, the first micro-object is located in the sequestration pen (e.g., in an isolation region in the sequestration pen) or in a chamber. The first light beam can be used to move the first micro-object from the sequestration pen/chamber, through the opening of the sequestration pen/chamber (e.g., through the connection region of the sequestration pen), and then into the flow region/microfluidic channel of the microfluidic device. In some embodiments, there is no need to use a second light beam as the first micro-object is already isolated in the sequestration pen (or chamber) and there are no undesired micro-objects in proximity of the first micro-object.

The embodiments depicted in FIGS. 6A-H can be effective when the micro-objects are small, such as when they are bacterial cells. In these embodiments, though, increasing the smoothness of the surface of the electrode activation substrate of the microfluidic device may yield better results. An electrode activation substrate design with an array of phototransistors may include a raised border around each phototransistor such that the substrate surface is uneven in the manner of a waffle. Such a design works well with larger micro-objects and would still work with smaller micro-objects, but it might not work as well. To improve performance, the electrode activation substrate of the microfluidic device can be configured with a substantially flat surface made of, for example, a layer of amorphous silicon. The amorphous silicon (or other semiconducting material) is relatively inexpensive and works effectively with a low conductivity fluidic medium, which is often used bacterial and fungal cells, but rarely used with animal and/or mammalian cells.

Using light beams to created positive DEP forces produced by an amorphous silicon electrode activation substrate has allowed an improved ability to capture, move, and analyze smaller micro-objects. In some configurations of the embodiments shown in FIGS. 6A-6H, a success rate of at least 50% have been achieved, i.e., at least half of all attempts to isolate a single micro-object have succeeded. However, comparable success could be achieved with modest variations to the shape of the light patterns and/or use of a phototransistor array, where individual phototransistors have a pitch (i.e., x,y dimensions) that are commensurate with the size of the micro-objects of interest. For example, the pitch could be +/−50% of the diameter, length, or width of the micro-object. Thus, for a bacterial cell having a 1 micron length, the pitch of the phototransistor array could be about 0.5 microns to about 2 microns; similarly, for a yeast cell having a 3 micron diameter, the pitch of the phototransistor array could be about 1.5 microns to about 6 microns.

In certain embodiments, the disclosure further provides systems and machine-readable storage devices for storing non-transitory machine readable instructions for carrying out the foregoing methods. The machine-readable instructions can further control the imaging device used to obtain the images. The systems can include any of the system features disclosed elsewhere herein.

EXPERIMENTAL

Example 1: Selective Penning of Bacterial Cells

System and device: An OptoSelect™ chip, a nanofluidic device manufactured by Berkeley Lights, Inc. and controlled by an Beacon® instrument which was also manufactured by Berkeley Lights, Inc. were employed. The Beacon® instrument includes: a mounting stage for the chip coupled to a temperature controller; a pump and fluid medium conditioning component; and an optical train including a camera and a structured light source suitable for activating phototransistors within the chip. The OptoSelect™ chip includes a substrate configured with OptoElectroPositioning (OEP™) technology and having a layer of amorphous silicon (a-Si: H). The chip also included a plurality of microfluidic channels, each having a plurality of NanoPen™ chambers (or sequestration pens) fluidically connected thereto. The volume of each sequestration pen was around $5 \times 10^5$ cubic microns (e.g., about $1 \times 10^5$ to about $1 \times 10^6$ cubic microns).

Biological cells. Bacteria, specifically *E. coli* having a length of about 1 micron to about 2 microns.

Figure 7:
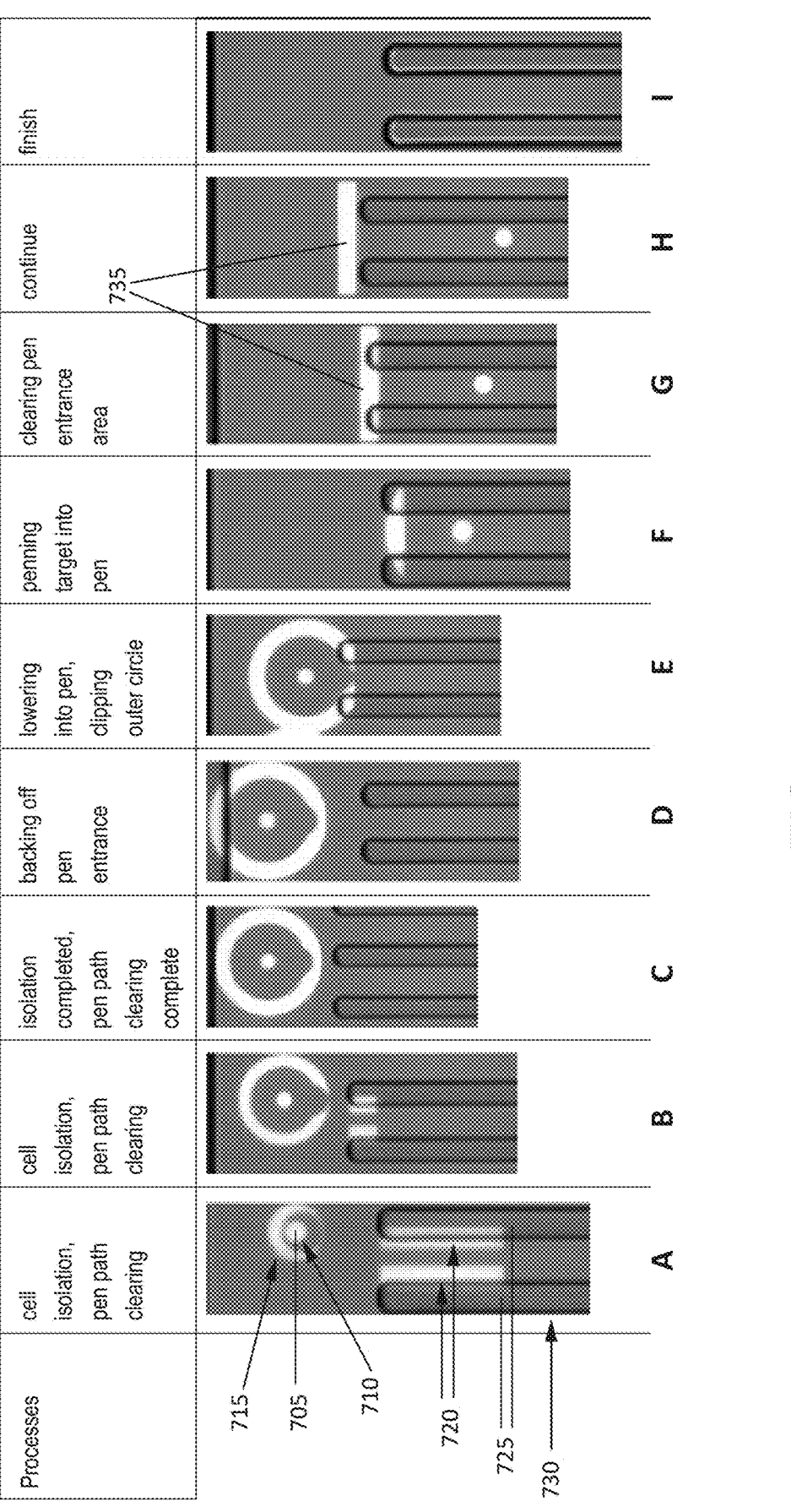
FIG. 7 illustrates another process of using light beams to selectively reposition micro-objects from a flow region into a sequestration pen.

FIG. 7 depicts the use of a light sequence, inducing positive dielectrophoretic (DEP) forces operating at 400 kHz and 3.5 V, to move a plurality of micro-objects into NanoPen™ chambers. As shown in box A, the micro-object of interest (*E-coli* cell 705) is isolated using positive DEP forces to create a bullseye-shaped light cage with a circular inner light 710 and a ring-shaped outer light 715. The circular inner light 710 has a radius of about 8 microns. The ring-shaped outer light 720 has an outer radius of about 55 microns and a width of about 8 microns. A pair of light bars 720 are also created to coincide with the walls 725 of the selected sequestration pen 730. The pair of light bars 720 are used to clear out any errant micro-objects that might be in the path where the *E-coli* 705 will moved (i.e., into the sequestration pen 730), i.e., in the middle of the sequestration pen 730.

As shown in FIG. 7, box B, the *E-coli* cell 705 continues to be isolated within the bullseye light pattern. During this process, the pair of light bars 720 are moved at a similar speed in the direction of the channel. This process continues until the configuration of FIG. 7, box C is achieved: the *E-coli* cell 705 is isolated and the projected path into the sequestration pen is cleared. As shown in FIG. 7, box D, and if needed, the bullseye light pattern can be backed off to pull errant micro-objects away from the opening of the sequestration pen, clearing the path to move the desired micro-object into the pen 730 without other micro-objects getting in.

Next, the *E-coli* cell 705 is moved towards the sequestration pen 730 as depicted in FIG. 7, box E. The bullseye light pattern is moved towards the desired sequestration pen at a velocity of 10 microns/second. The bullseye light pattern overlaps the end of the walls of the sequestration pen. The movement process continues until, as shown in FIG. 7, box F, the *E-coli* cell 705 is completely moved into the sequestration pen 730. The bullseye light pattern could be moved up to a distance of 600 microns.

Once the *E-coli* cell 705 is situated in the selected sequestration pen 730, as depicted in FIG. 7, box G, the shape of the bullseye light pattern is changed to a light bar 735 that is situated near the opening of the sequestration pen. This configuration ensures that no errant micro-objects can enter the sequestration pen. The light bar is then moved away from the sequestration pen, as shown in FIG. 7, box H, as the *E-coli* cell moves deeper into the sequestration pen. The movement process is complete when the light bar 735 is removed and the *E-coli* cell is located in the isolation region (not shown) of the sequestration pen 730.

This process was able achieve an efficiency of greater than 50%:more than 50% of the desired *E-coli* cells were moved into the desired sequestration pens.

Example 2: Selective Penning of Bacteria Cells

The process described in Example 1 was repeated. In this Example, though, the circular inner light had a diameter of 10 microns, the initial cage size fraction (the change in the size of the size of the bullseye light pattern from FIG. 7, box A, to FIG. 7, box C) was 0.3, the line width of the outer light of the bullseye light pattern during expansion (from FIG. 7, box A, to FIG. 7, box C) was 0.7, the movement speed during expansion (from FIG. 7, box A to FIG. 7, box C) was 0.35, and the DEP forces operated at 3V and 0.2 MHz.

Example 3: Selective Penning of Yeast Cells

System and device: An OptoSelect™ chip, a nanofluidic device manufactured by Berkeley Lights, Inc. and controlled by a Beacon® instrument which was also manufactured by Berkeley Lights, Inc. were employed. The Beacon® instrument includes: a mounting stage for the chip coupled to a temperature controller; a pump and fluid medium conditioning component; and an optical train including a camera and a structured light source suitable for activating phototransistors within the chip. The OptoSelect™ chip includes an amorphous silicon substrate configured with OptoElectroPositioning (OEP™) technology to provide a positive OET force. The chip also included a plurality of microfluidic channels, each having a plurality of NanoPen™ chambers (or sequestration pens) fluidically connected thereto. The volume of each sequestration pen was around $5 \times 10^5$ cubic microns (e.g., about $1 \times 10^5$ to about $1 \times 10^6$ cubic microns).

Biological cells. A sample of yeast, specifically pichia, was obtained. The pichia was washed twice in a buffer solution by treating with 290 mM cellobiose+0.05×LCB (conductivity=100 uS/cm), centrifuging at 3000 g for 1 minute, decanting, and re-suspending in the buffer. The centrifuging, decanting, and re-suspension processes were then repeated. The outer diameter of the pichia was measured to be 0.73 micron. A 50 uL of pichia stock with was combined with 1 mL of buffer to obtain a density of 0.02.

Similar to Example 1, a light sequence was induced used positive dielectrophoretic (DEP) forces operating at 200 kHz and 7 V, to move the pichia into NanoPen™ chambers. The desired *Pichia* cell was isolated with a bullseye light pattern with a circular inner light with a radius of 10 microns and ring-shaped outer light with an outer radius of about 70 microns and a line width of about 7 microns. The speed of the bullseye light pattern was about 10 microns/second when moving the desired *Pichia* cells into every other sequestration pen while leaving the intervening sequestration pen empty. This process was able achieve an efficiency of 75%: with 14220 attempts, 10637 pichia cells were moved into the selected sequestration pen.

Although specific embodiments and applications of the disclosure have been described in this specification, these embodiments and applications are exemplary only, and many variations are possible.

What is claimed:

1. A method of selectively positioning a first micro-object in a microfluidic device comprising an enclosure having an inlet, an outlet, a flow region connecting the inlet and the outlet, and an electrode activation substrate having a photoconductive layer, wherein the enclosure of the microfluidic device further comprises a sequestration pen, and wherein the sequestration pen opens laterally from the flow region, the method comprising:

projecting light from a first light beam upon a first position on the electrode activation substrate, wherein the first position is proximal to the first micro-object, and wherein the projected light of the first light beam activates a positive dielectrophoresis (DEP) force within the enclosure sufficient to capture the first micro-object;

projecting light from a second light beam upon a second position on the electrode activation substrate, wherein the second position is adjacent to or at least partially surrounds the first position, without overlapping the first position, the projected light of the second light beam activating a positive DEP force within the enclosure sufficient to capture at least one second micro-object other than the first micro-object, and wherein the projected light of the second light beam has a non-uniform width;

moving the projected light of the first light beam towards a third position on the electrode activation substrate, wherein the third position on the electrode activation substrate is located within the sequestration pen, wherein the DEP force activated by the projected light of the first light beam is sufficient to move the first micro-object to the-third position; and moving the projected light of the second light beam in relation to the projected light of the first light beam to move the at least one second micro-object away from the third position, wherein the thinner region of the second light beam is oriented towards an opening of the sequestration pen as the projected light of the second light beam moves in relation to the projected light of the first light beam.

2. The method of claim 1, wherein the projected light of the first light beam has a substantially circular, oblong, triangular, rectangular, square, polygonal, or irregular shape, and completely illuminates the first micro-object.

3. The method of claim 1, wherein the projected light of the second light beam forms a line having a substantially circular, oblong, triangular, rectangular, square, polygonal, or irregular shape.

4. The method of claim 3, wherein the width of the line formed by the second light beam is between about 5 microns and about 15 microns.

5. The method of claim 1, wherein the projected light of the second light beam has a shape that encloses the first light beam, wherein there is a space between the first and second light beams, and wherein any illumination of the space between the first and second light beams is insufficient to activate DEP electrodes located in the space between the first and second light beams.

6. The method of claim 1, wherein moving the first micro-object from the first position to the third position on the electrode activation substrate isolates the first micro-object from other micro-objects located in the microfluidic device.

7. The method of claim 1, wherein the light projected upon the first position by the first light beam has a length, width, or diameter that is smaller than a width of the opening of the sequestration pen.

8. The method of claim 1, wherein the light projected upon the second position by the second light beam defines a shape having a length, width, or radius that is about 40 microns to about 80 microns, and wherein the length, width, or radius of the defined shape increases during a period of time defined by an initial time when the first and second light beams are first projected upon the electrode activation substrate, and a subsequent time when the projected light of the first light beam arrives at the third position on the electrode activation substrate or arrives at the opening of the sequestration pen of the microfluidic device.

9. The method of claim 1, wherein the projected light of the second light beam changes shape once a portion of the projected light of the second light beam reaches or enters the opening of the sequestration pen of the microfluidic device.

10. The method of claim 9, wherein the shape of the projected light of the second light beam continues to change as the projected light of the first light beam approaches and/or enters the opening of the sequestration pen.

11. The method of claim 1, further comprising projecting light from a third light beam upon a fourth position on the electrode activation substrate, wherein the fourth position is located in or proximal to the opening of the sequestration pen fluidically connected to the flow region or a microfluidic channel.

12. The method of claim 1, wherein the first micro-object is a bacterial cell, a fungal cell, a yeast cell, an animal cell, and/or a mammalian cell, or wherein the first micro-object is a capture bead.

13. A system for performing a method of selectively positioning a first micro-object in a microfluidic device, the system comprising:

an optical train having a structured light source; and a master controller having a control module with a processor and a non-transitory computer accessible storage medium storing thereupon a sequence of instructions which, when executed by the processor of the control module, causes the control module to perform the method of claim 1.

14. The system of claim 13, further comprising a media module, a motive module, an imaging module, and/or a tilting module.

15. The method of claim 7, wherein the light pattern projected by the second light beam has at least one dimension larger than the opening of the sequestration pen.

16. The method of claim 1, wherein the first light beam moves the captured first micro-object into the sequestration pen.

* * * * *